INVENTORS.
GEORGE F. DALY
FRED SALTZ
BY Donald F. Voss
ATTORNEY

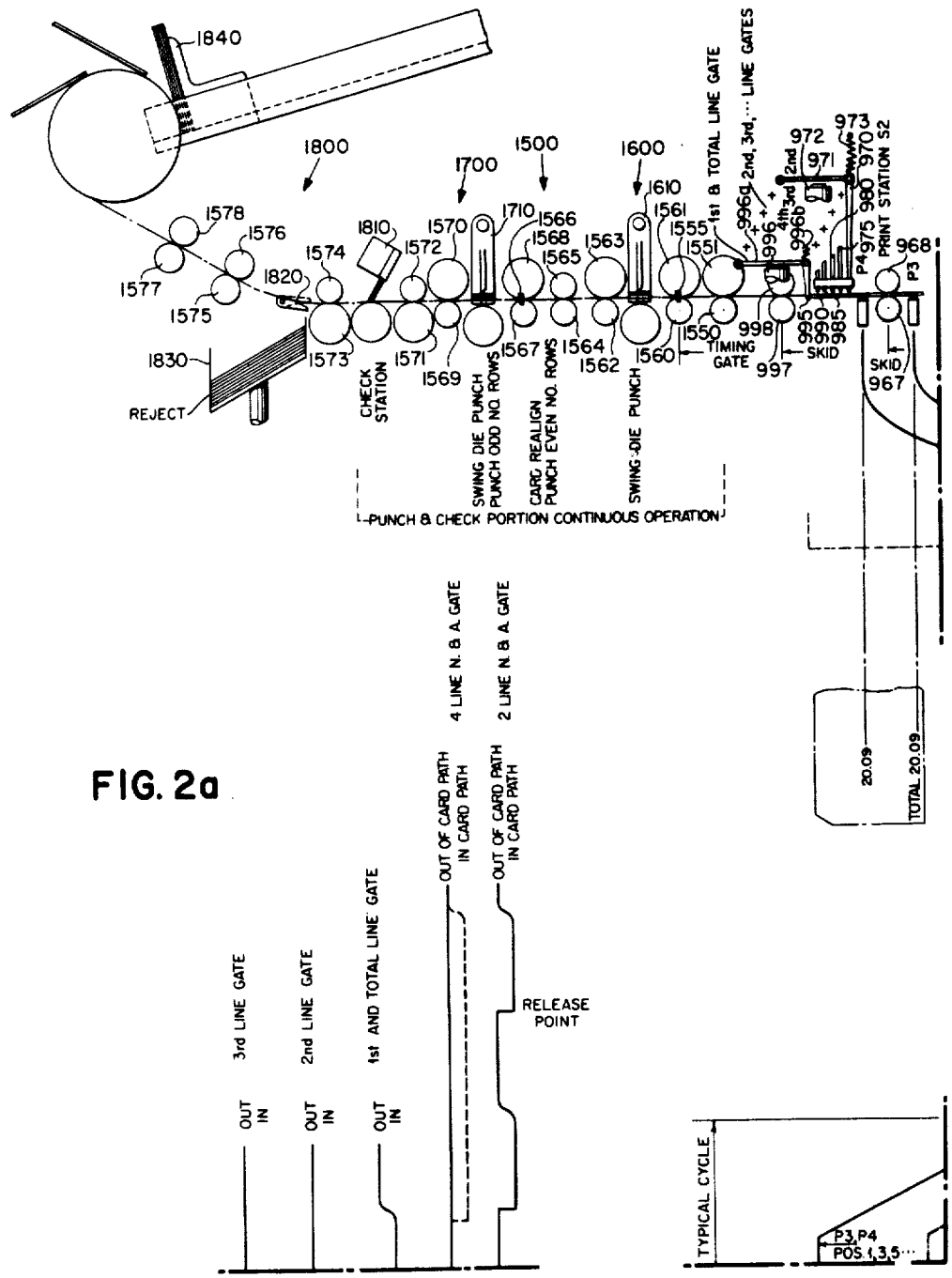

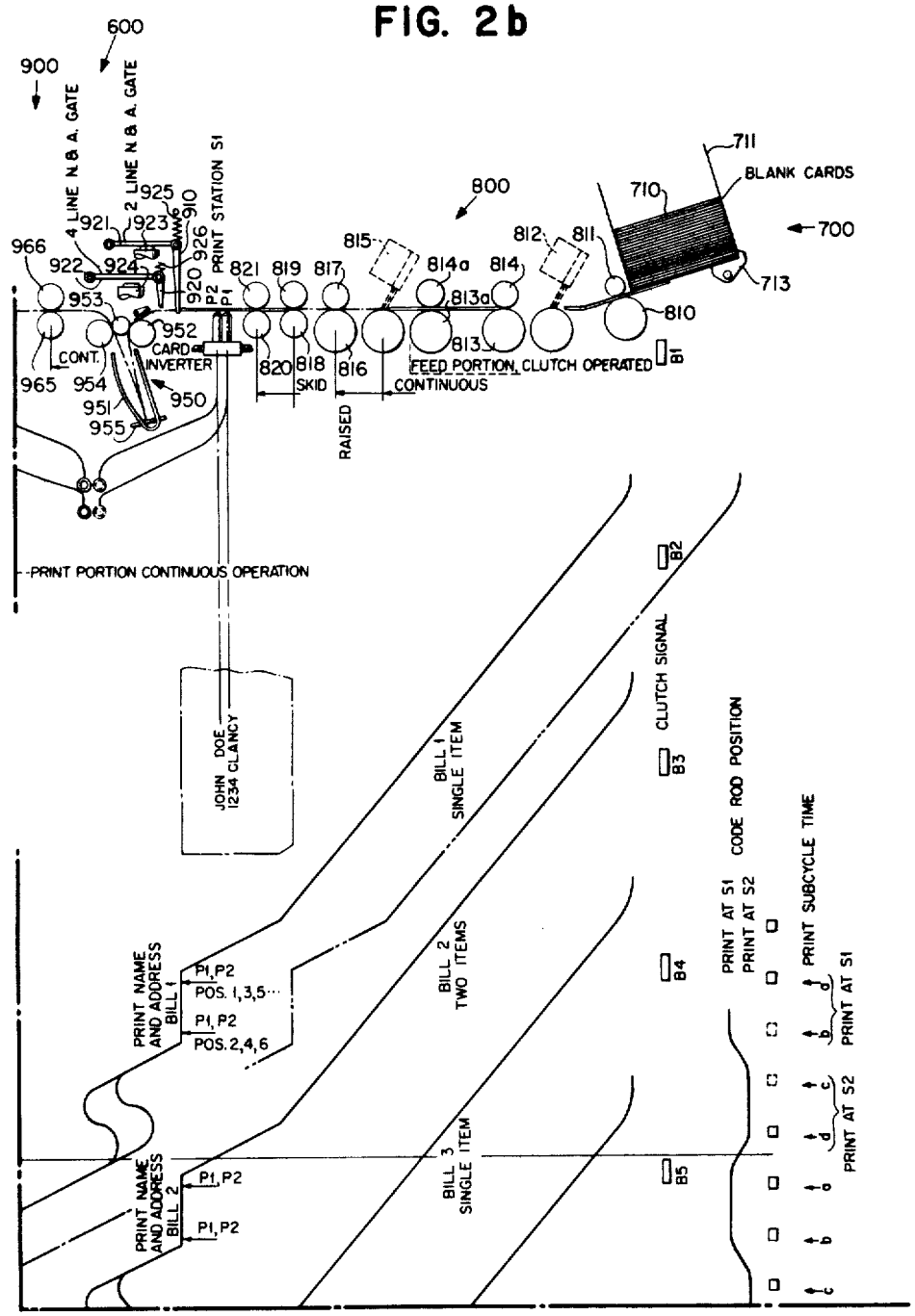

Oct. 15, 1963    G. F. DALY ETAL    3,107,292
DOCUMENT PREPARATION DEVICE
Original Filed Dec. 29, 1958    39 Sheets-Sheet 5

Oct. 15, 1963  G. F. DALY ETAL  3,107,292
DOCUMENT PREPARATION DEVICE

Original Filed Dec. 29, 1958  39 Sheets-Sheet 9

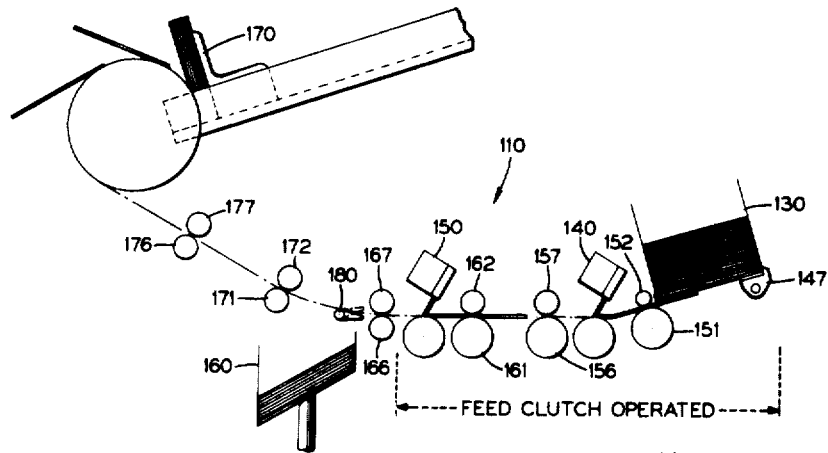
FIG. 10
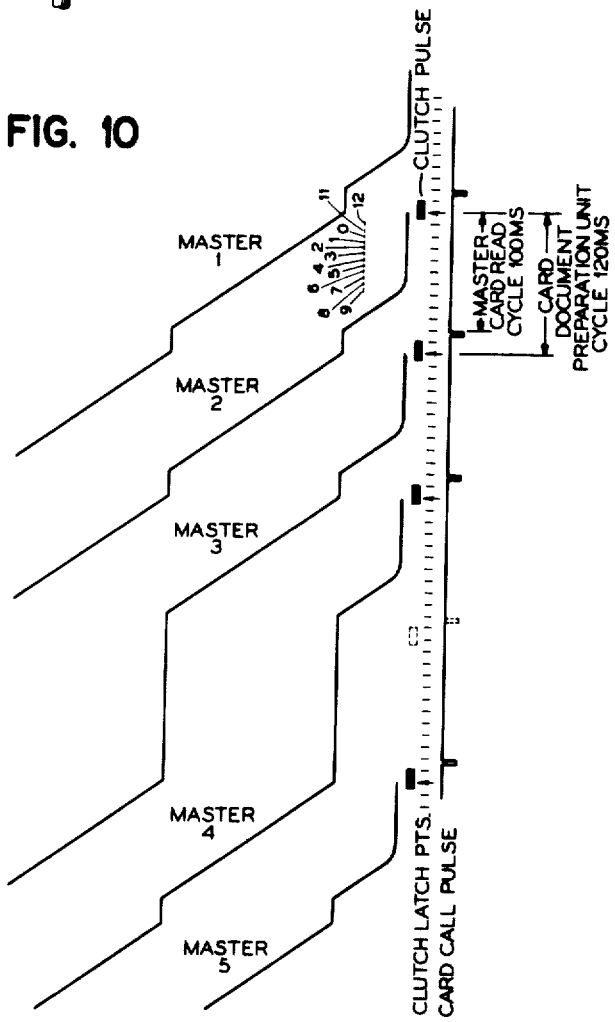

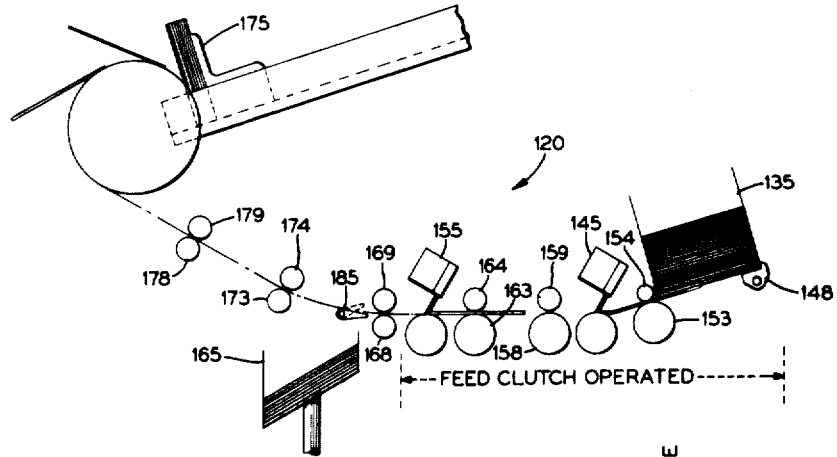
FIG. 11
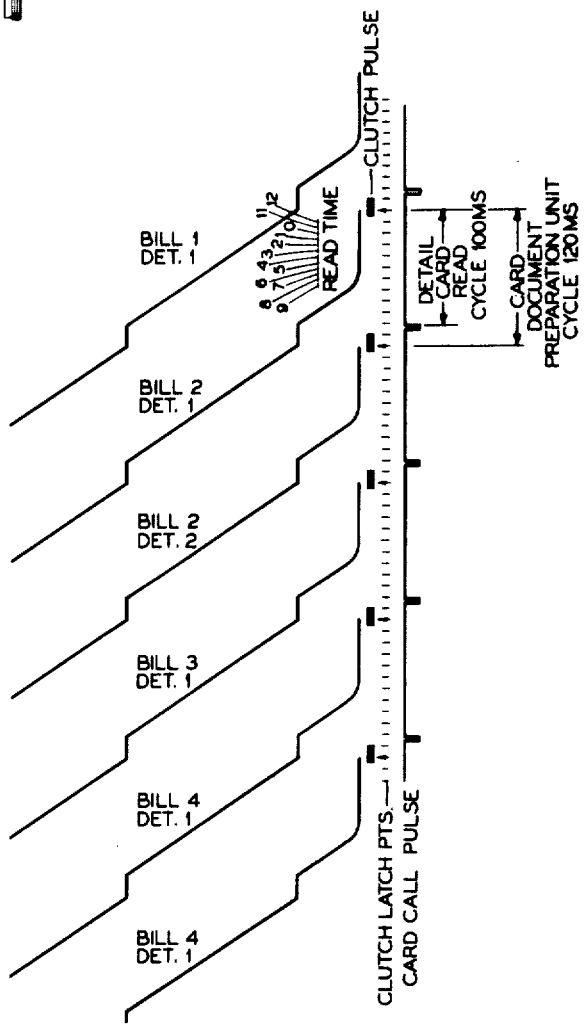

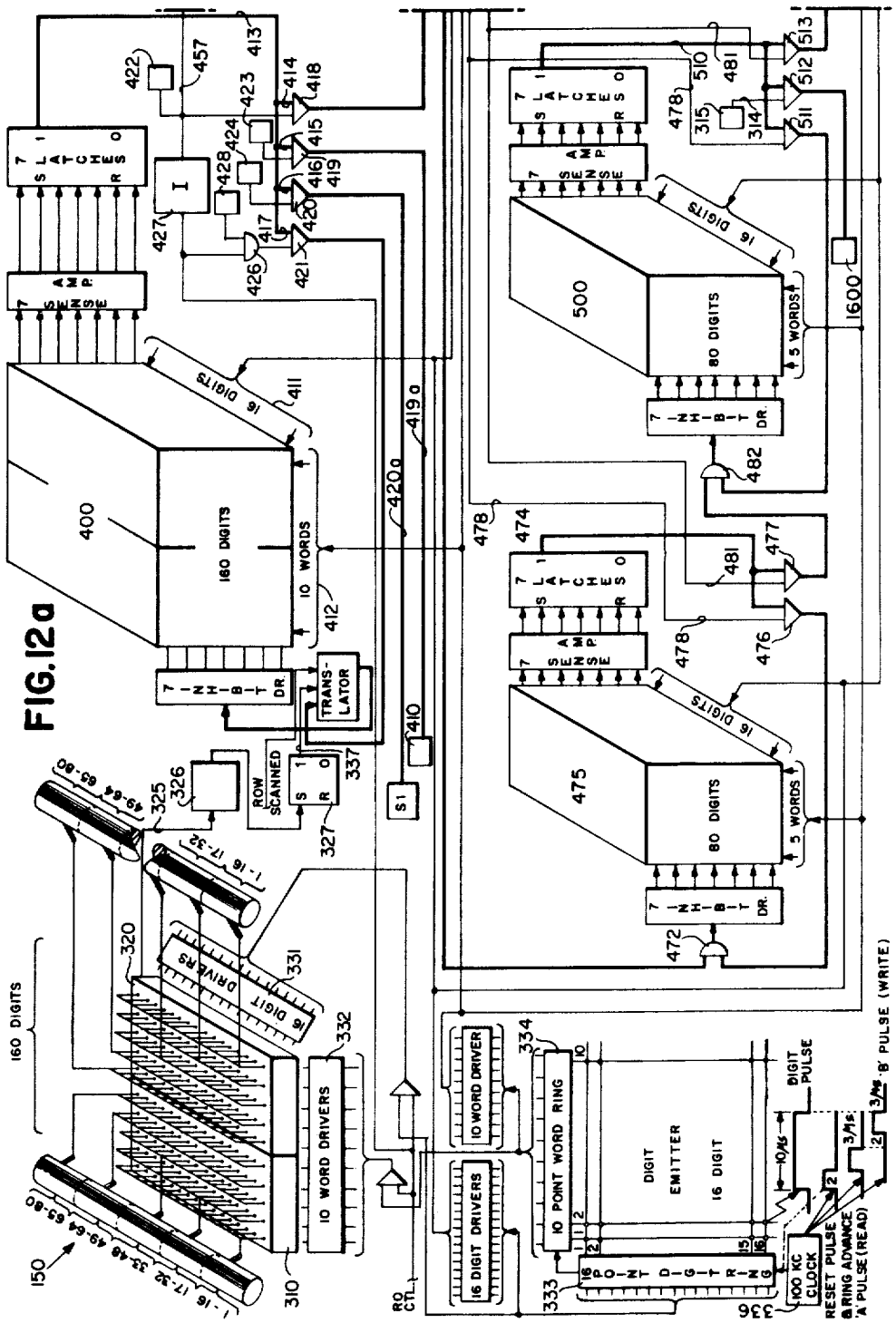

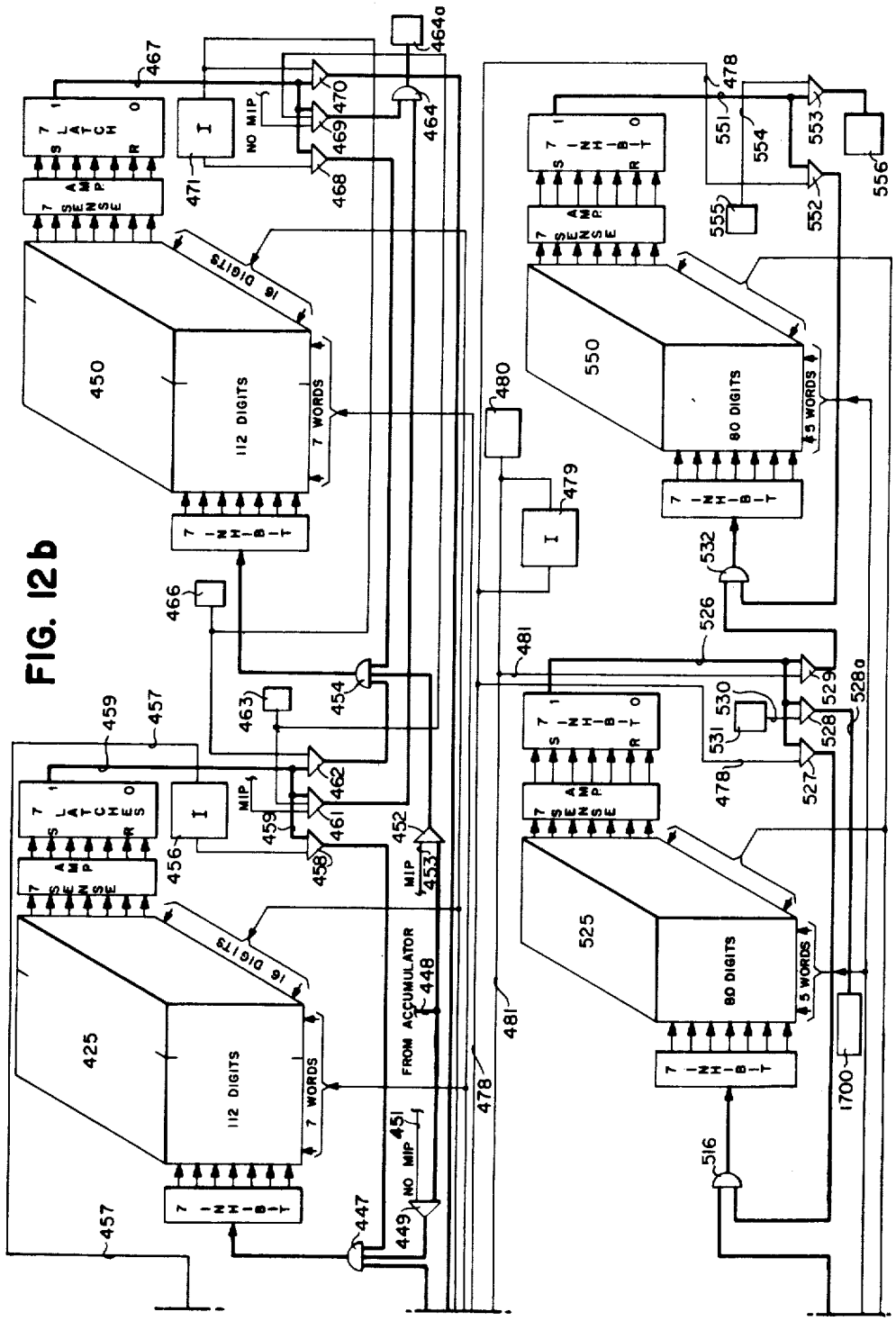

Oct. 15, 1963    G. F. DALY ETAL    3,107,292
DOCUMENT PREPARATION DEVICE
Original Filed Dec. 29, 1958    39 Sheets-Sheet 16

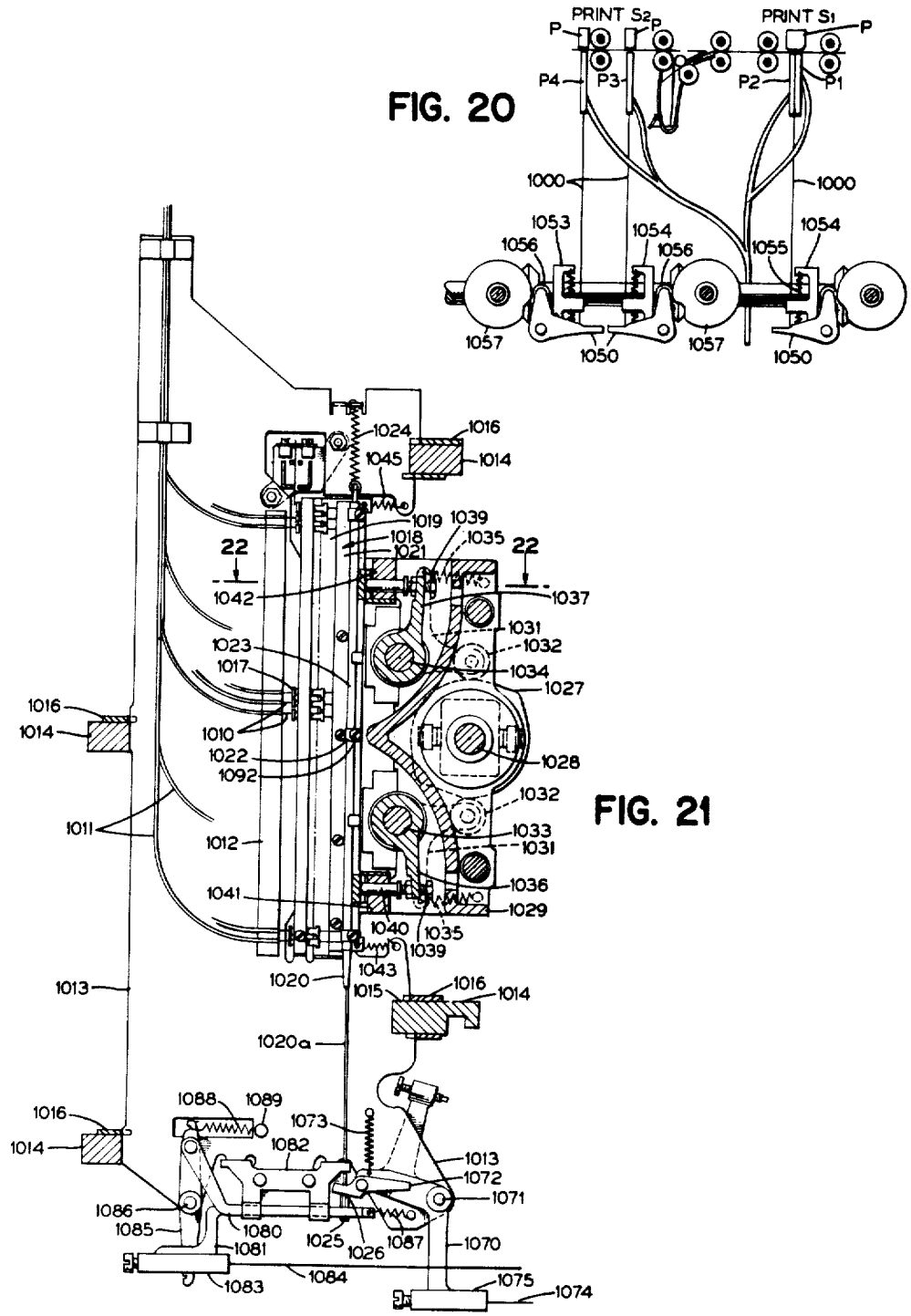

Oct. 15, 1963  G. F. DALY ET AL  3,107,292
DOCUMENT PREPARATION DEVICE
Original Filed Dec. 29, 1958  39 Sheets-Sheet 21

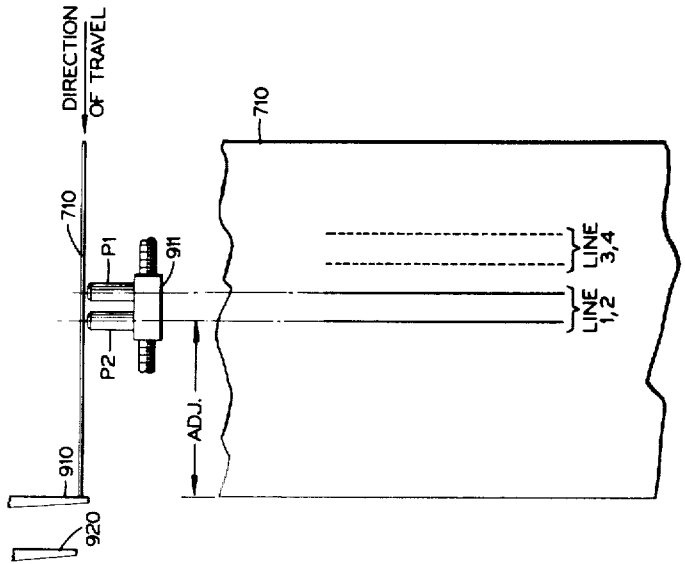
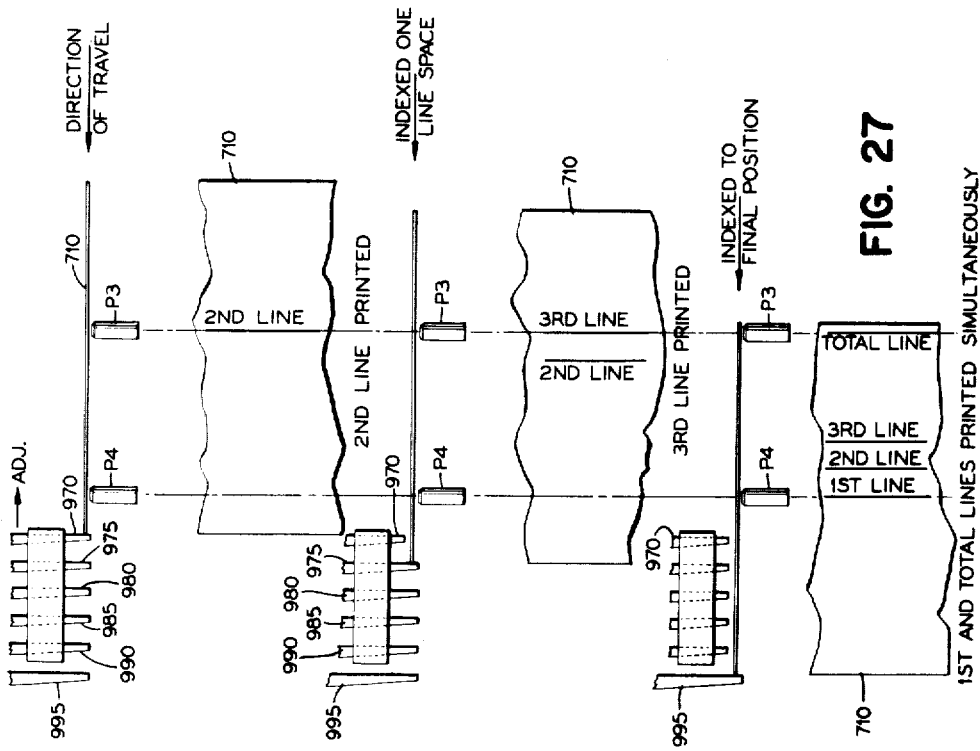

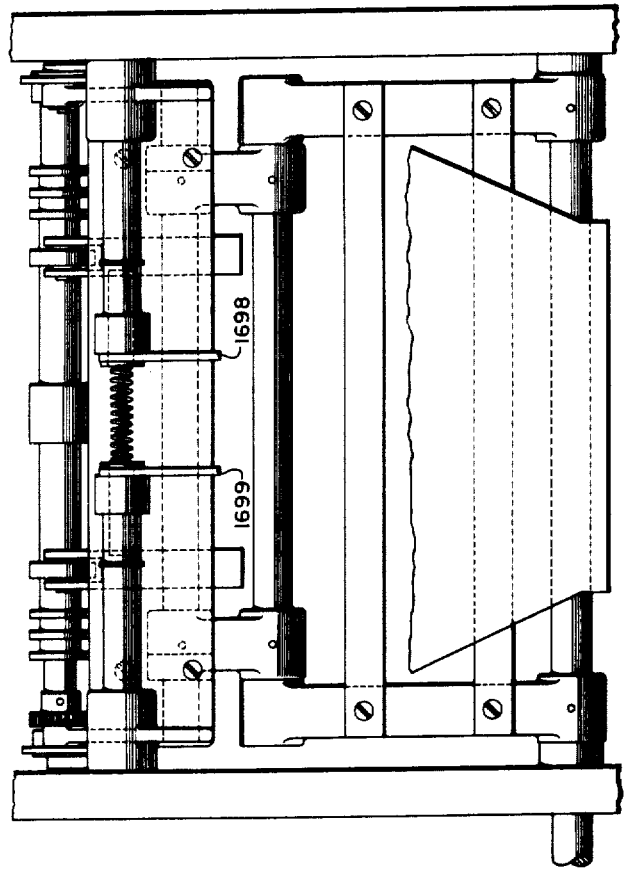
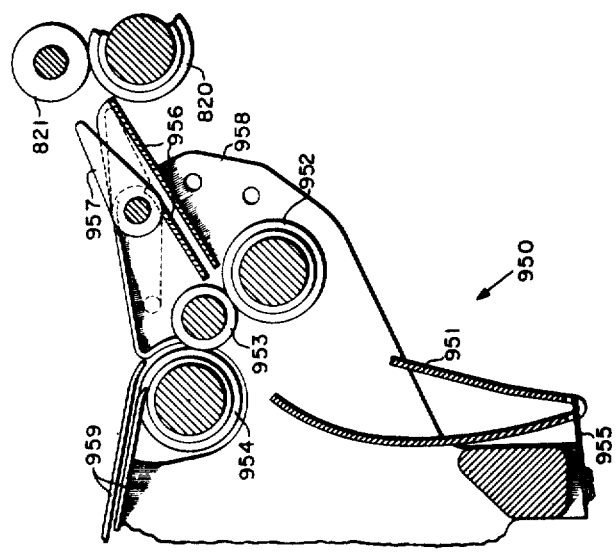

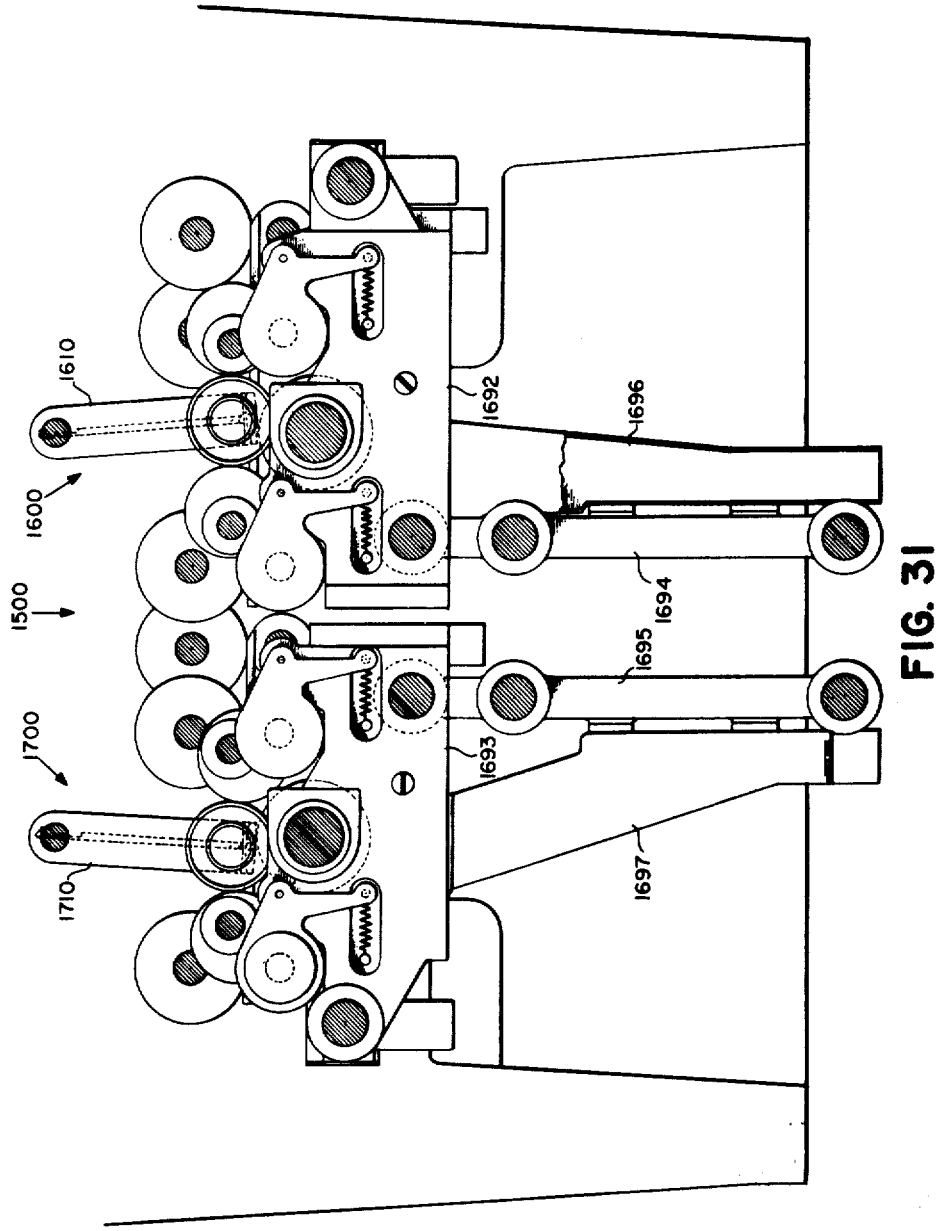

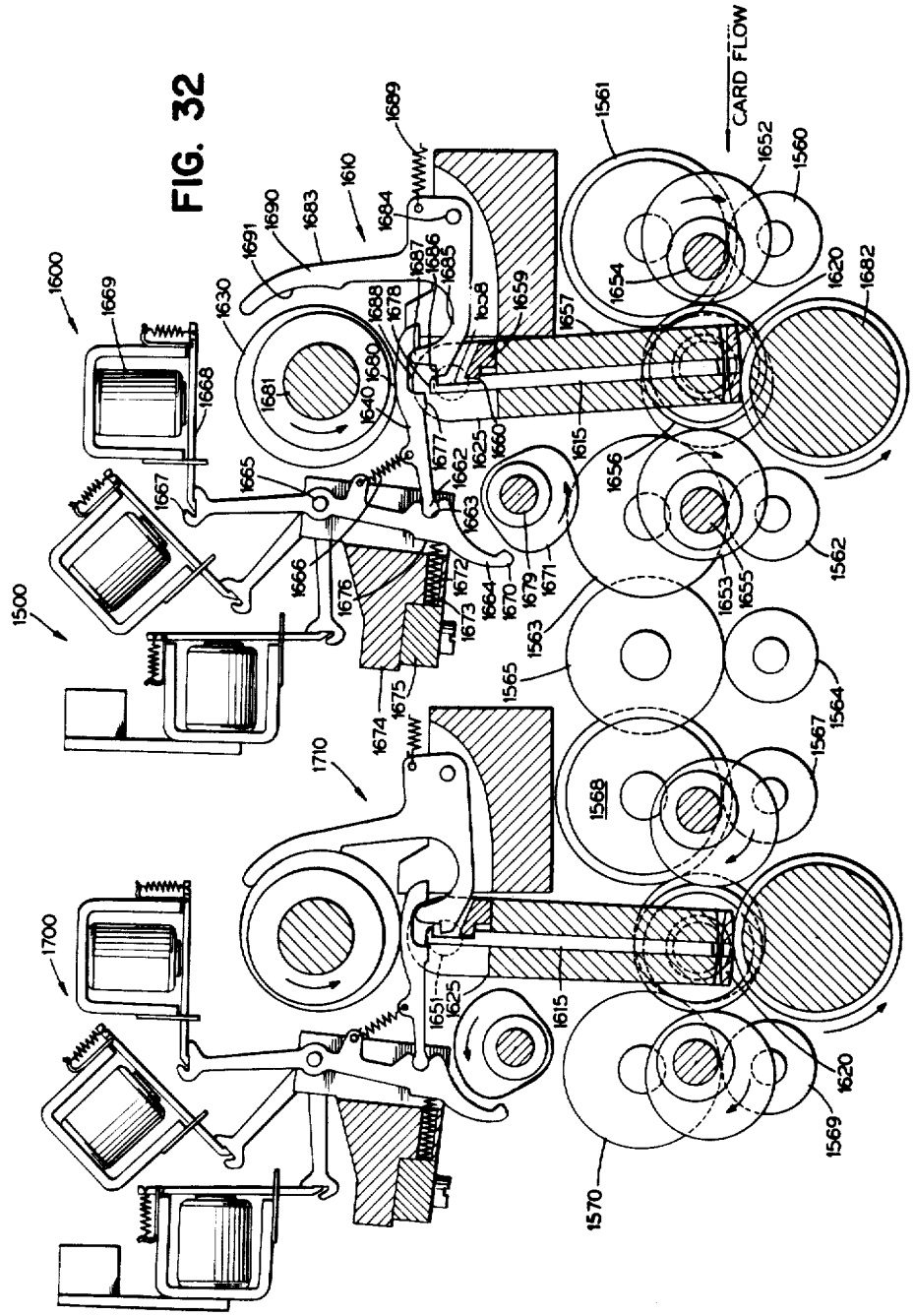

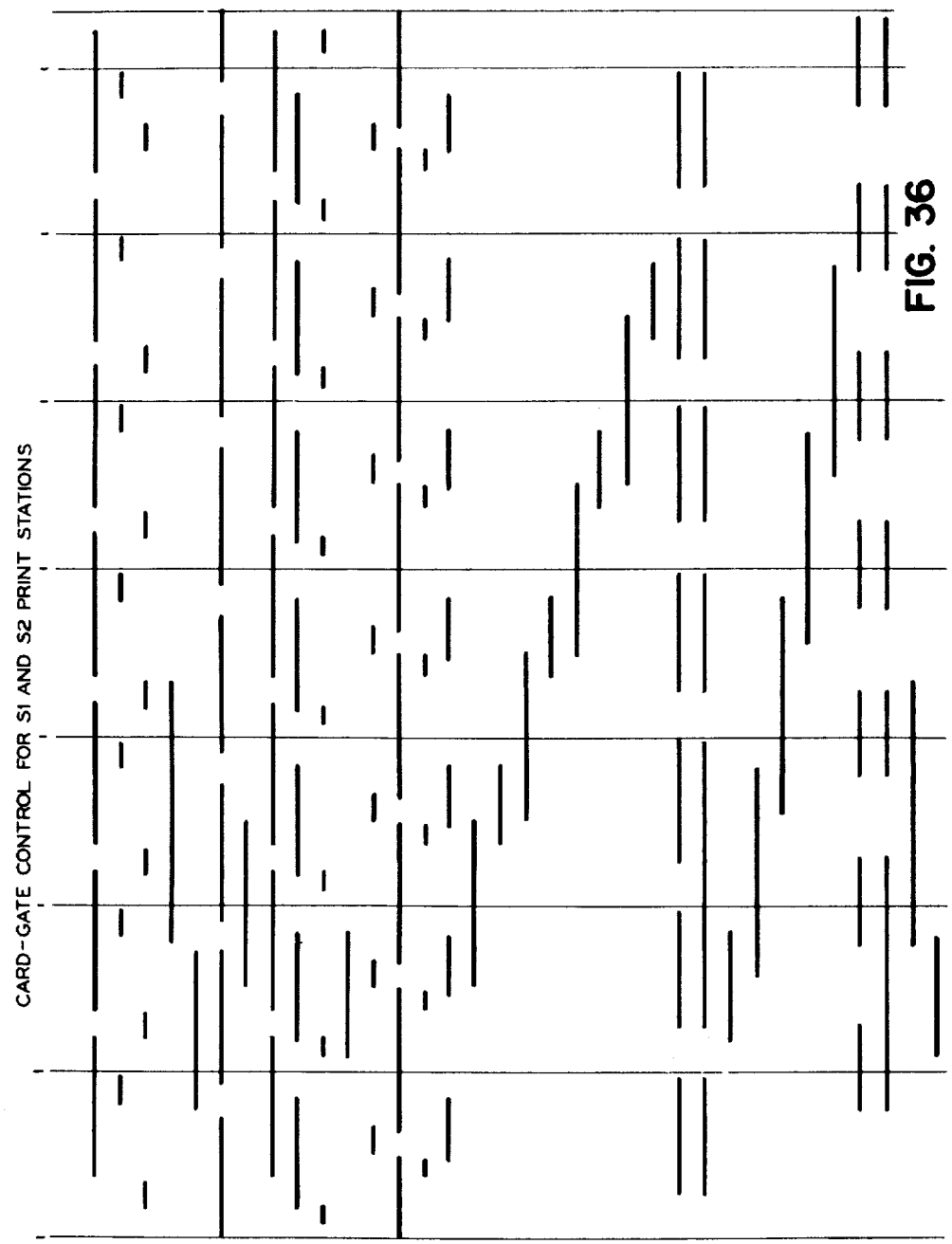

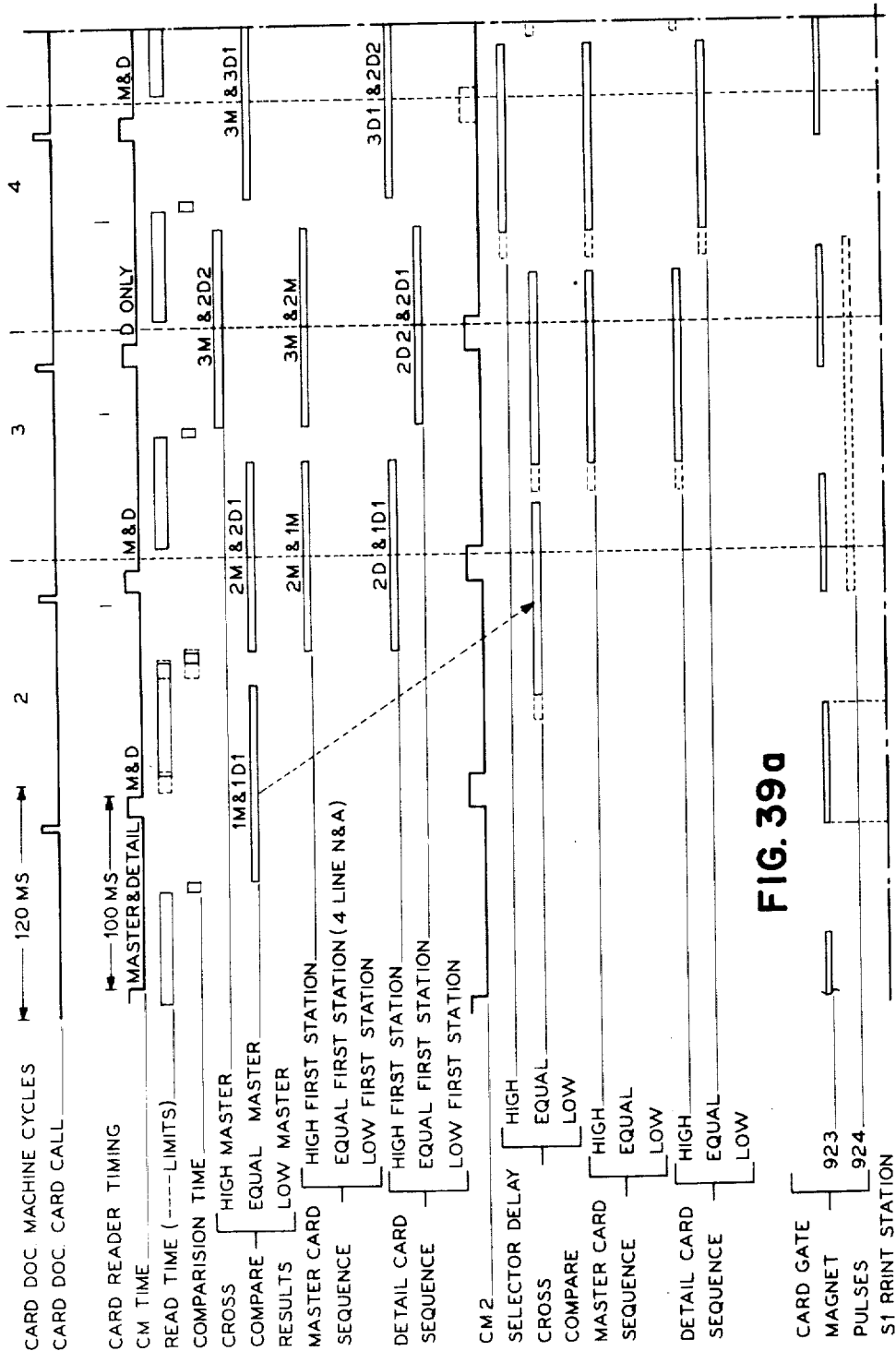

United States Patent Office

3,107,292
Patented Oct. 15, 1963

---

3,107,292
DOCUMENT PREPARATION DEVICE
George F. Daly, Endicott, and Fred Saltz, Binghamton, N.Y., assignors to International Business Machines Corporation, New York, N.Y., a corporation of New York
Original application Dec. 29, 1958, Ser. No. 783,425. Divided and this application Feb. 28, 1961, Ser. No. 92,406
13 Claims. (Cl. 235—61.7)

This invention relates to document producing devices and, more particularly, to record card controlled means for preparing documents such as public utility bills, insurance premium notices and the like by recording thereon printed and punched data in one continuous operation.

This application is a division of copending application of G. F. Daly et al., Serial No. 783,425, filed December 29, 1958.

Heretofore, these types of documents were usually produced by several independent time-consuming operations. For example, in preparation of a utility bill from perforated address and item cards, the first step after key punching and sorting into proper sequence was collating to group related cards. The second step involved accumulation of data and tabulation, or the actual printing of the accumulated data. This often involved a third operation or step to effect printing of an address on one face of the bill, which is usually opposite to the face carrying the item data. A fourth step involved concerned the perforation of the records upon the return of a stub with payment. In the present invention, all of these afore-mentioned operations or steps are combined in a unitary processing operation by means of coordinated document producing devices.

In addition to the improvement provided by a unitary processing operation, the apparatus of the present invention is arranged to be fully utilized at all times so as to function in a manner to increase the speed of operation.

Further, in many instances, the documents being prepared to bear data in both printed and punched form will have a different number of lines of data and, therefore, will require discrete handling. Provision has been made, not only to accommodate this situation, but to do so as if every document prepared were the same. Hence, the speed of operation will be maintained.

One of the most important characteristics of the invention which makes it particularly efficient in its operation resides in the capabilities of the print mechanism. In any machine which is required to effect print impressions upon record cards, it is always necessary to allot a significant portion of each over-all machine cycle to the function of transporting the cards into and out of the print position. This particular problem is enlarged and becomes more difficult to solve in the instance where the printing mechanism operates according to a subcycle arrangement as in serial-parallel printing. In the present invention, printing takes place at two different print stations to complete the printing of any one card document. While printing occurs in serial-parallel fashion over a period of a predetermined number of subcycles, the card documents are transported into and out of print positions to permit the printing mechanism to operate at a high cyclic rate. Hence, during any one printing cycle, in the first portion thereof, one of the card documents is in transit and moving toward one of the printing positions while another card document is at rest receiving print impressions at the other printing position; and, during the latter portion of the print cycle, these functions are reversed. It is by this arrangement that the print mechanism is able to operate continuously at a particular cyclic rate, which is independent of the time requirements of the card transport mechanism.

Therefore, it is a principal object of the present invention to provide apparatus for preparing record card documents bearing data in both printed and punched form which enables the printing mechanism to operate continuously and independent of the time requirements for transport of the card documents.

Another very important object of the invention is to provide apparatus for producing record card documents bearing information in both printed and punched form which includes printing mechanisms operating continuously at a high cyclic rate to effect print impressions in serial-parallel fashion during a predetermined number of subcycles constituting the print cycle, whereby, in the first portion of the print cycle, one of the card documents is in motion while another card document is at rest receiving print impressions and, during another portion of the print cycle, these functional relationships are reversed so as to permit continuous operation of the printing mechanism.

Another important object of the invention is to provide an arrangement of apparatus for producing record card documents which utilizes the information recording apparatus to a greater extent.

Another main object of the invention is to provide apparatus for the production of documents bearing data in both printed and punched form which are produced in one continuous operation from a plurality of data sources.

Another object of this invention is to provide apparatus for the production of documents bearing data in both printed and punched form in one continuous operation from a plurality of data sources which is utilized in a manner to increase the over-all speed of operation.

Still another object of the invention is to provide apparatus for the production of documents bearing data in both printed and punched form in one continuous operation from a plurality of data sources which is capable of producing the documents at substantially the same rate of speed even though the documents so produced vary as to the number of lines of information thereon.

A more specific object of this invention is to provide controlled recording devices operated from a plurality of record card sources and the collation of information therefrom simultaneously with the recording operation.

Another more specific object of the invention is to provide apparatus for sensing a plurality of sets of records in continuous motion and the combined simultaneous recording therefrom of address information, as well as item and other data information, for rapid production of printed and punched documents.

Still another more specific object of this invention is to provide apparatus for perforating documents to be sent to customers directly from the control or original source records in a manner which avoids a second punch operation after the documents are returned by the customers so that the original information is ready for further accounting operations.

A further object of this invention is the arrangement of all controlling operations which phases the same so that a plurality of sensing, printing and punching operations are effected on different source records and documents being produced at the same time to effect extremely rapid operation.

An additional object of the invention is to provide apparatus which has controls for transferring information from one information storage device to another in synchronism with the movement of the source records and document records being prepared to permit ready reference to the storage devices for control of any of the accumulating, printing and punching functions.

Still another additional object of the invention is to provide apparatus for printing data upon the documents being produced at a plurality of related printing stations, where certain data is printed at one of the stations upon one face of the documents and certain other data is printed at another station upon an opposite face of the documents.

A further additional object of the invention is to provide apparatus for printing data upon the documents being produced at a plurality of related printing stations which share a common print control mechanism for economic purposes.

A still further additional object of the invention is to provide apparatus for punching coded data into the documents being produced at a plurality of related punching stations which punches certain data into the documents at one of the punching stations while moving relative thereto and punches certain other data into the documents at another punching station while moving relative thereto.

The foregoing and other objects, features and advantages of the invention will be apparent from the following more particular description of a preferred embodiment of the invention, as illustrated in the accompanying drawings.

In the drawings:

FIG. 1 is a front elevational view of the card document preparation unit with a portion of the cover broken away to show the various machine elements;

FIGS. 2a, 2b, 2c and 2d, taken together, in the manner shown in FIG. 3, schematically illustrate the card document preparation unit and the flow of card documents therethrough for both single and multiple item card documents;

FIG. 8 is a diagrammatic view of the three detail cards containing item information appearing on the reverse face of the card documents, as in FIG. 7;

FIG. 9 is a view of the master card containing the name and address information appearing on the obverse face of the record card document, as shown in FIG. 6;

Figures 13, 14:
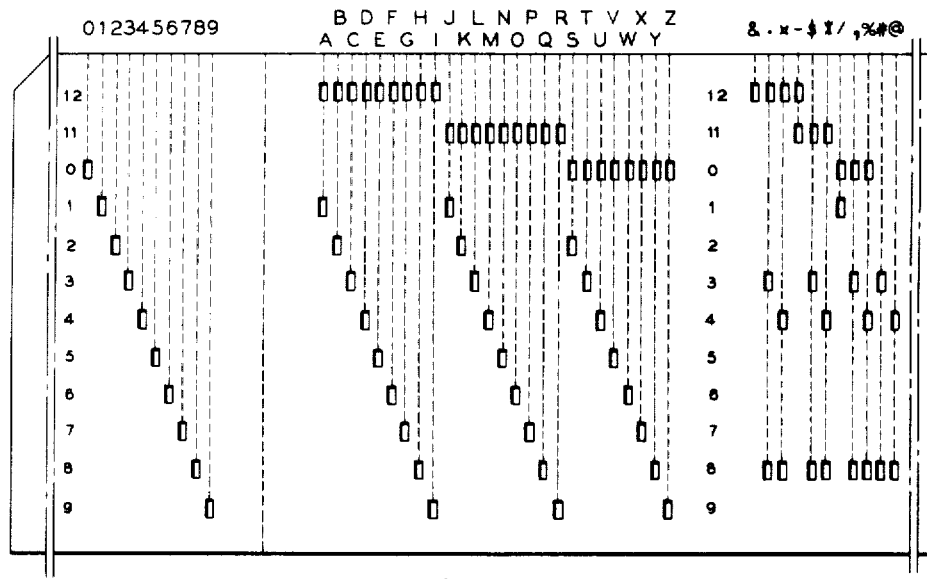
Figure 15:
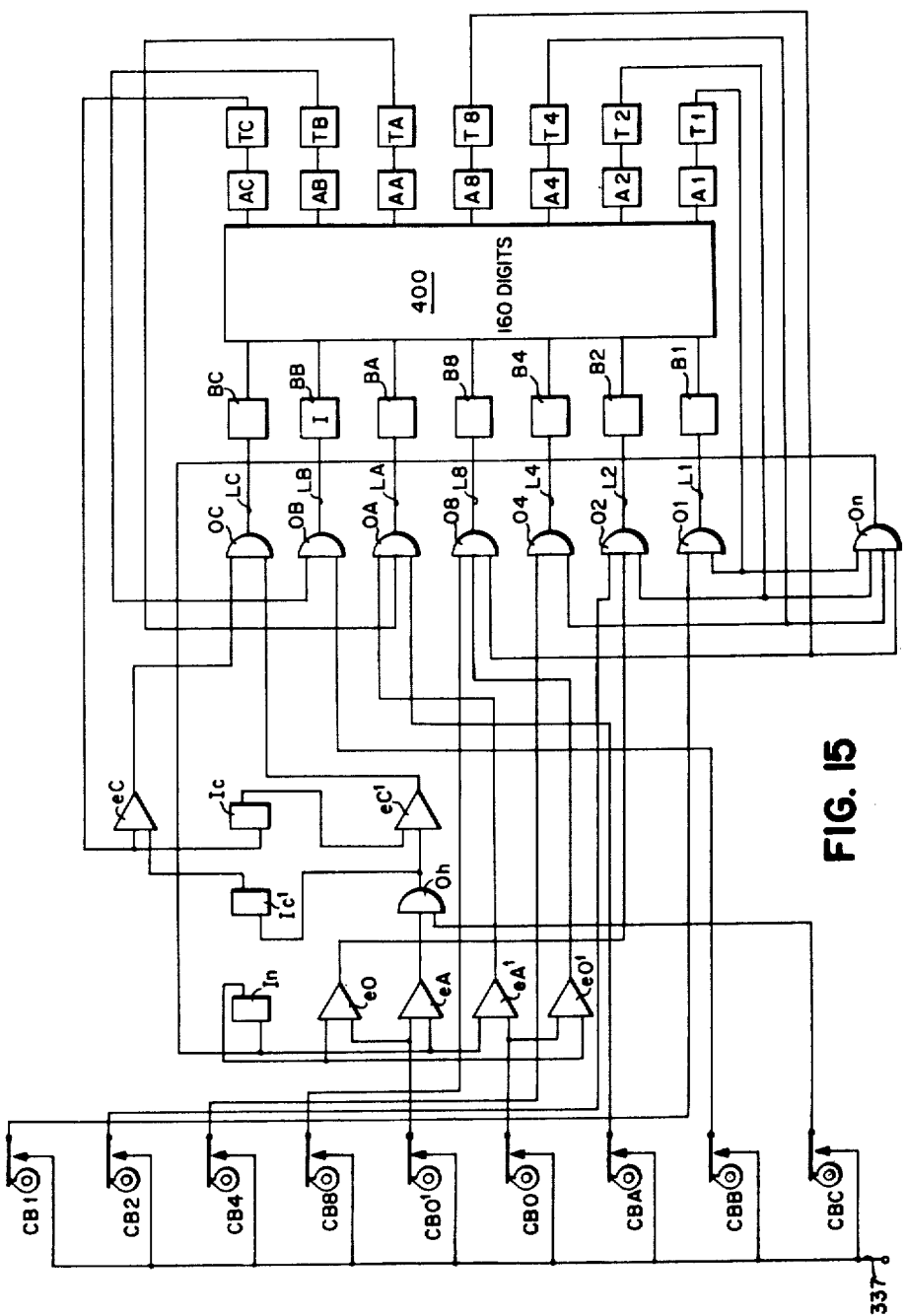
Figure 16:
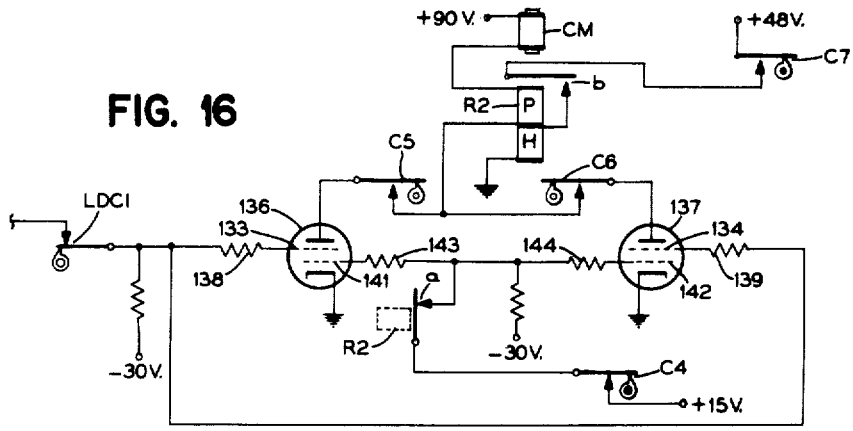
Figure 17:
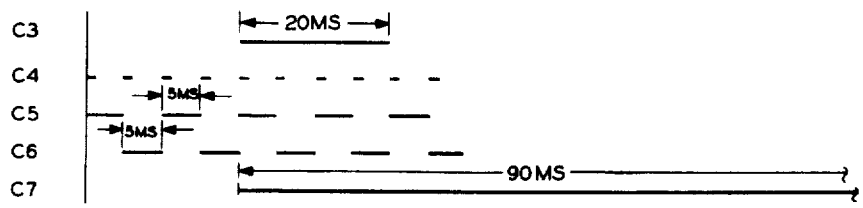
Figure 18:
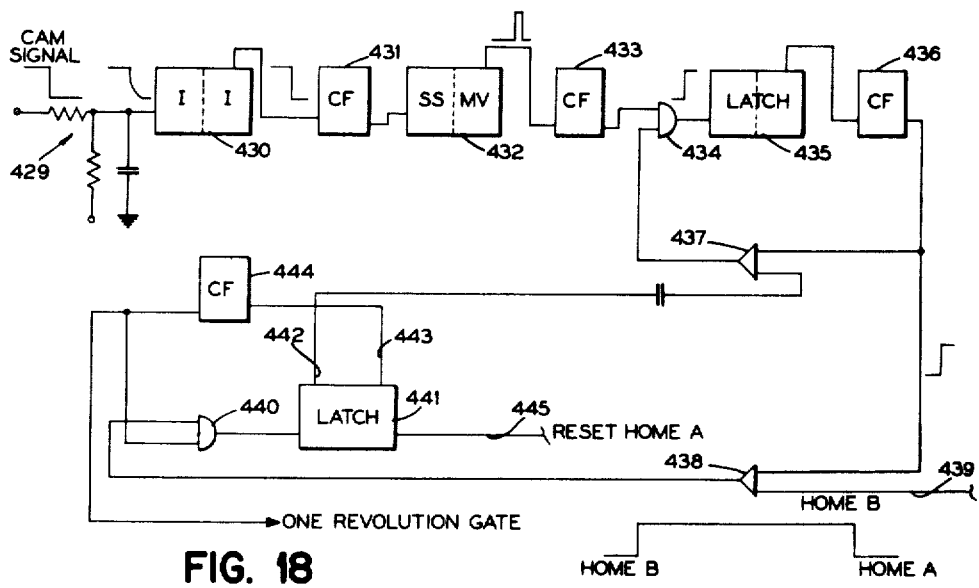
Figure 19:
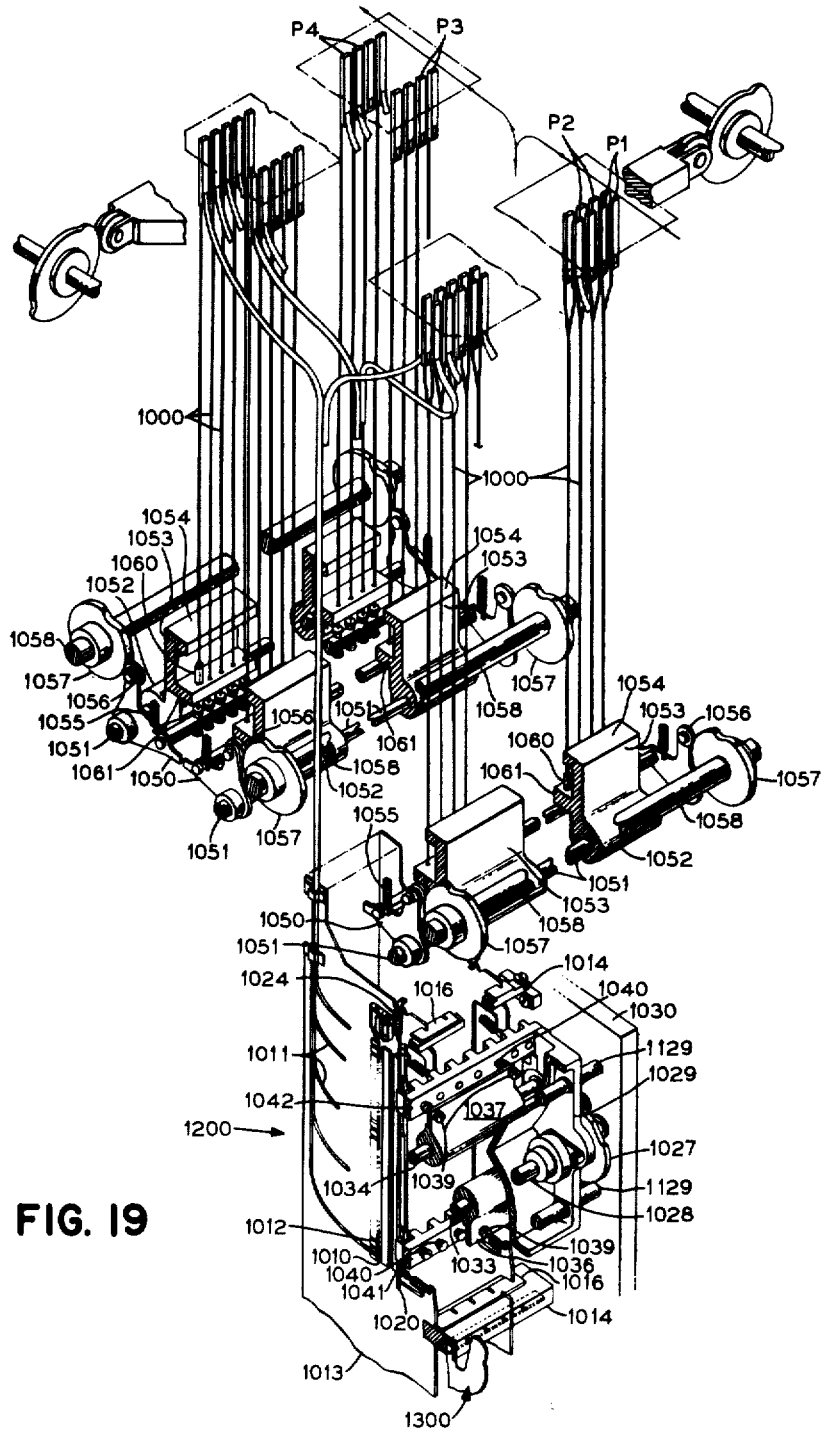
Figure 23:
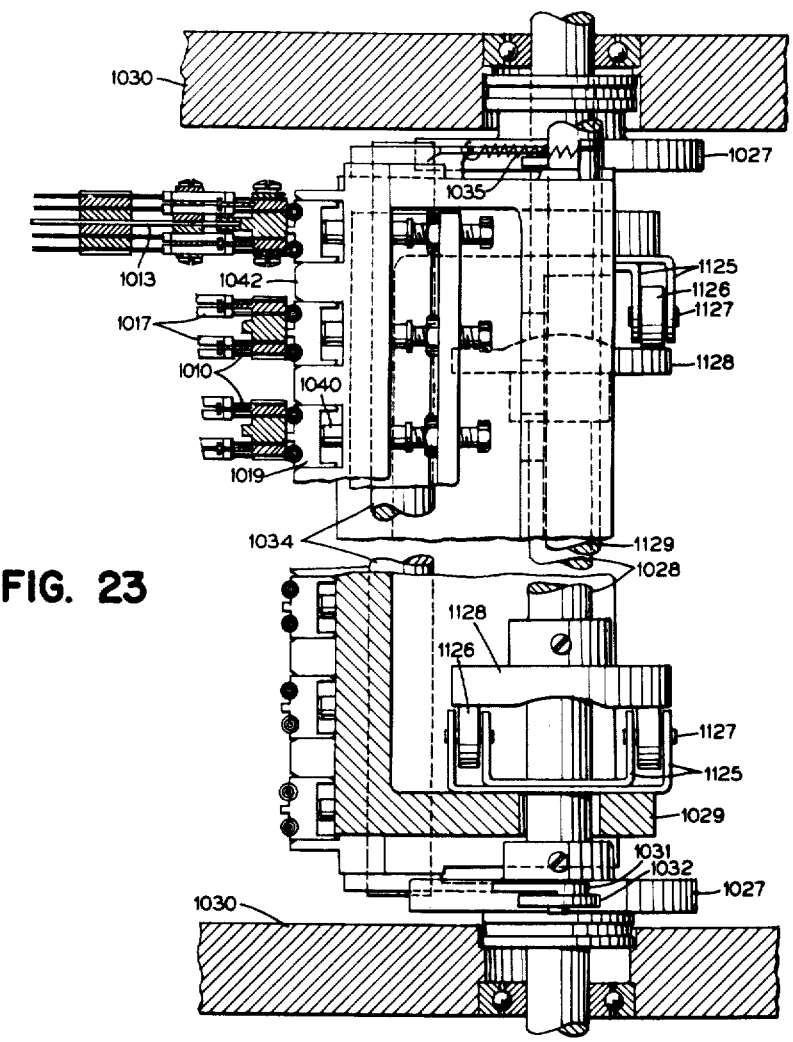
Figure 22:
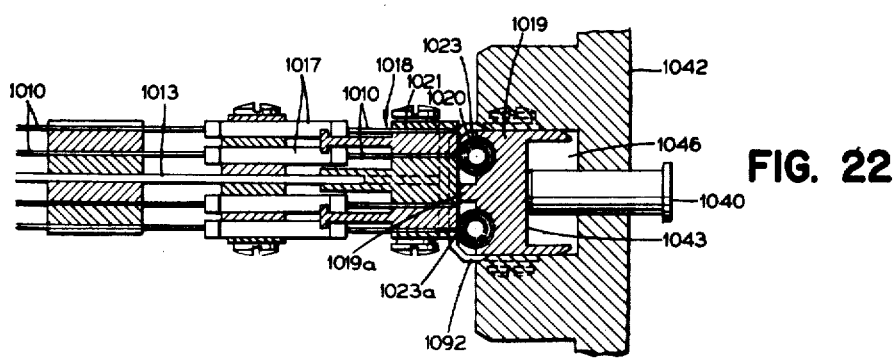
Figure 24:
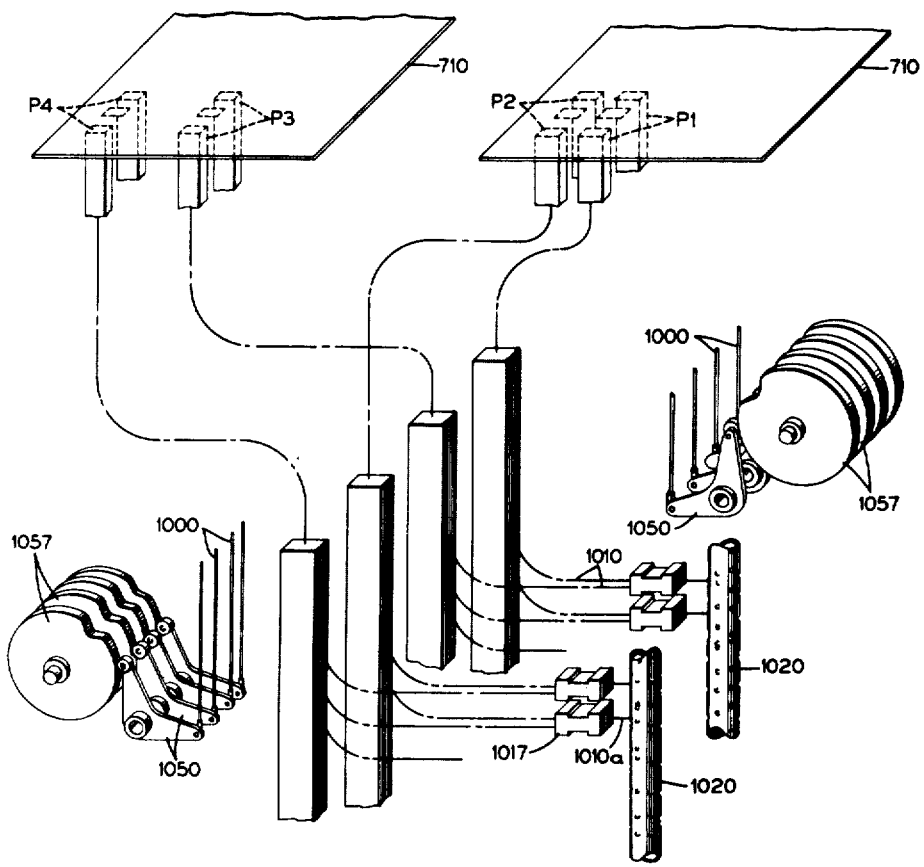
Figure 25:
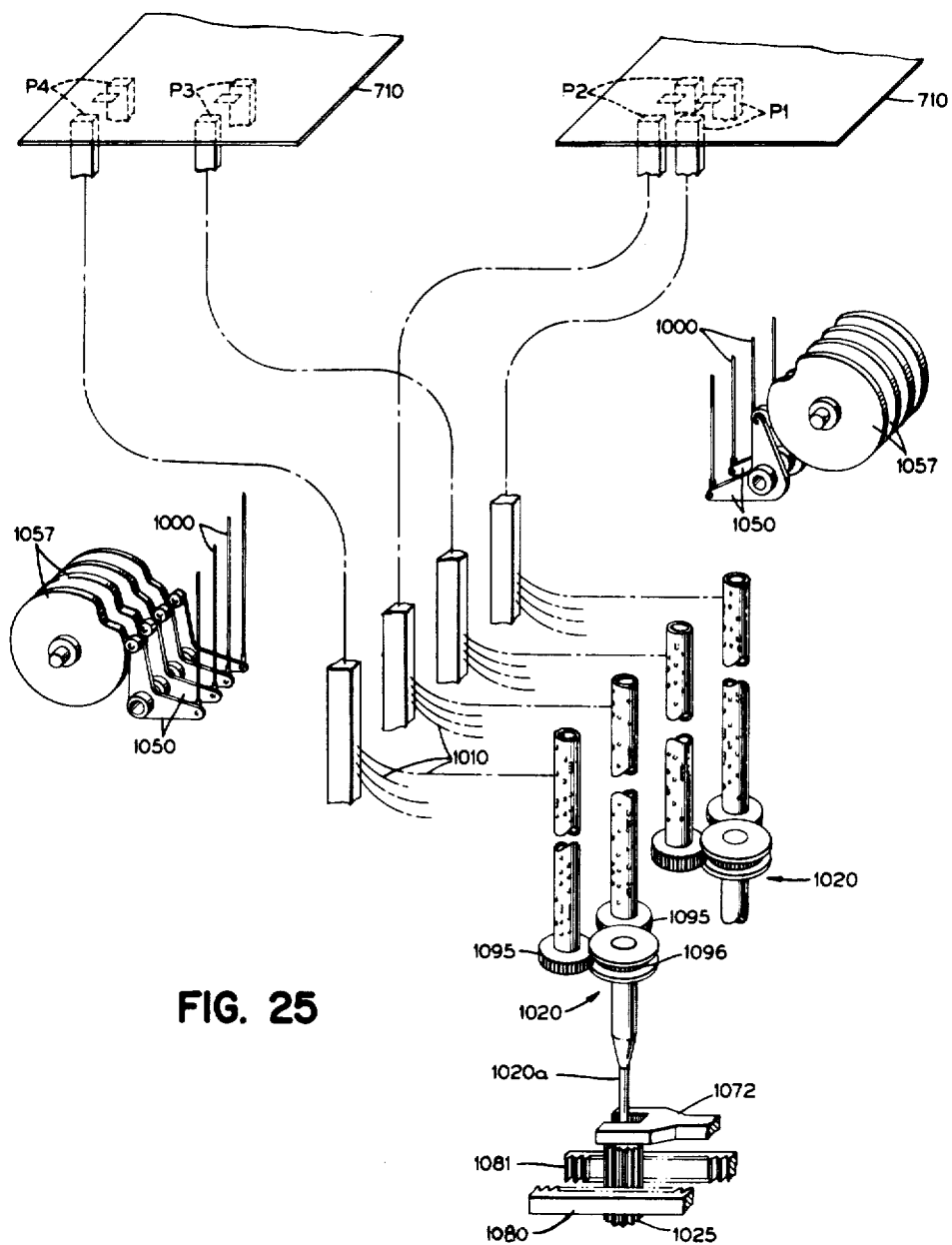
Figure 28:
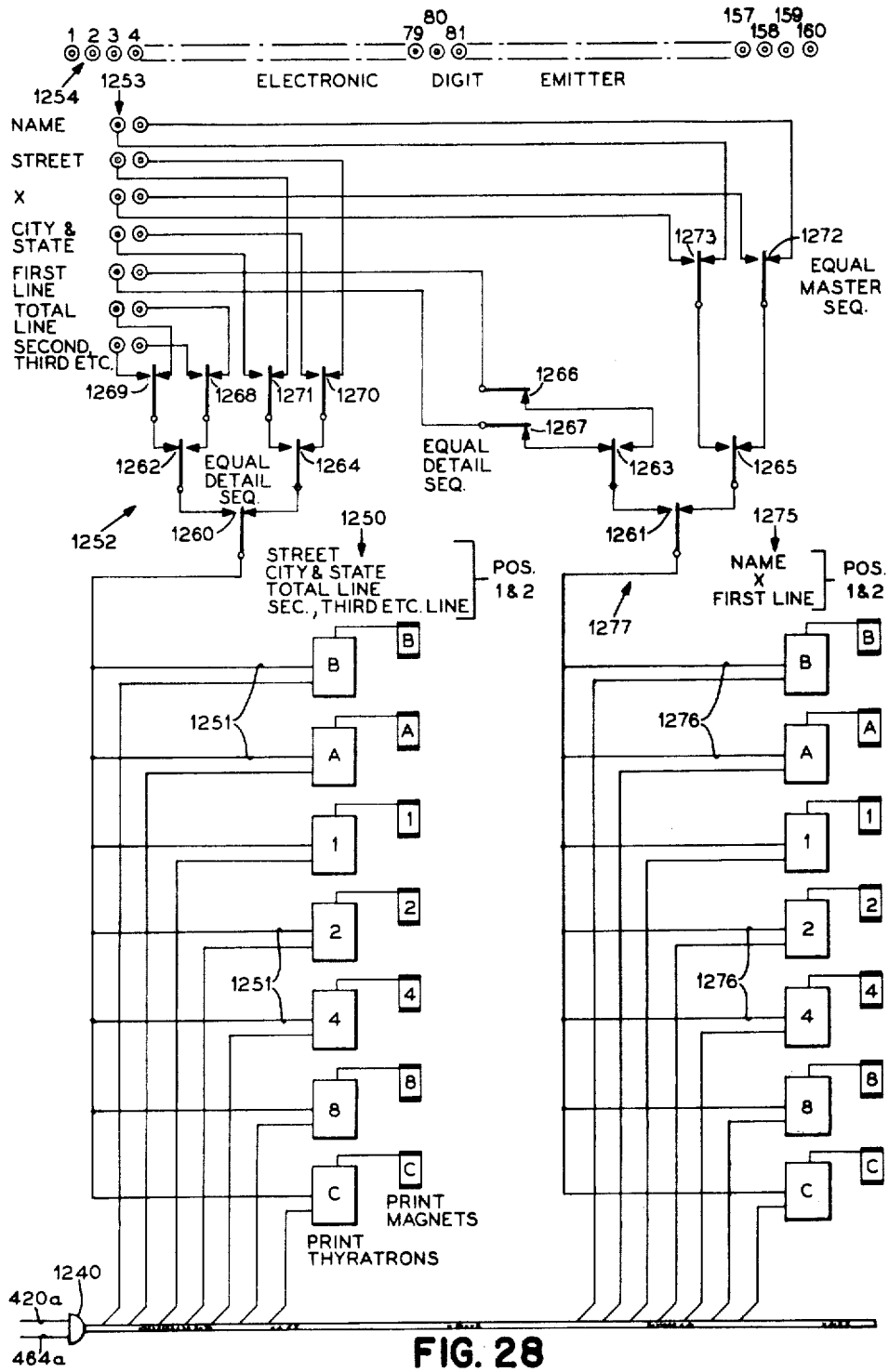
Figure 33:
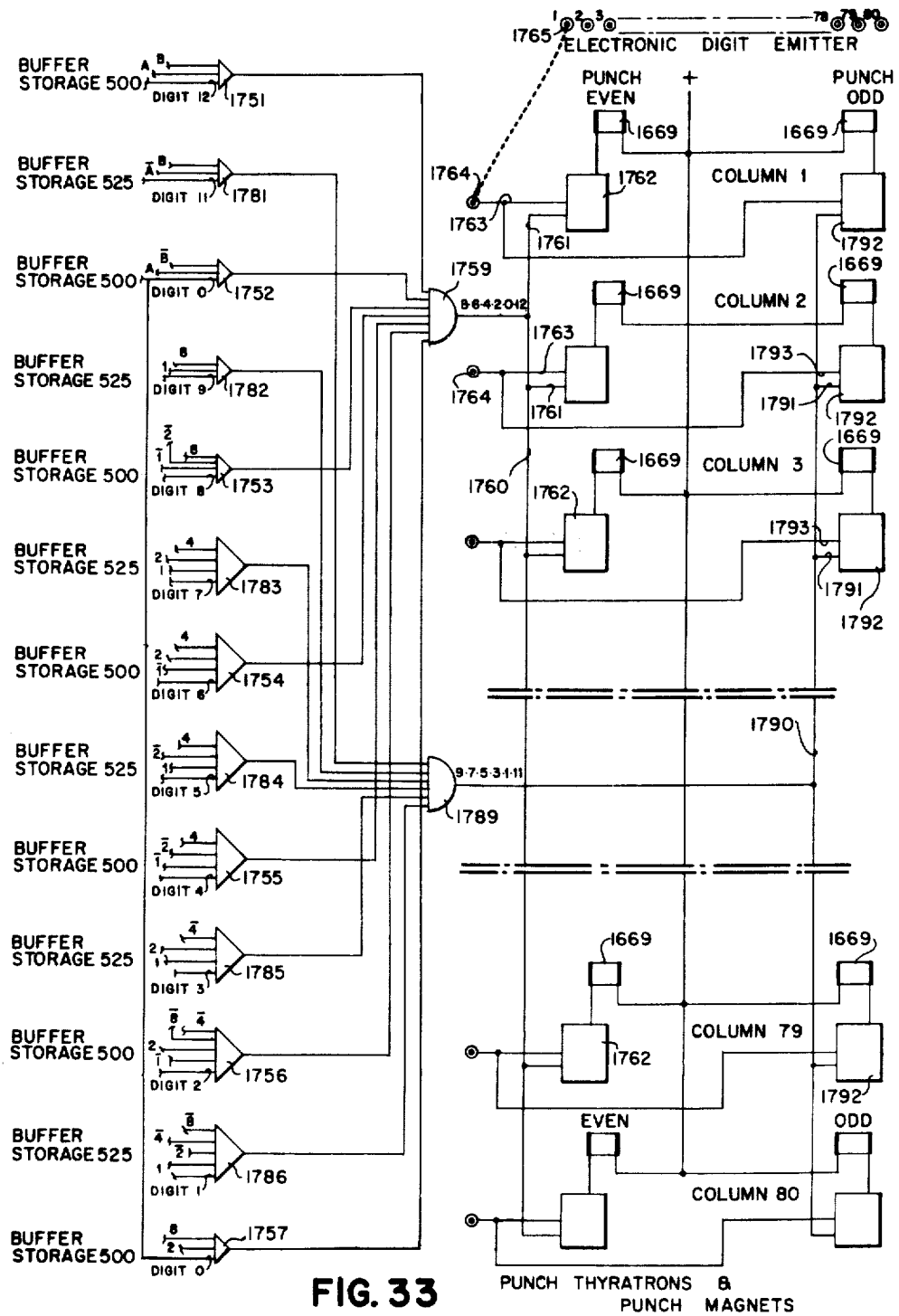
Figure 34A:
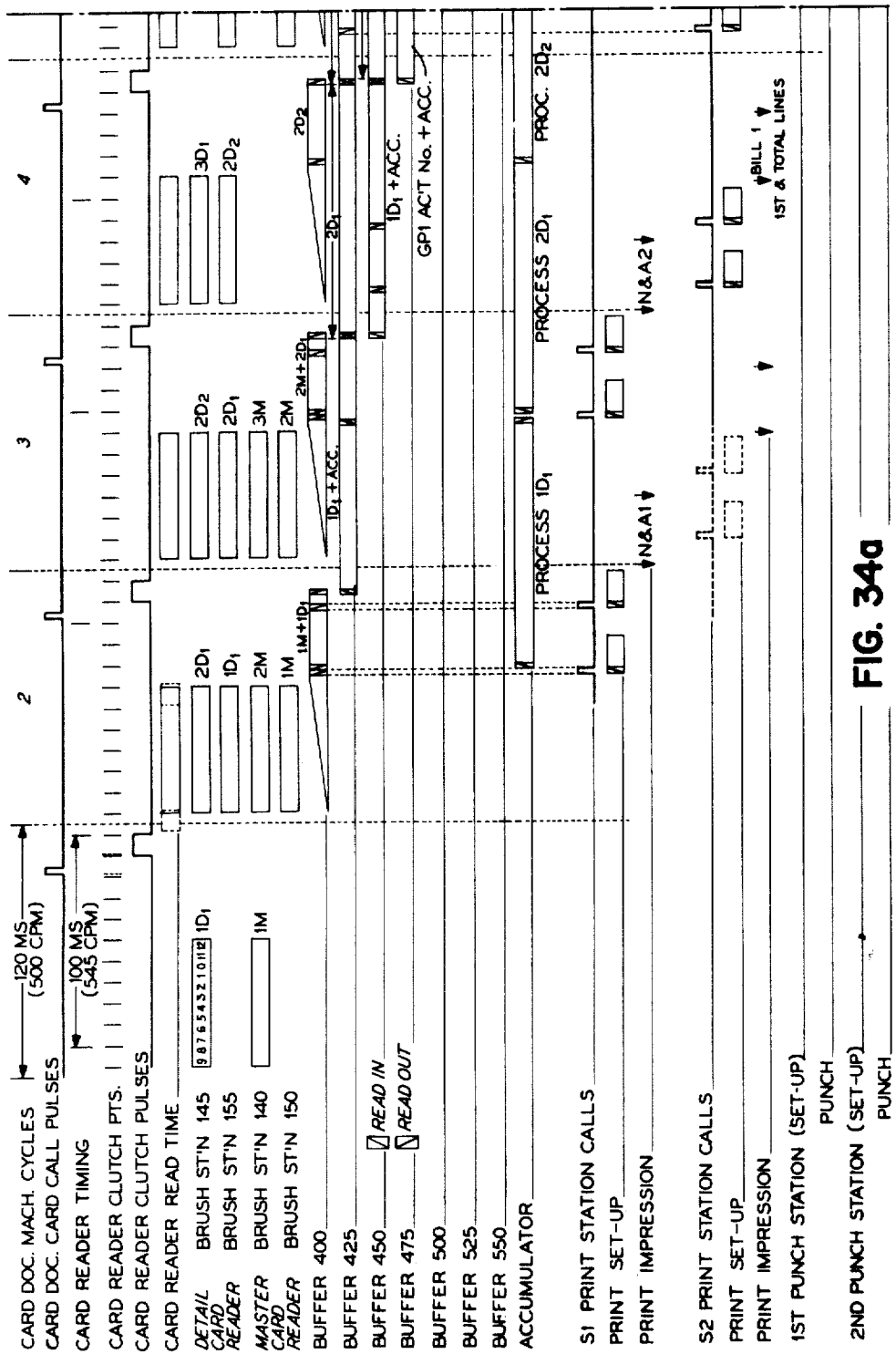
Figure 34B:
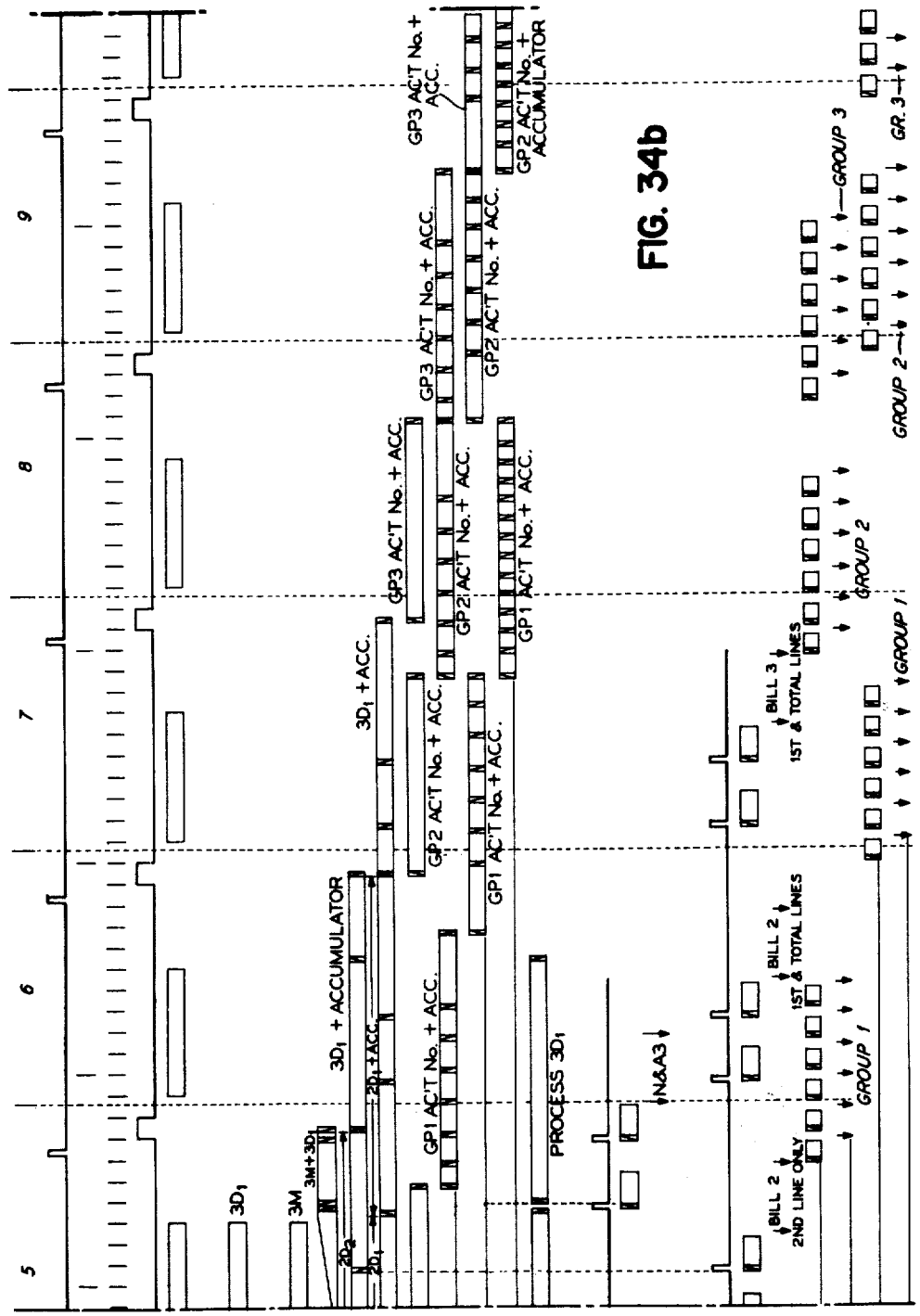
Figure 35A:
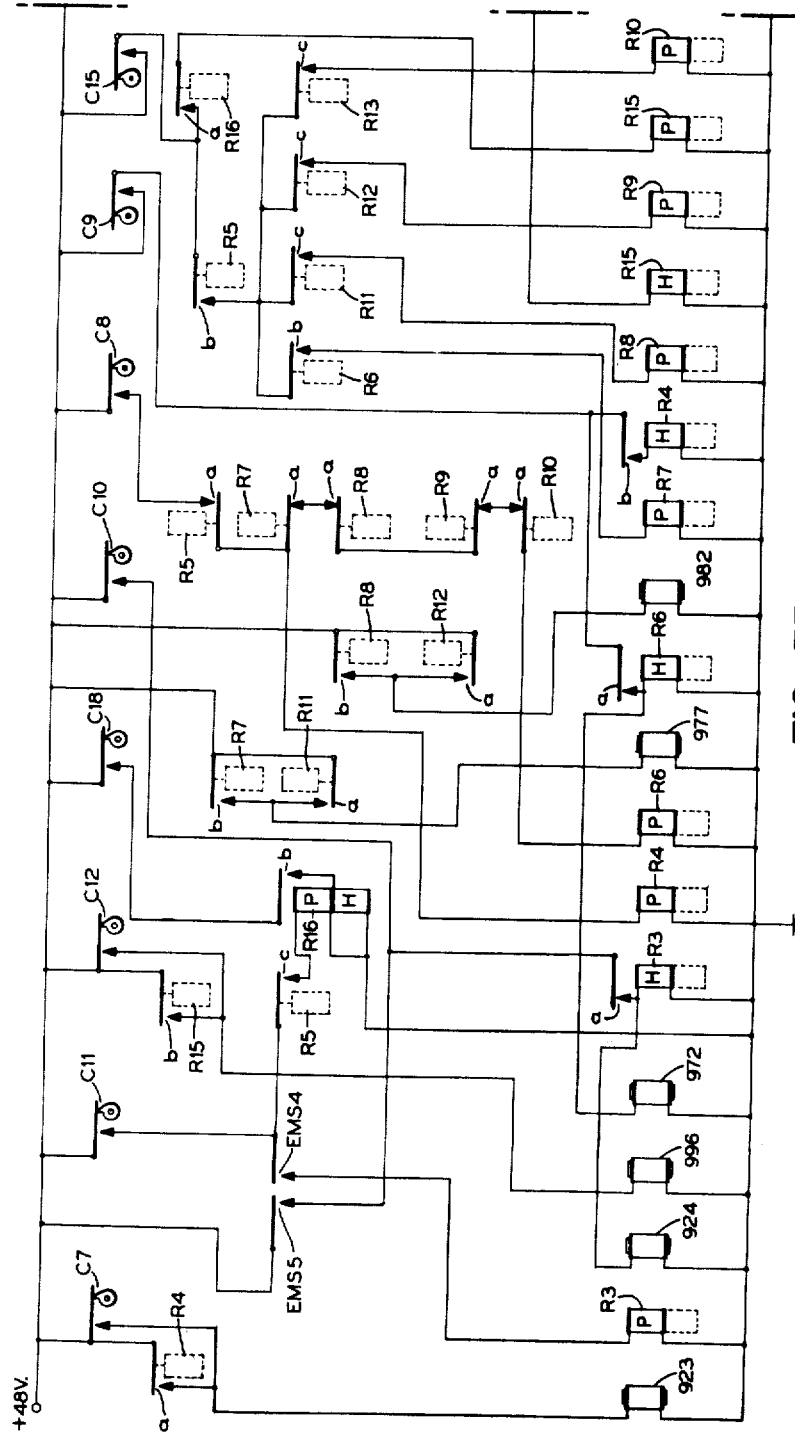
Figure 35B:
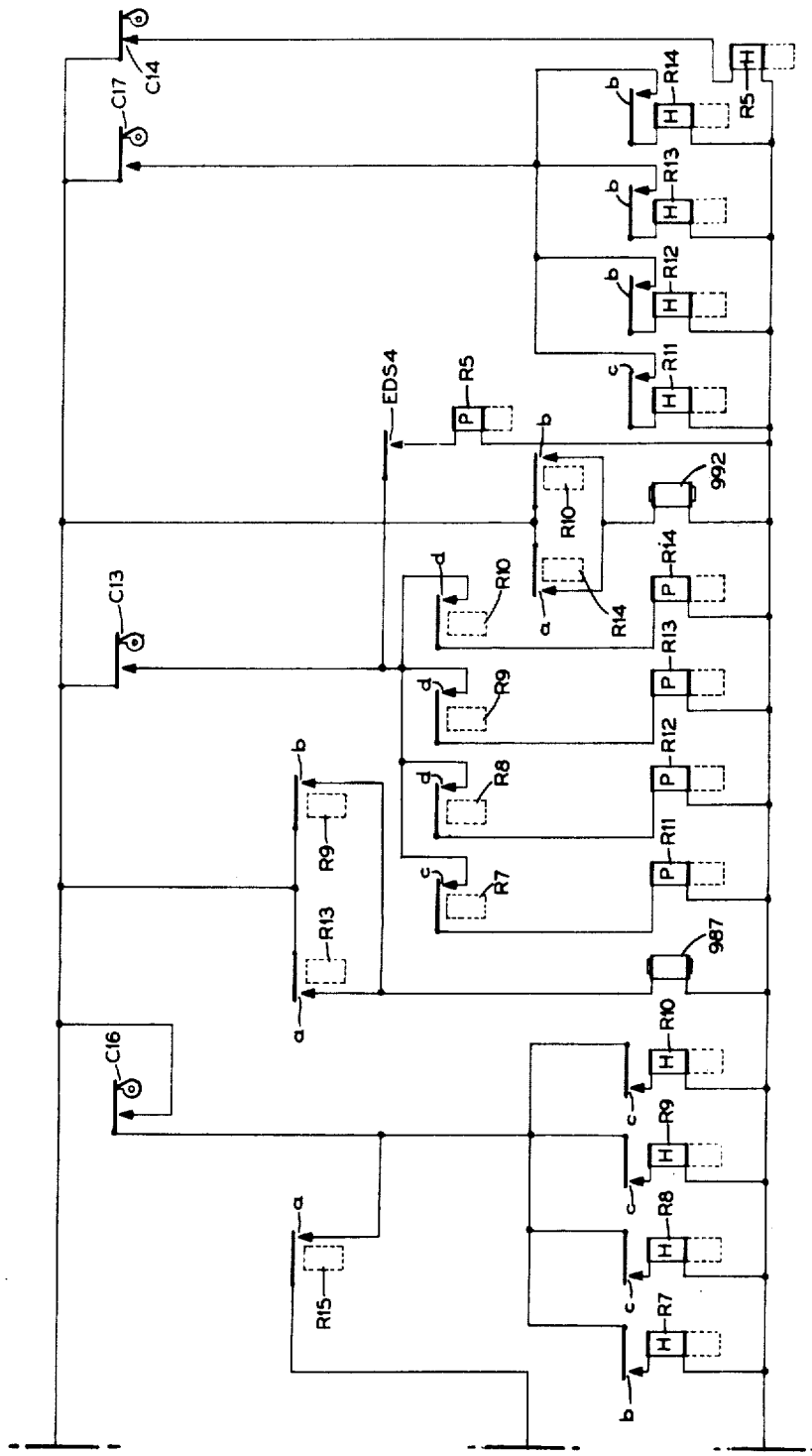

FIG. 10 schematically illustrates the master card reader unit and the flow of the master cards therethrough;

FIG. 11 schematically illustrates the detail card reader unit and the flow of detail cards therethrough;

FIGS. 12a and 12b, with FIG. 12b disposed to the right of FIG. 12a, taken together, are a diagrammatic showing of the translator for translating IBM code into 7-bit code and of the buffer storage elements and their associated control elements;

FIG. 13 is a view of a record card containing perforations to represent the IBM code;

FIG. 14 is a code representation of a record card translated to represent the 7-bit code;

FIG. 15 is a logic diagram of the translator for translating information from the IBM code to the 7-bit code;

FIG. 16 is a circuit diagram of the clutch circuitry for the master and detail card reader units;

FIG. 17 is a timing diagram of the cam-operated contacts involved in the clutch circuitry shown in FIG. 16;

FIG. 18 is a circuit diagram of a typical data storage transfer gate for enabling transfer of data from the buffer storage elements;

FIG. 19 is a perspective view of the print mechanism at the first and second print stations including the common print setup mechanism shared by the print mechanisms;

FIG. 20 is a schematic view of the print head actuating mechanism for effecting print impressions at the first and second print stations;

FIG. 21 is a side elevational view of the print setup mechanism for the code rod shift arrangement;

FIG. 22 is a sectional view taken on the line 21—21 in FIG. 21;

FIG. 23 is a sectional view of the mechanism for shifting the code rods relative to the control ends of the matrix wires;

FIG. 24 is a schematic view showing the Y-wire arrangement for sharing the print setup mechanism between the print mechanisms at the first and second print stations;

FIG. 25 is a schematic view showing the double code rod arrangement for sharing the print setup mechanism between the print mechanisms at the first and second print stations;

FIG. 26 is a schematic view showing the relative positions of the card document with respect to the card gates at the first print station;

FIG. 27 is a schematic view showing the relative positions of the card document with respect to the card gates at the second print station;

FIG. 28 is a circuit diagram of the circuitry for controlling the firing of the print thyratrons for energizing the print setup magnets;

FIG. 29 is a detail view of the card document inverter mechanism for inverting the card documents in passing from the first to the second print stations;

FIG. 30 is a right end elevational view of the mechanism associated with the punching units at the first and second punch stations;

FIG. 31 is a front elevational view of the mechanism associated with the punching units at the first and second punch stations;

FIG. 32 is a detail view of the punching units, including the punch magnets and punch setup mechanisms at the first and second punch stations (the punch and die assembly at the first punching station is shown at the instant of starting the forward swing; while the punch and die assembly at the second punch station is still travelling forward, all elements are shown in their exact relative positions);

FIG. 33 is a circuit diagram of the circuitry for controlling the firing of the punch thyratrons connected to energize the punch magnets;

FIGS. 34a and 34b, with FIG. 34b disposed to the right of FIG. 34a, taken together, constitute a diagrammatic showing of data flow from the master and detail record card reader units to the buffer storage elements and from the buffer storage elements to the print, punch and check stations of the card document preparation unit;

FIGS. 35a and 35b, with FIG. 35b disposed to the right of FIG. 35a, constitute a circuit diagram of the relay and cam-operated contact circuitry for controlling the operation of the card gate magnets at the first and second print stations;

FIG. 36 is a timing diagram for the relays, card gate magnets, and cam-operated contacts shown in FIGS. 35a and 35b.

Figure 40:
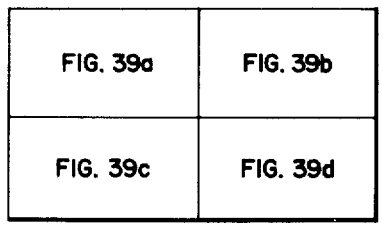
Figure 37A:
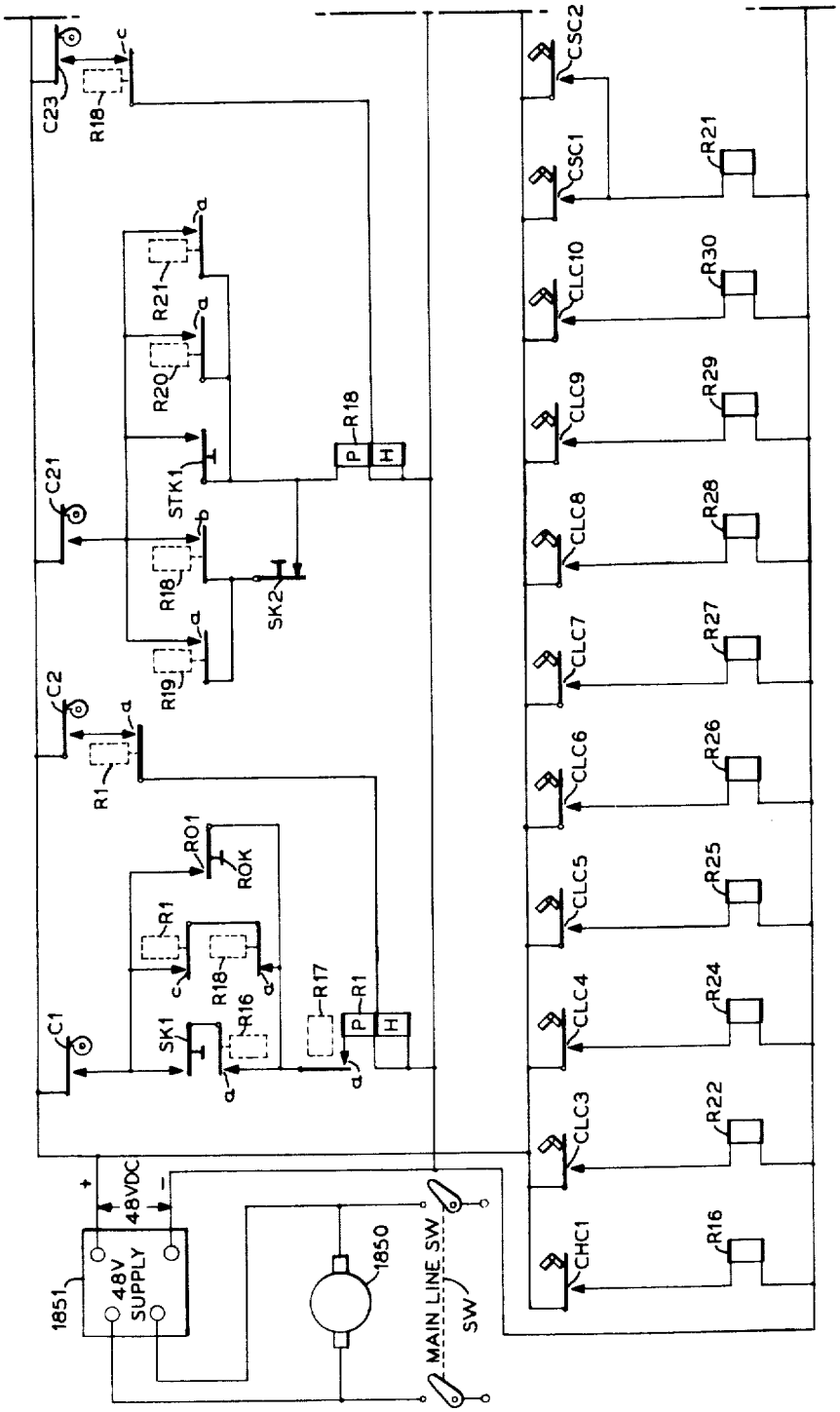
Figure 37B:
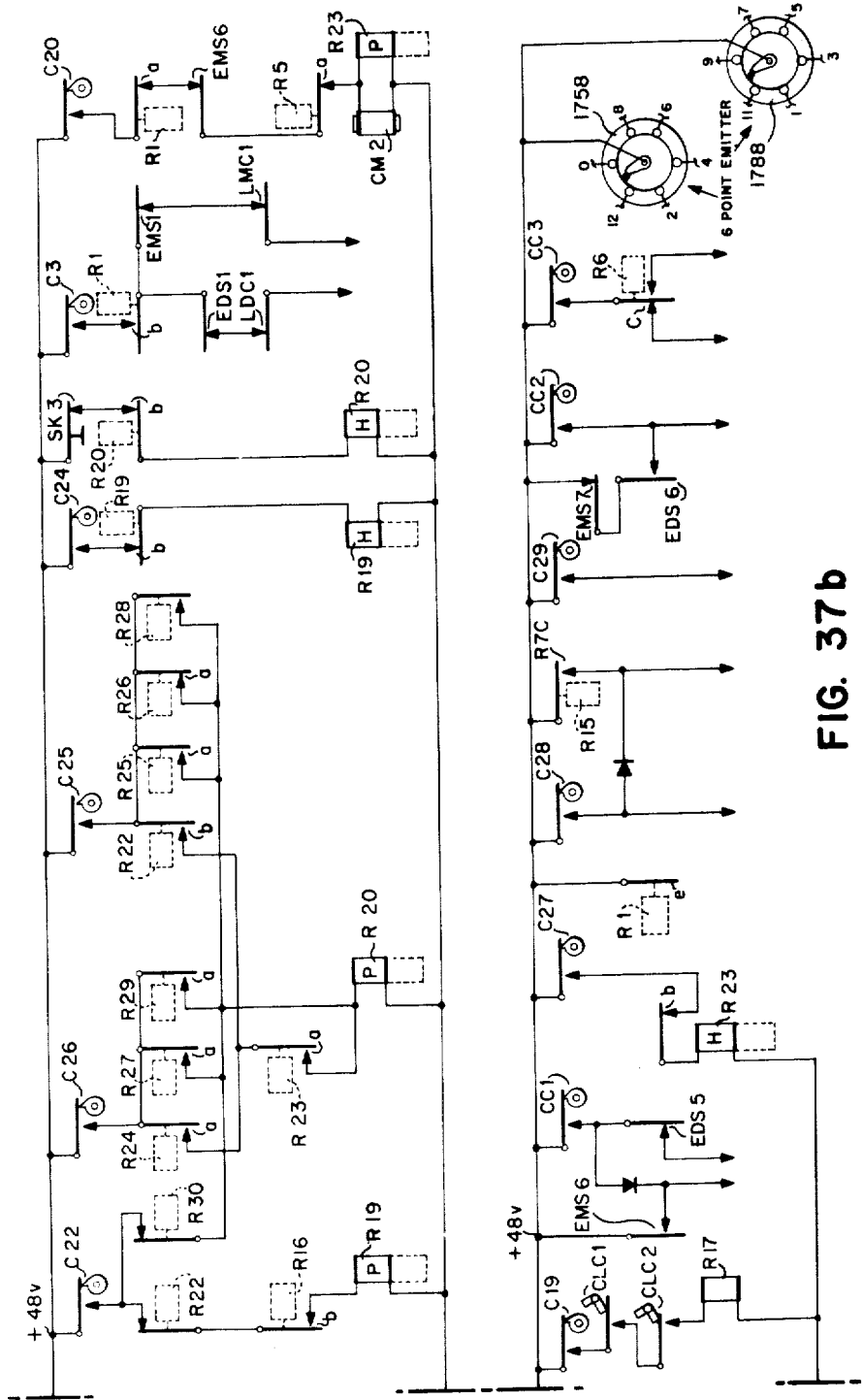
Figure 38:
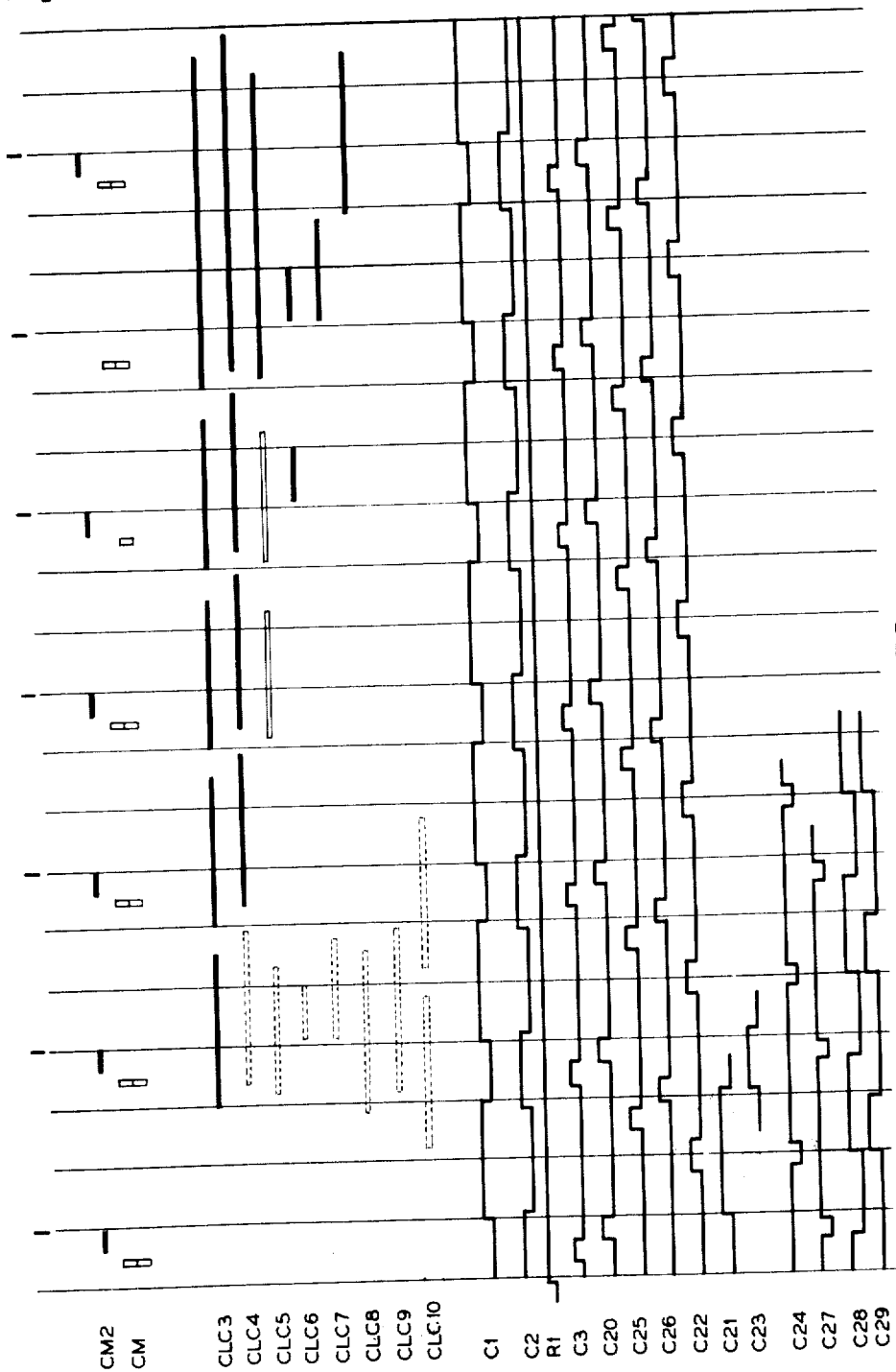

FIGS. 37a and 37b, with FIG. 37b disposed to the right of FIG. 37a, constitute a circuit diagram of circuitry for controlling the operation of the card document preparation unit;

FIG. 38 is a timing diagram for the relays, magnets, cam-operated contacts, and card levers shown in FIGS. 37a and 37b;

FIGS. 39a, 39b, 39c and 39d, arranged in the manner shown in FIG. 40, constitute a timing diagram for the clutching of the master and detail card reader units, the collating circuitry of the card reader, the clutching for the card document preparation unit, the card gate magnets, the card gate magnet controls, the storage transfer gates, the buffer storage readout gates for the first and second print and punch stations and the punch check read station, and the buffer storage elements readout and regeneration gates; and FIG. 40 is a diagram to show the relationship of FIGS. 39a, 39b, 39c and 39d.

General

Figure 6:
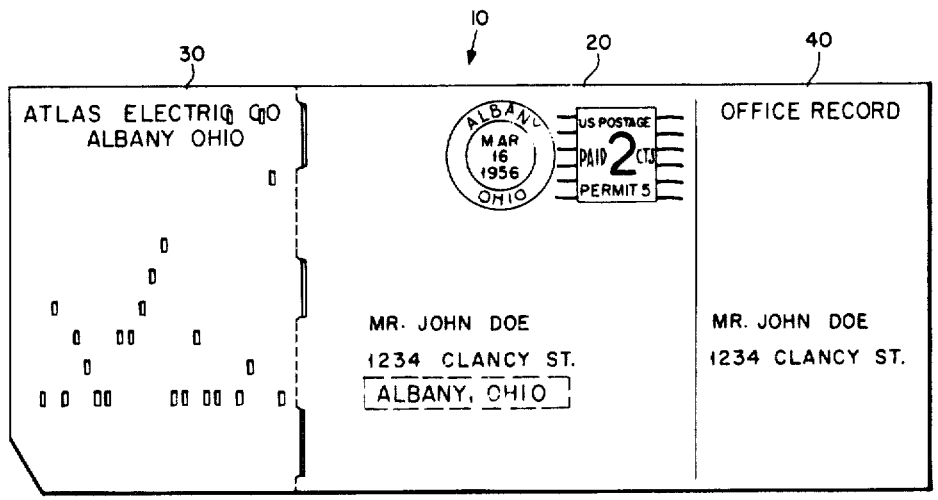
FIG. 6 is a plan view of a completed record card document showing the name and address face or obverse face thereof.
Figure 7:
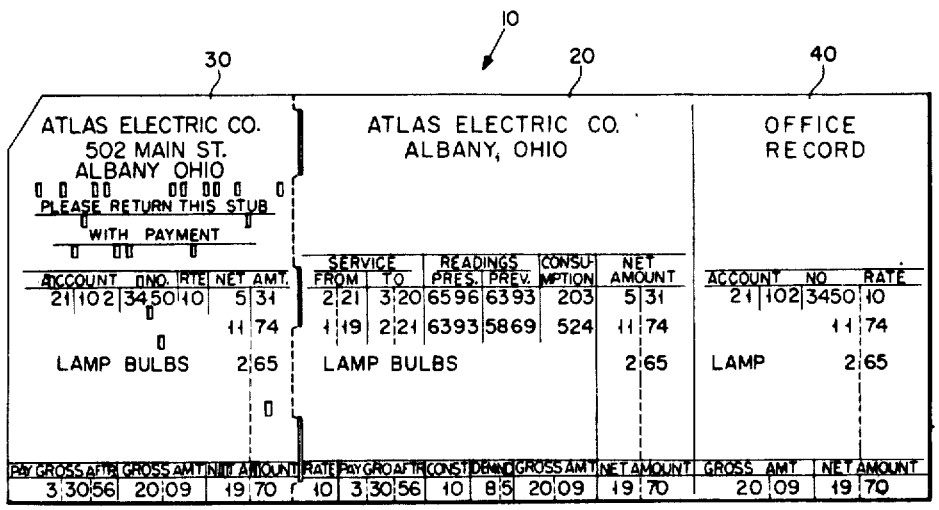
FIG. 7 is a plan view of a completed record card document showing the item or billing face or reverse face thereof.

The general nature of the record card documents to be produced by apparatus embodying the present invention is shown in FIGS. 6 and 7. The document shown is a public utility bill 10 having a main body portion 20 with a stub portion 30 easily detachable therefrom to permit the return thereof with the remittance and an office record portion 40, which is severed from the bill before sending the same to the customer.

The body portion 20, stub portion 30, and office record portion 40 of the document 10 bear data either in printed and/or punched form. The printed data is contained on both the obverse and reverse faces of the document 10.

Certain information of the document is derived from source record cards, shown in FIGS. 8 and 9 as detail cards 50 and a master card 60, respectively, while other information is obtained as a result of an arithmetical or accumulating operation.

In examining the record card document shown in FIGS. 6 and 7, it is seen that the one face thereof, the obverse face, contains address information while the opposite, or reverse, face contains data or billing data. The use of the terms "obverse" and "reverse" are relative and does not have any particular significance other than for purposes of identification or reference.

Further, it is seen that provision has been made to permit a 3-line address to be printed upon the document. However, as will be described in detail hereinafter, in addition to the printing of a 3-line address, either a 4-line address may be printed or the last line of a 3-line address may be corrected if in error. In some instances, the documents to be produced are preprinted with the city-state line of the address; hence, in many instances, as in a 3-line address with a preprinted city-state line of address. It would be only necessary to provide for the printing of an additional 2-line address. However, if it turns out that the preprinted city-state line of the address is in error, the same may be obliterated by the print mechanism; and the available fourth line would be used to permit completion or correction of the third line of the address. It is to be noted that normal operation will consist of printing a 2-line address in addition to a preprinted city-state line of the address. The source records 60 providing the data relating to the name and address of the customers, in the instance of a 3-line address where the city-state line is preprinted, would contain coded punched information indicating that the preprinted city-state line of the address is in error and contains the correct address information. Upon sensing this information, controls are effected to enable correction of the address.

The reverse face of the record card document, as seen in FIG. 7, contains billing data which may include a single item or, as shown, multiple items and a total amount.

With the foregoing as background information concerning the document to be prepared and the general requirements for producing the same, the arrangement of the apparatus of the invention will now be described.

Figure 5:
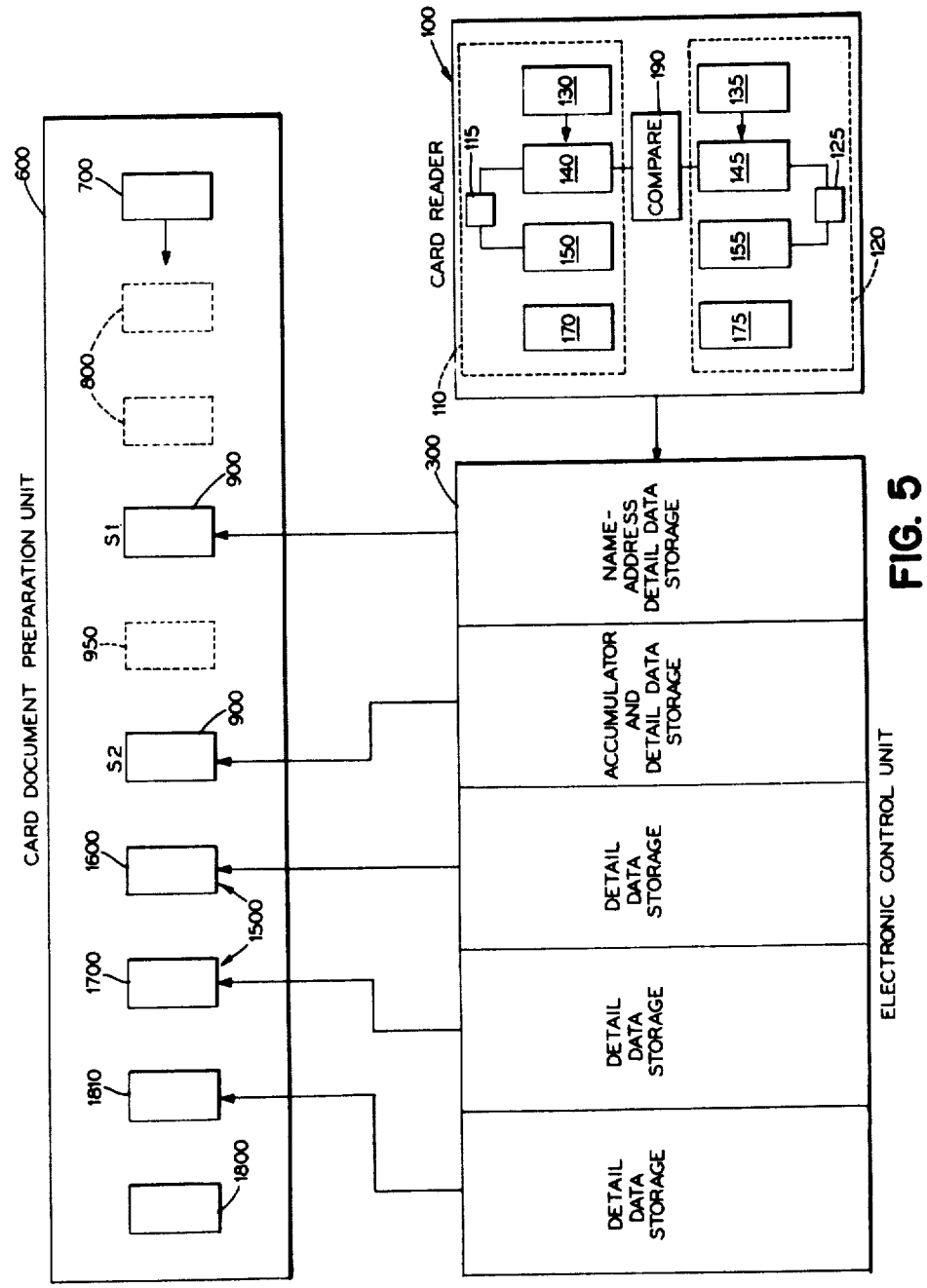
FIG. 5 is a block diagram of the card reader, the electronic control unit, and the card document preparation unit.

A schematic arrangement of a card reader 100, an electronic control unit 300, and a card document preparation unit 600 is shown in FIG. 5. The card reader 100 is a dual unit consisting of a card reader unit 110 for analyzing master cards 60 or those cards containing the name and address of a customer, or other like data, and a card reader unit 120 for detail cards 50, or those cards containing billing data or similar data. In some instances, there may be several detail or item cards 50 related to a single master, or name and address card 60.

The card reader units 110 and 120 function to read information from the master and detail cards 50 and 60, respectively, and furnish the information, if proper, to the electronic control unit 300. Proper information, essentially, means that the information is in the proper sequence and that particular name and address and billing information relates to a particular record card document or customer. It is thus impossible, if the related billing information be out of sequence, to record data in the wrong position on the document prepared or to effect an erroneous accumulating operation by using data from unrelated detail cards, whereby the customer would be sent an incorrect bill.

The master and detail card reader units 110 and 120 are mounted on a common frame and driven by a common drive shaft. The master reader unit essentially consists of a card hopper 130, two spaced apart electrical brush sensing read stations 140 and 150 and two stackers 160 and 170, as shown in FIG. 10, while the detail card reader consists of a card hopper 135, two spaced apart electrical sensing brush read stations 145 and 155 and two stackers 165 and 175, FIG. 11. Appropriate mechanism, as will be described in greater detail hereinafter, is provided for removing the master and detail record cards in series from the card hoppers 130 and 135 and transporting the same past the first and second brush sensing stations 140, 145 and 150, 155 to one of the two card stackers 160, 165 and 170, 175, respectively. Card deflectors 180 and 185 are selectively operable for guiding the master and detail cards to the proper record card stackers. The reason for the first and second brush sensing stations is to facilitate sequence checking of the cards for both master and detail cards by sequence checking collating circuitry 115 and 125, respectively, schematically illustrated in FIGS. 4 and 5. Use of the two stackers and card deflector in each card reader unit enables card segregation. It may be desirable to select certain cards, such as duplicate cards or cards containing errors detected by the card reader units, and segregate the same from the rest of the cards.

While the card reader 100 provides for a collating or comparing, operation, as will be described in detail, there is no merging of the master and detail cards 50 and 60. By means of the collating operation, it is possible, by cross-comparing collating circuitry 190, to cross-compare between the first brush reading stations 140 and 145 of the card reader units 110 and 120 to determine whether or not the billing information relates to the particular customer for whom the bill is being prepared. It is thus seen that collating circuitry has been provided to enable sequence checking of both master and detail cards and cross-comparison between master and detail cards to determine whether or not the master and detail cards are in their proper order and are related to each other.

Figure 4:
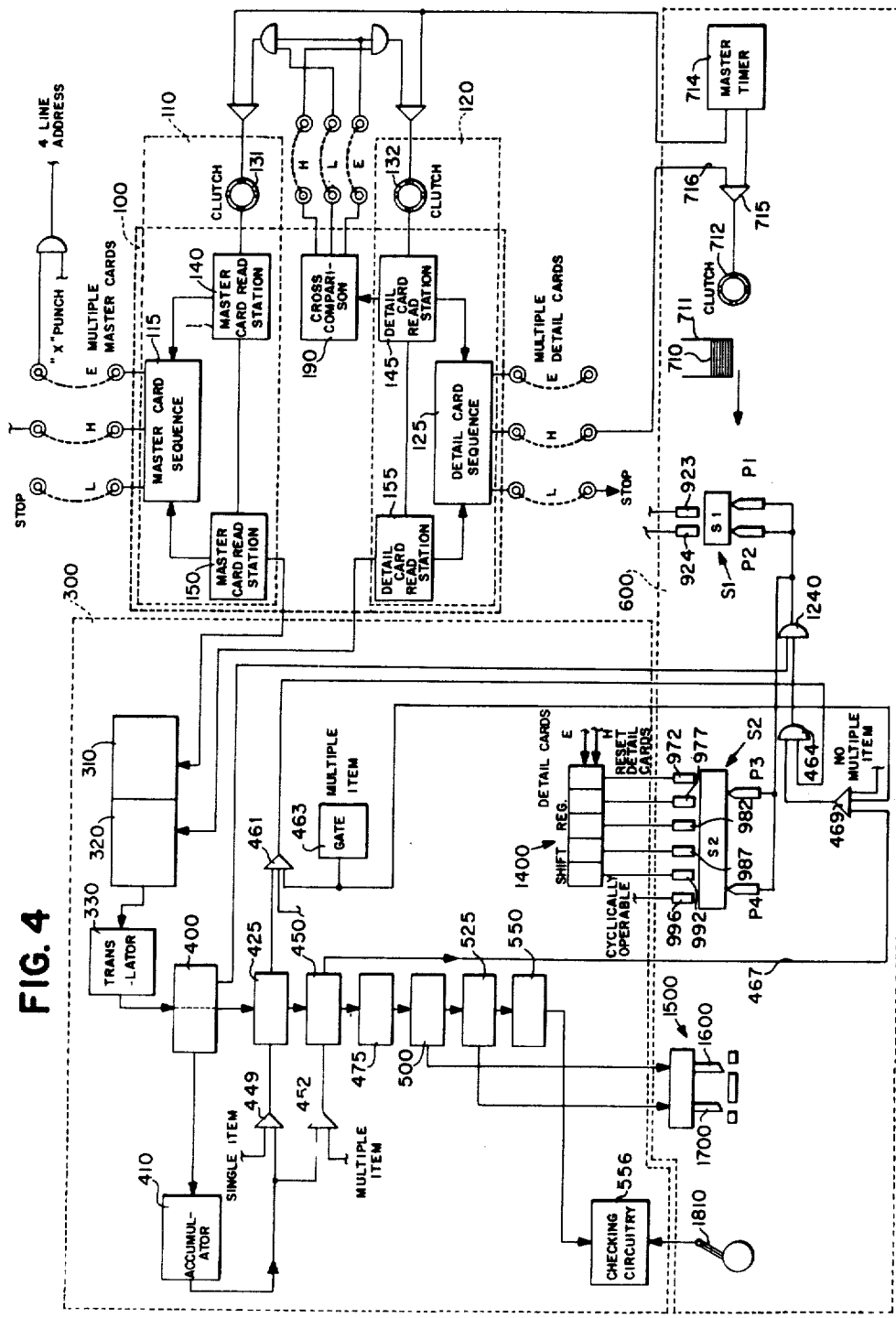
FIG. 4 is a diagrammatic view of the controls for the card reader and the card document preparation unit, including the logical arrangement of the collating circuitry of the card reader and the logical arrangement of the electronic control unit.

While the card reader units 110 and 120 are provided with their own drives, the card feeds of these units are individually clutch controlled by clutches 131 and 132, FIG. 4. The clutches 131 and 132 are selectively controlled by the collating circuitry and the card document preparation unit 600 which, by means of a card call signal, indicates when master and detail cards may be fed through the card reader units 110 and 120. Of course, as to whether or not either the master or detail card should be fed is determined by the collating circuitry. For instance, when a multiple item bill or card document 10 is to be prepared, as recognized by the collating circuitry, the feeding of master cards 60 must be temporarily halted, whereas the feeding of detail cards 50 is continued. By a novel arrangement, as will be described in detail later herein, in the case of a multiple item bill, the detail cards 50 may be fed at twice their normal rate. In this manner, the normal output of the card document preparation unit 600 will either not be affected at all, depending upon the number of items, or will be affected to a lesser degree.

The data information furnished to the electronic control unit 300 from the card reader units 110 and 120 is processed and stored to provide the correct information at the proper time to the card document preparation unit 600. While the functions of the card document preparation unit 600 are not very complex, the novel arrangement and operations of this unit require a somewhat involved electronic control unit; however, one which is logically arranged with simplicity.

Since the card document being prepared may be a multiple or a single item document, provision must be made to recognize when either a multiple item or a single item card document is to be prepared.

Further, because it is possible that a single item card document may be prepared, the printing of this single item and the total item line, which is spaced therefrom, will occur simultaneously. This arrangement is inflexible and printing takes place in this manner for multiple item card documents also. In view of this arrangement, it is necessary, when preparing a multiple item card document, to print the first item last, because it is printed with the total item line which must be printed last, or after accumulation of the several or multiple item amounts.

Information coming from the card reader units 110 and 120, as seen in FIG. 4, is in the well-known IBM code for record cards and is stored by magnetic core storage units 310 and 320 to facilitate translation, by means of a translator 330, to a 7-bit code having seven binary bits including a redundancy bit C, zone bits A and B, and binary value bits −1−, −2−, −4− and −8−. The 7-bit code is compatible with buffer storage elements 400, 425, 450, 475, 500, 525 and 550, into which the information is progressively transferred.

The buffer storage elements are necessary due to the vast amount of data or information handling involved to make the proper data available to control the data recording devices of the card document preparation unit. The buffer storage elements are essentially a series of delay units to enable the data or information to be kept in step with the card document as it progresses through the card document preparation unit regardless if the card document is to be a single or multiple item document.

For the purpose of keeping the data or information in step with the document being prepared, the seven buffer storage elements 400, 425, 450, 475, 500, 525 and 550 are provided. The reason for having seven buffer storage elements will become clear during the description of the card document preparation unit 600.

The buffer storage units each operate in accordance with the same principles and progressively store the data or information in minute ferrite magnetic cores. Each magnetic core stores one bit of information; hence, because the information is in the 7-bit code, seven cores are necessary to store one digit value. The data or information entering the buffer storage units is serial by digit and parallel by bit, with the high order digit entering first. The bits of data or information, combined in accordance with the 7-bit code, make up the digits, and the digits in turn are grouped to form larger units which are termed "words." The capacity of the buffer storage elements may be designated in terms of digits or words. However, before discussing the individual capacity of each buffer storage element, the capacities of the buffer storage elements differ in accordance with the requirements imposed by the card reader units 110 and 120 and the card document preparation unit 600, a brief description concerning the principles of operation of magnetic core storage elements will be given.

The principles of operation of magnetic core storage elements utilized in this invention are well known. The cores operate on what is known as a "rectangular hysteresis loop" and it is this characteristic that provides cores with their ability to store data bits. Ferromagnetic materials are constituted of large groups of atoms whose outer orbital electrons are approximately in the same plane. Orbital electrons are bonded together to form a crystal, and a group of electrons forming an outer shell of the crystal is called a "domain." Each domain possesses a magnetic property; however, because of the random spins of the electrons, the polarity of the magnetism is random and the net magnetization of the ferrite is neutralized. The domains can be caused to pivot or flip to a given direction if a large magnetizing force is applied and, by reversing the polarity of the magnetizing force, the domains will flip in the opposite direction. Domains that have been oriented in a particular direction tend to remain in that direction even after the magnetizing force is removed. It is this property which makes the magnetic cores extremely useful as an information storage device. Since the magnetic core may be placed in either of two stable states or two stable positions on the rectangular hysteresis loop, depending upon the polarity of the magnetizing force, one stable state may represent the storage of the value "1" while the other stable state may represent the storage of the value "0."

A current of plus $Im$ may be passed by means of a conductor threading the magnetic core to store or write a "1" therein and a current of minus $Im$ may be passed over another conductor to read the stored value "1" or change it to "0." To read information out of a core depends upon the system utilized to sense the condition of the flux field within the core. The operating properties of the magnetic cores for information storage purposes are such that, with the magnetic core in the "0" state, a positive current $Im$ or $+Im$ will cause the core to switch to the "1" state; however, a current of $+Im/2$ is insufficient to effect this change. Similarly, when the magnetic core is in the "1" state, a minus current $Im$ or $-Im$ will cause the core to switch to the "0" state, but a current of $-Im/2$ will have no effect. Furthermore, repeated application of half value switching currents have negligible effect on the total residual flux.

The magnetic cores for storing information may be arranged in discrete coordinate positions to form a matrix or array in a single plane; or, when a large number of cores are necessary to store the information, as in the present invention, they may be arranged in a 3-dimensional array. Since the data or information coming from the translator 330 is in the 7-bit code, the bits being zone bits A, B and C and binary bits −1−, −2−, −4− and −8−, the bit dimension of the 3-dimensional core array forming the buffer storage elements is seven or seven ferrite magnetic cores high. The digit dimension is sixteen or sixteen magnetic cores wide, while the word "dimension," which is the third dimension, varies according to the storage capacity necessary for the particular buffer storage element. By threading the cores with seven bit lines or conductors and with sixteen digit lines or conductors, the algebraic sum of the currents applied at a particular instant in time over the conductors threading a single core will determine whether the core will remain in its initial state or switch to its opposite state. Hence, if the resulting current is $\pm Im/2$, there will be no transition, while, if the resulting current is $\pm Im$, the core will switch provided the current is of the proper polarity. Once the switching is accomplished, the core remains in the new or changed state until another switching action takes place. Hence, the reading out of information in a core is destructive and regeneration is necessary if the same information is to be read out repeatedly.

When information is read from the magnetic cores, it is necessary to provide a sense winding or conductor threading through all of the cores in a common bit line.

During a read operation, the switching of the cores to "0" induces a voltage in the sense winding to signify that bits have been stored in the cores switched. In order to identify each word of the core array, a word winding or conductor is required for each word of storage. Also, a reset winding or conductor threads every core in the storage unit to permit resetting all digits to "0." Hence, every core of the buffer storage elements are threaded by five windings: a bit winding, a digit winding, a sense winding, a word winding, and a reset winding. A more detailed description of 3-dimensional core arrays is contained in U.S. Patents 2,740,949 and 2,739,300.

In this example, the digit time or interval is ten microseconds and each digit time is divided into a read time (A) and a write time (B) of three microseconds each. The spacing between read time A and write time B is used for other control and reset pulses. During A time of each digit interval, digit drivers supply a current of $-Im/2$ to each digit winding in sequence from 1–16, inclusive, while at the same time $-Im/2$ will be applied to selected word line.

Hence, at A time, there will be a current of $-Im/2$ (digit) and $-Im/2$ (word) or $-Im$ through all seven bit cores in the particular digit line being scanned. This current $-Im$ will cause any of the seven cores in the "1" state to switch to "0." The cores that are switched will induce signals in their respective sense lines which are connected to internal circuitry. It should be noted that all seven cores in the selected digit line are in the "0" state at the end of the 3-microsecond interval.

At B time, information is written into the core array; the selected word and digit lines each have a current of $+Im/2$ applied thereto at B time. Each bit line will have no current present if a "1" is to be written and will have $-Im/2$ if a "0" is to be retained in the particular core. A 3-way coincidence is required between the word, digit and bit windings to perform selective writing where the bit windings are the controlling factor and may be considered as an inhibit winding during the write operation.

To regenerate information in the core array, the information or data read out at A time is supplied to the external circuitry and is also returned to the core array to permit the same to be rewritten at B time.

Reset of the core array may be considered to take place automatically because, when information is read out of the cores, the same are set to the "0" state.

In order to more fully understand the logic of information flow as it is progressively transferred from buffer storage element to buffer storage element and from certain buffer storage elements to the data recording devices, a general description of the card document preparation unit 600 will be given.

The card document preparation unit 600 functions to compose utility bills, premium notices and other like type of documents and instruments in the form of record cards. The apparatus comprising the card document preparation unit 600 may be considered in separate portions or groups. There is a card document feed portion 700, a card document transport portion 800, a card document print portion 900, a card document punch portion 1500 and a card document card stacking portion 1800, schematically illustrated in FIG. 5.

Figure 1:
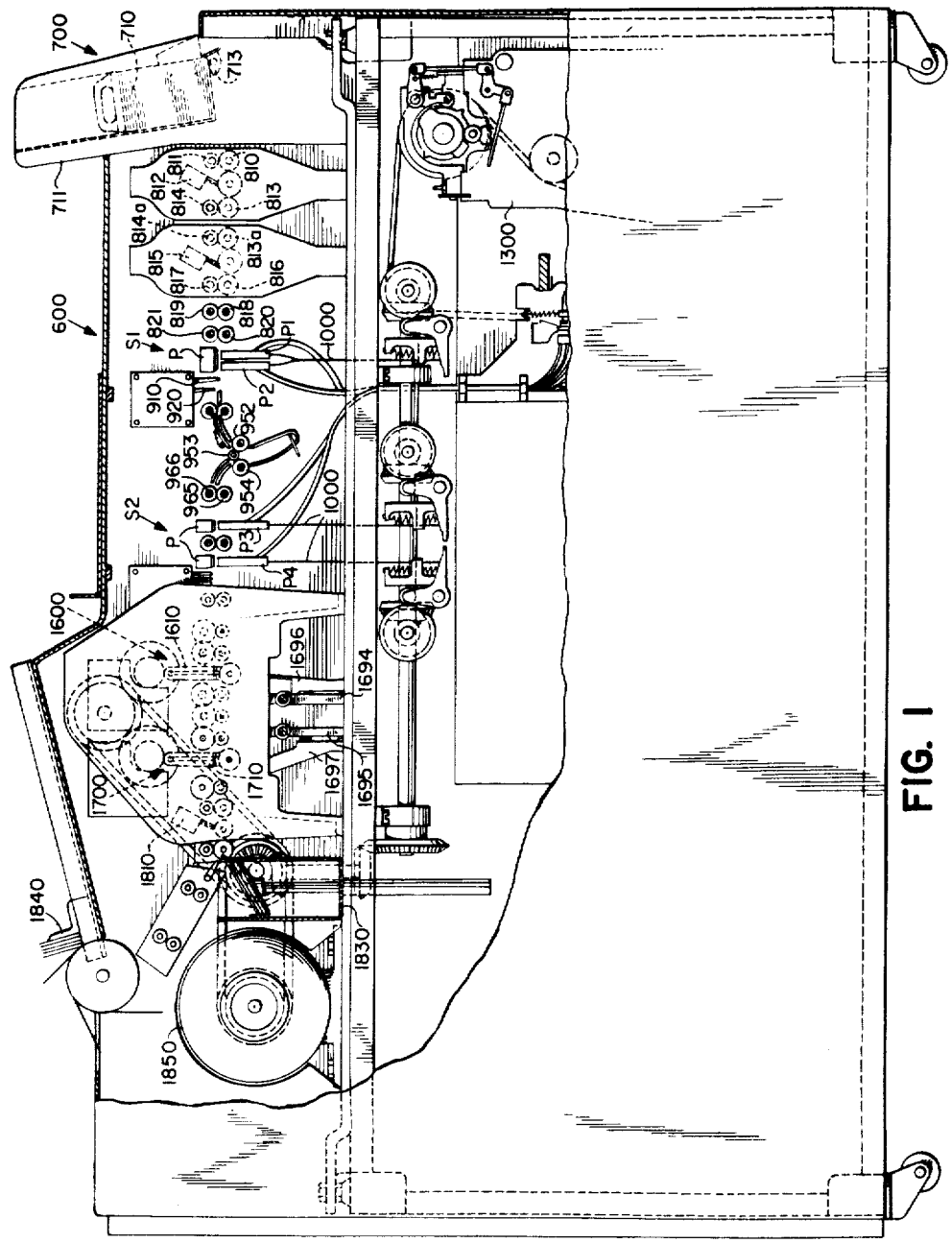
Figure 2C:
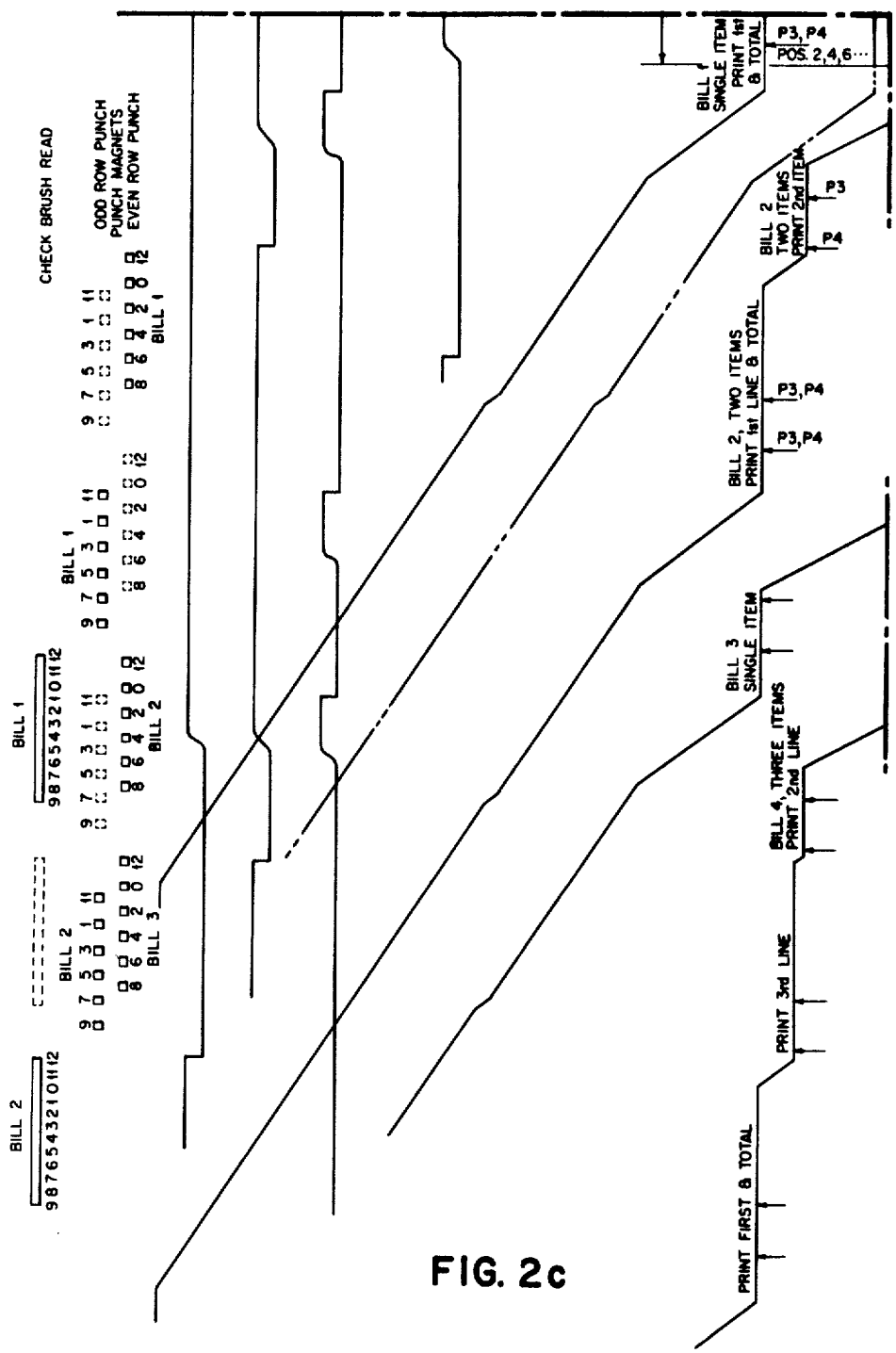
Figure 2D:
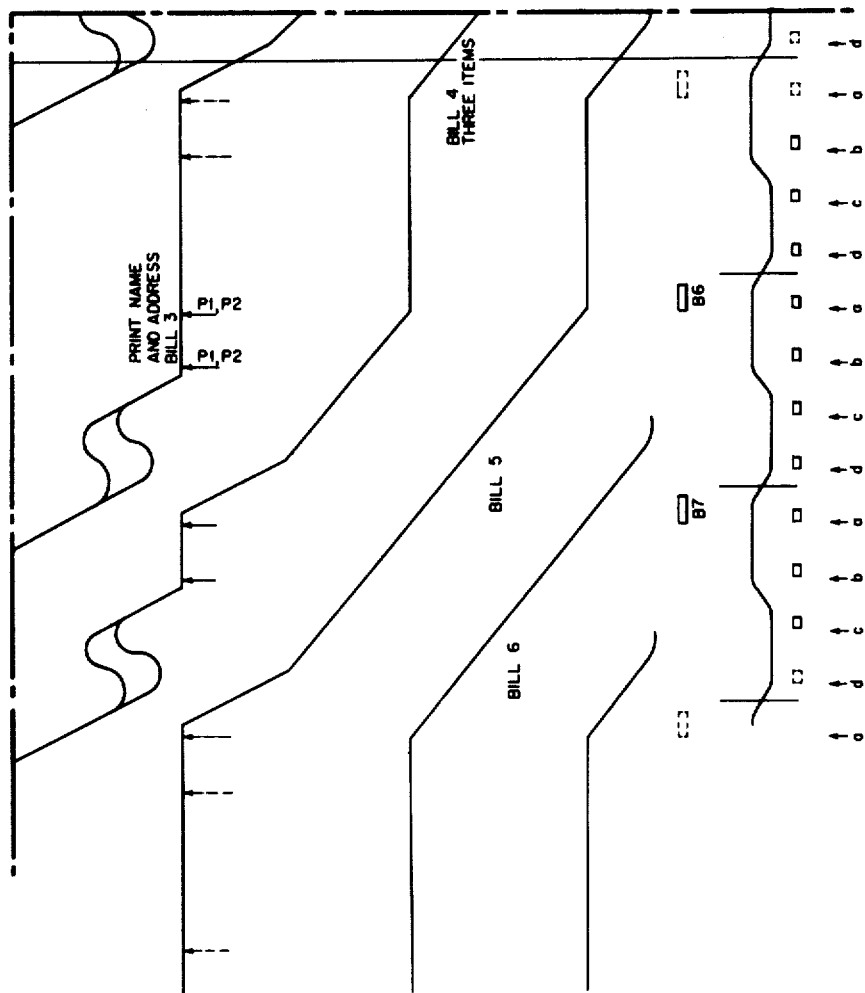

Blank record cards or cards 710 having some preprinted and prepunched information therein are contained in a card hopper 711 of the card document feed portion 700, FIGS. 1, 2a and 2b. Card feeding mechanism for feeding cards in seriatim from the card hopper 711 is clutch controlled by a 1-revolution clutch 712, schematically represented in FIG. 4. The record cards 710, residing in the hopper "9" edge first and reverse face up, are fed therefrom at a rate of approximately 500 cards per minute; and, therefore, each card cycle of the card document preparation unit is 120 milliseconds. As the record cards 710 leave the hopper 711, FIGS. 1 and 2b, they enter between a pair of cooperating feed rolls 810 and 811 which transport the cards 710 past a first brush sensing device 812 of the type employed in the card reader unit to another pair of cooperating feed rolls 813 and 814. The pair of cooperating feed rolls 813 and 814 feeds the cards 710 past a second brush sensing device 815 identical to the first sensing device 812 and located therefrom to enable 20-cycle point reading. The first and second sensing devices 812 and 815 are not essential to the operation of the card document preparation unit but are included to permit sequence checking or interpreting of the card documents 710 which may have prepunched information.

After the card documents 710 pass the second brush sensing device 815, they are received by a pair of cooperating feed rolls 816 and 817 to be fed to a pair of cooperating skid feed rolls 818 and 819. Skid feed rolls permit the card documents 710 to be arrested without damage by some stop or gate disposed in the card path. In this example, a second pair of skid rolls 820 and 821 is positioned from the first pair of skid rolls 818 and 819 to feed the card documents 710 into the first print station S1 of the print portion 900. The skid rolls 818, 819, 820 and 821 perform two functions; they are driven at a higher speed than the feed rolls 816 and 817 so as to increase the speed of the cards at a critical time or as they come into the first print station S1 and they are mounted so as to slip upon the card documents 710 to permit the same to be arrested in an aligned position at the first print station S1. Moreover, the skid rolls may be utilized for obtaining lateral alignment of the cards at the print station S1. This is accomplished by setting the skid rolls at an angle with respect to the card path and providing a fixed lateral stop, not shown, against which the card documents are aligned as they translated longitudinally. Of course, lateral alignment may also be achieved by elevating the position of the skid rolls and utilizing pushers to align the cards.

As the card documents 710 are fed to the first print station S1 by the second pair of skid rolls 820 and 821, they are arrested to enable print mechanism 910 to print name and address information on the obverse side of the card documents 710 or the side facing downward. The card documents 710 may be arrested at the first print station S1 in two possible stopping positions. If it is necessary to print more than two lines of name and address information or two lines of information not normally spaced from each other while printing name and address information on the card documents, the card documents must be arrested at both stopping positions. There are two rows of print elements P1 and P2 fixedly spaced apart at the first print station S1 to enable the printing of two lines of address information on the card documents at each stopping position, or a total of four lines, as in FIG. 26. Usually the city-state line of the address will be preprinted; hence, it is only necessary to stop the card documents at the first stopping position at the first print station S1 to print the name of the customer and the street address. However, if, for instance, the name were preprinted and the street number or the city-state line were not, then the card documents would be arrested at the first stopping position to permit the printing of the street number and at the second stopping position to enable printing of the city and state. Of course, by adding a third stopping position, the street address and city and state could be printed at one time. Also, the card would have to be arrested at both the first and second stopping positions if the preprinted city-state line of the address were incorrect. At the first stopping position, the name and street address would be printed while, at the second stopping position, the incorrect city-state line would be crossed out by means of one row of print elements and the correct city-state line would be printed by the other row of print elements. Selectively operable card gates 910 and 920 are positioned into and retracted from the card path to arrest and release the card documents, respectively. The second pair of skid rolls 820 and 821 advances the card documents from the first to the second stopping position within the first printing station S1 as the card gates 910 and 920 are operated to release and arrest the card documents, respectively.

The printing of address information at the first print station S1 takes place upon the obverse side of the card; and, because all printing is performed from one side of the card path, or upon the face of the card document facing downward, it is necessary to turn the card over to permit the printing of item or detail information on the reverse face of the card at a second print station S2 positioned a predetermined distance from the first print station S1, FIGS. 2a and 2b.

The apparatus for turning the card documents 710 over so that the reverse face of the card documents, which faced upward prior to entering the first printing station S1, will be facing downward before entering the second print station S2 is designated as a card inverter 950, FIGS. 2b and 29. The card inverter 950 essentially comprises a curved pocket 951 into which the card documents 710 are directed and ejected. As the card documents enter into the curved pocket 951, they are curved or bent; and, in the process of straightening, what had been the trailing edge of the card documents is displaced to be grasped and become the leading edge of the card documents. The second pair of skid rolls 820 and 821 feeds the card documents from the first print station S1, when permitted to do so by either of the card gates 910 or 920, to a pair of cooperating feed rolls 952 and 953 which will feed the card documents into the curved pocket 951. The feed roll 953 also cooperates with a feed roll 954 located at the ejecting edge of the curved pocket 951 to feed card documents therefrom.

The feed rolls 953 is disposed between the feed rolls 952 and 954 so that, after the card documents enter into the curved pocket 951, the trailing edge impinges thereagainst to become rapidly displaced toward the ejecting feed roll 954 and be established as the leading edge of the card documents. A spring finger 955 located at the bottom of the curved pocket 951 yields upon impact by the card documents and reacts to aid rapid ejection of the card documents from the curved pocket 951. As the card documents emerge from the curved pocket 951 through the feed rolls 953 and 954, they engage a first pair of skid rolls 965 and 966 for feeding the card documents together with skid rolls 967 and 968 into the second print station S2 of the print portion 900.

At the second print station S2, two spaced apart rows of print heads P3 and P4 are provided for printing detail or item data upon the reverse side of the card documents 710. There may be single or multiple items printed; however, in either instance, there will be a first line of printing near the upper edge of the card documents 710 and a total line of printing near the bottom edge of the card, as in FIG. 27. The two rows of print heads P3 and P4 are spaced from each other to permit simultaneous printing of the first and total lines. The spacing between the rows of print heads P3 and P4 is fixed or invariable; hence, when printing a multiple item bill or instrument, the first and total lines will be printed last. In this example, the card documents may be arrested at the second print station S2 in any one of six stopping positions through the facility of magnetically operated card gates 970, 975, 980, 985, 990 and 995. The card gates 970, 975, 980, 985, 990 and 995, normally disposed out of the card path, are selectively operable to enter the card path and thereby arrest the card documents to permit a printing operation to take place. The card gate 995 for arresting the card documents in a position to enable the simultaneous printing of the first and total lines is the last card gate in line with reference to the direction of card travel.

When printing a multiple item bill or instrument, the card documents are advanced through the second print station S2 by the second pair of skid rolls 967 and 968. Hence, the first card gate 970 is operated to release the arrested card document and the second card gate 975 already has been operated to enter the card path to arrest the card document advanced toward the second card gate 975 by the second pair of skid rolls 967 and 968. The second card gate 975 is operated to enter the card path before the first card gate 970 releases the card document or is retracted from the card path. The controls and timing thereof for accomplishing the printing of a multiple item bill or instrument will be described in detail hereinafter. When the card document is released by the card gate 995 at the second print station S2, the card gate 995 will be operated every machine cycle since each card will contain a first and total line, it is advanced by the second pair of skid rolls 967 and 968 to a third pair of skid rolls 997 and 998 which operate to feed the card document from the second print station S2, FIG. 2a.

The print heads P1, P2 and P3, P4 for printing the information on the card at the first and second print stations S1 and S2 of the printing portion 900 of the card document preparation unit 600 are of the type wherein character impressions are effected through impact strokes of spring-operated print actuating members 1000, FIG. 19. Each of the print heads P1, P2, P3 and P4 are arranged in a transversely spaced relationship and include presettable wire print matrix wires, not shown, extending from the print heads P1, P2, P3 and P4 to form a character pattern. The matrix wires of the print heads are set to form a particular character by a wire setting device generally known as a code rod 1100. After the matrix wires of each print head P1, P2, P3 and P4 are set through the facility of the code rod 1100, the matrix wires are restrained against free endwise movement and then carried forward to print the characters so formed on the medium; in this instance, the card document, to bear the same through the facility of an inked ribbon, not shown, and platens P, shown in FIGS. 1 and 20. While the foregoing describes the general mode of operation of the printing mechanism, the requirements for providing the necessary apparatus to accomplish the printing of the name and address at the first print station S1 and billing or item data at the second print station S2 will briefly be considered.

At the first print station S1, there are the two rows of print heads P1 and P2 spaced apart at a fixed distance of one-fourth of an inch with thirty print heads to each row and covering sixty columns of a card document. Hence, in order for each row of thirty print heads to print a line of data sixty columns wide, it is necessary that each print head be operated twice in alternate columns in a manner known as serial-parallel printing, which is generally defined as a manner of printing wherein each print element prints more than one character for each line of printing. Accordingly, the print heads P1 and P2 of each row will first print the preset characters in columns 1, 3, 5, 7 . . . 55, 57 and 59 and then be shifted laterally to print the preset characters in columns 2, 4, 6 . . . 56, 58 and 60. Hence, the printing of a line of information occurs in or requires two subcycles.

In order to preset the matrix wires of each print head of the print heads P1 and P2 to form a character pattern, sixty print setup mechanisms 1300, schematically shown in FIG. 1, are provided to set the code rods 1100 which, in turn, set the matrix wires to form the character pattern. These print setup mechanisms are adapted to operate at a speed of 2,000 setups per minute or thirty milliseconds per subcycle.

The card gates 910 and 920 at the first print station S1 are positioned to provide stopping distances one-half inch apart. Accordingly, at the first print station S1, four lines of information spaced one-fourth inch apart, each containing sixty characters, may be printed. Adjustment either in the position of the card gates 910 and 920 or the location of the print heads P1 and P2 will permit a change in location of the four lines of print or address information upon the card documents 710.

The print heads P3 and P4 at the second print station S2, FIG. 19, are identical in structure and operate according to the sample principles of operation as that for the print heads P1 and P2 at the first print station S1. While the two rows of print heads P3 and P4 at the second print station S2 are spaced apart, each row contains thirty print heads spaced from each other to cover sixty columns of a record card document. Accordingly, printing takes place at the second print station S2 in the same manner as at the first print station S1. Each print head will be actuated to print a character in one column during one subcycle and then be shifted laterally to print another character in an adjacent column during a second subcycle.

The print setup mechanisms 1300 for presetting the matrix wires of the print heads P1 and P2 at the first print station are also utilized or shared to set up or preset the marix wires to form a character pattern of the print heads P3 and P4 at the second print station S2. The sixty setup mechanisms 1300 are shared by the print heads P1, P2 and P3, P4 at the first and second print stations whereby, during subcycles "a" and "b," printing may take place at the first print station S1 while printing at the second print station S2 takes place during subcycles "c" and "d." Further, for single item card documents, during the "a" and "b" and "c" and "d" subcycles, the odd columns 1, 3, 5, etc., and the even columns 2, 4, 6, etc., are printed at the first and second print stations S1 and S2, respectively.

Ordinarily, even when multiple data items are to be printed upon the card document being prepared, printing occurs at the second print station S2 during the subcycles "c" and "d." Hence, a complete machine cycle or four subcycles are required for each additional line of data in a multiple item card document. During the printing of the multiple items upon the documents at the second print station S2, the card document at the first print station is retained thereat. Then, upon printing the first and total items on the document at the second print station S2, the name and address information is printed upon the document at the first print station S1. It is thus seen that, for a multiple item document, the "a" and "b" subcycles are sacrificed.

However, to obtain greater benefit from the principle of the invention involving selective sharing of the print setup mechanisms 1300 between the print heads P1, P2 and P3, P4 at the first and second print stations, respectively, the "a" and "b" subcycles normally utilized for accomplishing printing at the first print station S1 are utilized for printing at the second print station S2 in addition to the "c" and "d" subcycles. In this manner, it is possible to further share the print setup mechanisms 1300 to increase the utility or efficiency of the card document preparation unit 600.

Of course, when preparing a multiple item document, it is necessary to suspend the feeding of name and address cards 60 through the master card reader unit 110 and to continue the feeding of the detail data cards 50 relating to the single name and address card. It should be noted that, to obtain the greater benefit of the sharing of the print setup mechanisms 1300 when printing multiple item documents, the feeding of master cards 60 would be suspended and the detail cards 50 would be fed at twice their normal rate. Further, if the name and address were of such nature that the card document for receiving the printing of the same had to be stopped in two different stopping positions at the first print station S1, the sharing of the print setup mechanisms would be shifted and the feeding of detail cards 50 through the detail card reader 120 would be halted while the feeding of master cards 60 would continue; and, to obtain the full benefit of the print setup mechanism, the feeding of the master cards 60 would be increased to twice the normal rate.

The above covers the general nature of printing at the first and second print stations S1 and S2 while the selective control of the card gates at the second print station S2 will be described in detail later herein; but it should be noted that, since the first and total lines are printed on every card document and that these lines are the last ones printed on the card document, hence, release of the card from the second print station may be controlled by the last card gate in line or the card gate 995 for arresting the card documents to permit printing of the first and total lines thereon.

It should be appreciated that the print mechanism operates continuously at a high cyclic rate. Each print cycle consists of four subcycles; subcycles "a" and "b" normally are utilized to enable series parallel printing at the first print station S1, which subcycles "c" and "d" are normally utilized to permit series parallel printing at the second print station S2. The card documents 710 are transported in effect to utilize the print mechanism to its fullest extent.

Figure 3:
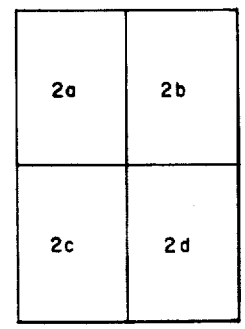
FIG. 3 is a diagram to show the relationship of FIGS. 2a, 2b, 2c and 2d.

During a typical machine cycle of the card document preparation unit 600, a typical cycle is represented in FIGS. 2a, 2b, 2c and 2d, arranged as shown in FIG. 3; one of the card documents 710 is arrested at the first printing station S1 where print impressions are effected to print name and address information during subcycles "a" and "b" while another card document 710 is advancing from the card document inverter mechanism 950 to the second print station S2. Subsequently, said another card document 710 arrives at the second printing station S2 to receive print impressions of amount data during subcycles "c" and "d," while said one card document 710 is progressing through the card document inverting mechanism 950.

Hence, for any typical cycle, during the first portion of the print cycle or during subcycles "a" and "b," one card document is in motion progressing toward one of the print stations while another document is at rest receiving print impressions; and, during the last portion of the print cycle or subcycles "c" and "d," these functional relationships are reversed so as to permit continuous operation of the printing mechanism, independent of the time requirements for transporting and inverting the record card documents.

As the card documents are released for ejection from the second print station S2, the second pair of skid rolls 967 and 968 feeds the card documents to the third pair of skid rolls 997 and 998 for feeding the card documents to a pair of skid rolls 1550 and 1551 against a dynamic card aligner or timing gate 1555 to retime the card documents before they enter a first punch station 1600 of the punch portion 1500, FIG. 2a. Card documents are fed to the first punch station 1600 by feed rolls 1560 and 1561, which are rotating at a decreased velocity from that of the skid rolls 997 and 998 to feed the card documents 710, at a rate to permit 8-cycle point punching, or punching at a rate of approximately 500 card documents per minute. The first punch station 1600 has a punch unit 1610 for punching in flight the even rows of the card documents; i.e., 12, 0, 2, 4, 6 and 8.

A pair of cooperating feed rolls 1562 and 1563 feeds the card documents 710 from the first punch station 1600 to a pair of skid rolls 1564 and 1565, which are operating at a higher speed. The skid rolls 1564 and 1565 feed the card documents against a dynamic timing gate 1566 to again retime the card documents before they enter a second punch station 1700, which has a punch unit 1710 for punching the index positions of the card documents in flight for the odd rows, or rows 11, 1, 3, 5, 7 and 9. The card documents are fed to the second punch station 1700 by feed rolls 1567 and 1568, which are rotating at a decreased velocity from that of the skid rolls 1564 and 1565, to feed the card documents 710 at a rate to permit 8-cycle point punching, or at the rate of 500 cards per minute. Since there are two separate punch stations, two cards are being punched any one machine cycle and at a rate of 500 cards per minute because alternate rows are being punched. The punch units 1610 and 1710 at the first and second punch stations 1600 and 1700 are practically identical in structure and principle of operation.

Generally, punch and die elements 1615 and 1620, of a punch and die assembly 1625, for each punch unit 1610 and 1710 oscillate in a manner so that, on the forward stroke or the stroke in the direction of card travel, the punch and die elements 1615 and 1620, moving as a unit, match the linear velocity of the card document 710 moving between them. Selective punching occurs as the velocity of the punch and die elements 1615 and 1620 match the velocity of the card document through the facility of cams 1630 and magnetically operated interposers 1640.

Card documents 710 are transported from the second punch station 1700 by means of a pair of feed rolls 1569 and 1570 to a pair of cooperating feed rolls 1571 and 1572 which feed the card documents past a brush sensing unit 1810 to a pair of cooperating feed rolls 1573 and 1574. The brush sensing unit 1810 is for checking purposes so that it may be ascertained as to whether or not the correct information had been punched into the card documents. The seventh buffer storage element 550, FIG. 4, of the electronic control unit 300, contains the information utilized for making this check in cooperation with the information obtained by the brush sensing unit 1810.

As the card documents 710 leave the pair of cooperating feed rolls 1573 and 1574, FIG. 2a, they will enter, depending upon the position of a selectively operable card deflector 1820, a drop-type card stacker 1830 or between cooperating feed rolls 1575 and 1576, which feed the card documents through another pair of cooperating feed rolls 1577 and 1578, to be transported to a rotary drum-type stacker unit 1840.

The foregoing completes the general description of the apparatus for embodying the present invention. It has been generally shown that the invention provides for the production of card documents bearing data in both printed and punched form which are produced in one continuous operation from a plurality of data sources. Furthermore, the documents are so produced by apparatus which is utilized in a manner to increase the overall speed of operation.

*Card Reader*

The card reader, as shown in FIGS. 4 and 5, comprises the card reader unit 110, FIG. 10, for reading master or name and address record cards 60, and the card reader unit 120, FIG. 11, for reading item or detail cards 50. The card reader units 110 and 120 are controlled by the selectively operated clutches 131 and 132, as diagrammatically shown in FIG. 4. The clutches 131 and 132 for both card reader units 110 and 120 are essentially controlled by the results of the comparisons made between the information at the first brush read stations 140 and 145 of the master and detail card reader units 110 and 120 by means of collating circuitry, not shown. However, the results of the collating operation are not sufficient to control the operation of the read feed clutches 131 and 132 because the card document preparation unit 600 may not require or be ready for the information contained in the master and detail cards waiting to be fed. Hence, final control resides within the card document preparation unit 600, which will provide a signal when the clutches 131 and 132 for the master and detail card reader units 110 and 120 are to be engaged.

The clutches 131 and 132 for the master and detail card reader units 110 and 120 are single revolution dog clutches having ten clutching positions, each clutch position spaced apart to permit initiation of a cycle of operation at any one of the ten clutch positions. The circuitry for controlling the engagement and disengagement of the clutches 131 and 132 is shown in FIGS. 4 and 16.

While the clutches 131 and 132 for the feed units of the card readers 110 and 120 are to be engaged prior to engagement of the clutch 712 of the feed unit 700 for the card document preparation unit 600, they will not become engaged until a card call signal is received from the card document preparation unit 600. The clutches 131 and 132 for feed units of the card readers 110 and 120 may be clutched independently or simultaneously depending upon the results of the collating operation. The clutch 131 may selectively connect the feed unit of the card reader 110 to a drive operating at 545 cards per minute, if there is a single master card for the name and address, or to a drive operating at 1,090 cards per minute, if more than one master card is necessary for containing the name and address. Further, the clutch 132 for the feed unit for the detail card reader 120 may selectively connect the feed unit to a drive operating at 545 cards per minute, if there is a single detail card corresponding to the master card, or to a drive operating at 1,090 cards per minute, if there are a multiple number of item cards corresponding to the master card. In any event, when both the master and detail feed units are to be operated, they must be synchronized; i.e., one of the feed units may not be clutched when the other feed is already clutched or in motion.

While the clutches 131 and 132 for the master and detail feed units are selectively operable in accordance with the results of collating circuitry, master and detail cards 60 and 50 must be initially advanced from the card hoppers 130 and 135, FIGS. 10 and 11, to the first brush sensing stations 140 and 145 because no collating operations can take place until after the master and detail cards are sensed. Accordingly, controls are provided to initially engage the clutches 131 and 132 for the master and detail card reader units 110 and 120. With reference to FIGS. 37a and 37b, if both the card reader units 110 and 120 and the card document preparation unit 600 contain cards in the card hoppers 130, 135 and 711, respectively, and are otherwise ready for operation, depression of a start key SK of the card document preparation unit 600 will cause a relay R1 to be energized at a preselected time through the facility of a cam-operated contact C1 which makes at 0° and breaks at 240°. The relay R1 remains energized through its own contacts R1a and a cam-operated contact C2 which makes at 233° and breaks at 7°. With the relay R1 energized, a normally open contact R1b is closed to complete a circuit traceable from the +48 volt supply through a cam-operated contact C3, making at 270° and breaking at 315°; the relay contact R1b; two parallel paths from the relay contact R1b, one path consisting of normally closed contacts EDS1 and LDC1 of equal detail card sequence and low detail cross-comparison, respectively, and the other path including normally closed contacts EMS1 and LMC1 of equal master sequence and low master cross-comparison, respectively. The two parallel paths from the relay contact R1b are connected to the circuitry shown in FIG. 16 for the clutches 131 and 132. Only the circuitry from one of the clutches 131 and 132 is shown.

The low detail cross-comparison normally closed contact LDC1 is connected to commonly connected shield grids 133 and 134 of thyratrons 136 and 137, in FIG. 16, through grid network resistors 138 and 139. Control grids 141 and 142 of the thyratrons 136 and 137 are commonly connected to −30 volts through grid resistors 143 and 144 and a resistor 146, which is connected in parallel with a normally closed contact R2a of a relay R2 connected in series with a cam-operated contact C4 to +15 volts. The circuit breaker C4, as will be seen shortly, provides a short impulse every ten milliseconds. A cam-operated contact C5 is electrically connected in the plate circuit of thyratron 136 to control the ignition thereof and provides an impulse of five milliseconds duration once every ten milliseconds. A pick coil of relay R2, which controls the normally closed contact R2a, is also connected in the plate circuit of the thyratron 136 in series with and between the cam-operated contact C5 and clutch magnet CM. The clutch magnet CM and relay R2 also may be operated by the thyratron 137 which has a cam-operated contact C6 in its plate circuit connected between the plate and the relay R2. The cam-operated contact C6 also provides an impulse of five milliseconds duration once every ten milliseconds but occurring five milliseconds after the occurrence of the 5-millisecond impulse provided by the cam-operated contact C5. While the relay R2 is energized by either of the thyratrons 136 or 137, it remains energized by means of a hold coil connected between ground and normally open relay contact R2b which is connected in series with a clutch-controlled, cam-operated contact C7. The cam-operated contact C7 is operated to close when the clutch magnet CM is energized, and the contact will remain closed for ninety milliseconds and then open to enable the relay R2 to de-energize, as shown in FIG. 17.

While the impulse provided by the cam-operated contact C3 is not synchronized directly with the clutches 131 or 132 which have ten teeth available to receive the clutch dog when released by the clutch magnet CM, regardless where any one of the ten teeth are with respect to the clutch dog at the instant the impulse is applied to the shield grids 133 and 134 of thyratrons 136 and 137, the clutch will be engaged within ten milliseconds. Either thyratron 136 or 137 is capable of energizing the clutch magnet CM and, depending upon which 5-millisecond impulse is available to complete the plate circuit to the clutch magnet CM at the time the 20-millisecond impulse from C3 becomes available, will determine which of the thyratrons 136 and 137 will fire. Further, by means of the cam-operated contact C4, the thyratrons 136 and 137 are capable of firing only at the beginning of each 5-millisecond impulse. In this manner, damage to the clutch is prevented since the clutch dog will drop in only when one of the ten clutch teeth is available.

It is thus seen that, with the clutches 131 and 132 of the master and detail card reader units 110 and 120 engaged simultaneously, master and detail cards will be picked from the card hoppers 130 and 135, FIGS. 10 and 11, by picker knives 147 and 148 which operate in the conventional manner to be presented to a pair of cooperating feed rolls 151, 152 and 153, 154, respectively. The feed rolls 151, 152 and 153, 154 feed the master and detail cards past the first brush sensing stations 140 and 145 of the master and detail card reader units 110 and 120, respectively. The information contained in the master and detail cards is in punched hole form and is sensed in flight in the conventional manner by the brushes at the first brush sensing stations 140 and 145. The information so sensed is selectively compared by the cross-comparison collating circuitry 190, FIG. 4, to determine whether or not the information in the detail card 60 is associated with the proper name and address card 50. The actual circuitry and apparatus for making the comparison of information is described in U.S. patent application Serial No. 631,855 to H. Klotz, filed December 31, 1956, now Patent No. 2,995,241. The machine operator, through the facility of the well-known plugboard and pluggable connectors, can predeterminedly decide the manner in which cards will be fed or clutches engaged for the master and detail feed units when certain results have been obtained by the collating circuitry in comparing the sequence of master and detail cards and also in making the cross-comparison between the master and detail cards. For example, if the information of the master card, such as a serial number sensed at the first sensing station 140, compares low with respect to the serial number of the detail card sensed at the first sensing station 140, the machine operator may wish to continue feeding master cards from the card hopper 130 and stop the feeding of detail cards from the card hopper 135 until an equal comparison is obtained. This selective feeding of the master and detail cards is accomplished, of course, through the clutches 131 and 132 for the master and detail card reader units 110 and 120. In a like manner, if the results of the comparison indicate that the serial number of the detail card is low with respect to the serial number of the master card, feeding of master cards may be arrested and the feeding of detail cards continued until an equal comparison is obtained.

The clutches 131 and 132 for the master and detail card reader units 110 and 120, for one cycle of operation, will permit the first master and detail cards to be transported from the card hoppers 130 and 135, past the brushes at the first brush sensing stations 140 and 145, to feed rolls 156, 157 and 158, 159 which feed the master and detail cards to feed rolls 161, 162 and 163, 164 so that the first master and detail cards will be arrested just prior to coming under the brushes at the second brush reading station. However, the second master and detail cards will be picked by the picker knives 147 and 148 from the card hoppers 130 and 135 to enter the feed rolls 151, 152 and 153, 154, respectively, which will arrest the second master and detail cards just prior to their entry under the brushes at the first brush sensing stations 140 and 145, as seen in FIGS. 10 and 11. If the results of the cross-comparison indicate that the serial numbers of the first master and detail cards are equal, the clutches 131 and 132 for the master and detail card reader units 110 and 120 are again engaged so that the feed rolls 161, 162 and 163, 164 feed the first master and detail cards past the brushes at the second brush sensing stations 150 and 155 where the information is again read and sequence comparisons are made between the first and second master cards at the second and first sensing stations 150 and 140, respectively, and between the first and second detail cards at the second and first sensing stations 155 and 145, respectively.

The information read from the first master and detail cards at the second brush sensing stations 150 and 155 is compared with the information simultaneously being read from the second name and address cards at the first brush sensing stations 140 and 145. When the clutches 131 and 132 for the master and detail card reader units 110 and 120 were energized for a second time, the second master and detail cards were transported by the feed rolls 151, 152 and 153, 154 past the brushes at the first brush sensing stations 140 and 145. Hence, the information from the first master and detail cards at the second brush sensing stations 150 and 155 may be compared with the information from the second master and detail cards at the first brush sensing stations 140 and 145 to determine whether or not both the master and detail cards are in proper sequence. The results of the comparison for determining whether or not the master and detail cards are in proper sequence are used to further control the feeding of master and detail cards within the card reader units 110 120 and the card documents 710 within the card document preparation unit 600 according to the machine operator's discretion.

For example, if the serial number of the first master card were high in comparison with the serial number of the second master card and the master cards are to be fed low order first, there would be an indication that the second master card was not in proper sequence. This indication could be utilized to control further feeding of the cards or suppress printing at either of the print stations of the card document preparation unit or indicate an error condition or effect some other type of operation. Of course, the real purpose of checking the sequence of the master and detail cards is to determine whether or not there are multiple master or detail cards. If the serial number of the master card at the second brush sensing station 150 equals the serial number of the master card at the first brush sensing station 140, the sequence collating circuitry 115, FIG. 4, would indicate that there are multiple master cards for the name and address. Likewise, if the serial or account number of the detail card at the second sensing station 155 equals the serial number of the detail card at the first sensing station 145, the sequence collating circuitry 125 would indicate that there are multiple detail cards. The existence of multiple detail cards may require that the feeding of master cards be stopped until the sequence of detail cards is no longer equal but the detail card at the second sensing station 155 compares low to the detail card at the first sensing station 145. In any event, it is important to note that the machine operator may control the specific operation to be performed by the control signal resulting from the sequence check operation. The electrical circuitry and apparatus for performing the sequence check operation is also described in the above-referenced application of Klotz.

As the feed rolls 161, 162 and 163, 164 feed the master and detail cards past the second brush sensing stations 150 and 155, the master and detail cards are transported by feed rolls 166, 167 and 168, 169 to enter either the drop stackers 160 and 165, if the card deflectors 180 and 185 are operated, respectively, or to enter cooperating feed rolls 171, 172 and 173, 174, if the card deflectors 180 and 185 are not operated. The feed rolls 171, 172 and 173, 174 feed the master and detail cards to feed rolls 176, 177 and 178, 179 which, in turn, transport the master and detail cards to rotary drum stackers 170 and 175, respectively.

Additionally, the information read from the first master and detail cards 60 and 50 at the second brush sensing stations 150 and 155 is transferred in parallel to interim buffer storage elements 310 and. 320, FIGS. 4 and 12a. Each of the buffer storage elements 310 and 320 comprise an array of magnetic cores arranged in five rows with sixteen cores to a row, as seen in FIG. 12a. The second sensing stations 150 and 155 for the master and detail cards are schematically shown in FIG. 12a. Since the master and detail cards leave their respective card hoppers 130 and 135 with the "9" edge first, punched hole information in the eighty columns of row 9 of each card is read in parallel by the brushes at the second brush sensing stations 150 and 155 and is transferred in parallel to be entered or to set the eighty cores of each of the interim buffer storage elements 310 and 320. This action takes place during the first half of digit "9" time, each digit time being ten microseconds and subdivided into two parts. Hence, during the first half of the digit "9" time, the information in the eighty columns for both the master and detail cards, if any, sets the corresponding magnetic cores in the manner previously indicated hereinabove. During the second half of digit "9" time, the information in the interim buffer storage elements 310 and 320 is read out over the conductor 325 to a sense amplifier 326 and from the sense amplifier through a sense latch 327 to the translator 330 where the information is translated from the IBM code to the 7-bit code including the redundancy bit which is generated within the translator, the zone bits A and B translated from information in the cards, and the binary value bits −1−, −2−, −4− and −8− also translated from information in the cards. The IBM code is represented in detail by the perforations in a typical record card shown in FIG. 13. The digits 0–9, inclusive, are represented by perforations contained in rows 0–9, while the alphabetical characters A–Z, inclusive, are represented by the combination of perforations contained in the digit rows 1–9 and zone rows 0, 11 or 12. Additionally, special characters, such as those normally encountered in preparing billing instruments, are represented by various combinatons of perforations in digit and zone rows. The digits 0–9, inclusive, the alphabetical characters A–Z, inclusive, and the special characters in the 7-bit code, as represented by "1's" and "0's," is shown in FIG. 14. A blank in the IBM code is represented by the absence of any perforation, while in the 7-bit code it is represented with the C bit as 1 and all other bits, B, A, 8, 4, 2 and 1, as 0.

Information is read out of the cores of the interim buffer storage elements 310 and 320 by means of sixteen digit drivers 331 and ten word drivers 332, FIG. 12a. The sixteen digit drivers 331 are driven from a 16-point digit ring 333, while the ten word drivers 332 are driven by a 10-point word ring 334. Essentially, both the 16-point digit ring 333 and the 10-point word ring 334 are closed rings. The 16-point digit ring 333 is driven or advanced by negative reset impulses of two μseconds' duration generated from a 100 kc. clock 336. When the 16-point digit ring 337 advances through each of its sixteen points, it resets from its last or sixteenth point in the usual manner for operation of closed rings. However, after the 16-point ring 333 has advanced through all of its sixteen points, it is connected to advance the 10-point word ring 334 one point. Hence, when the 16-point digit ring 333 has been advanced or stepped through its sixteen points completely ten times, the 10-point word ring 334 is stepped along ten times or one time for each time the 16-point digit ring 333 has advanced through all sixteen points. Therefore, when the 10-point word ring 334 completely steps through all its points, all the information will be transferred from both of the interim buffer storage elements 310 and 320 through the sense amplifier 326 and latch 327 to the translator 330. Further, during the first half of digit "8" time, the information from the eighty columns in row 8 of each card, master and detail, is read into the interim buffer storage elements 310 and 320 to set the cores thereof.

More specifically, information is read from the master and detail cards in twelve steps, where each step corresponds to one of the twelve rows of each master and detail card, and is further subdivided into two substeps. During the first substep of each step, eighty parallel sensing brushes at the second brush sensing stations 150 and 155 scan the eighty parallel index positions for both the master and detail cards. Any one of eighty parallel index positions of each master and detail card may or may not contain a perforation; however, if a perforation is contained in one of the index positions, it will cause an electrical impulse to be generated which will be transmitted to an associated magnetic core, not shown but represented by blocks 310 and 320. The magnetic cores of the interim buffer storage elements 310 and 320 have two stable states characterized by a positive or negative remanent induction. Each of the magnetic cores is threaded by a winding to induce a magnetic field to drive or set the core from one magnetic state to the other to record therein the information contained at the associated index positions of the record master and detail cards. The cores are also threaded by digit, word and sense windings to permit the information in the cores to be read therefrom. Information is read from the cores by applying, through the facility of the word and digit drivers, a current of $-Im/2$ on both the word and digit windings. The 2-way coincidence of the selected word line and digit line provides a switching current of $-Im$ which is sufficient to switch any of the cores in the 1 state to 0. As the cores containing a 1 are switched to 0, a current is induced in the sense winding threading the core. The current is then amplified by the sense amplifier 326 and sets the sense latch 327. The sense latch 327 permits a longer period of time for the translator 330 to act or perform the translation from IBM code to the 7-bit code. The current impulses generated as the magnetic cores are switched are only approximately one microsecond; however, the sense latch 327 will be set or "on" until reset by the reset impulses of two microseconds duration which occur once every ten microseconds. Accordingly, while the information impulse is only approximately one microsecond in duration, the sense latch 327 will be on for approximately seven microseconds.

It is thus seen that the information derived from the master and detail cards at the second sensing stations 150 and 155 is stored in the interim buffer storage elements 310 and 320, which facilitate conversion of the information from the IBM code to the 7-bit code. The conversion of the information, however, is accomplished by means of the translator 330, FIG. 12a, and shown in greater detail in FIG. 15.

CODE CONVERSION

The translation from IBM code to the 7-bit code is performed by the translator or code converter 330, FIGS. 12a and 15. The translator 330 receives signals generated by cam-operated contacts indicating the value assigned to the row being scanned, signals from the interim buffer storage elements 310 and 320 due to the presence of perforations in the row being scanned and signals from the first buffer storage element 400 indicating the perforations sensed during previous row scannings. The signal indicating the value assigned to the row being scanned may be introduced into the translator 330 through cam-controlled breaker contacts CB1, CB2, CB4, CB8, CB0', CB0, CBA, CBB and CBC or digit timing impulses generated electronically. Hence, as the master and detail cards are progressively read in twelve steps, information is stored in the interim buffer storage elements 310 and 320, transferred therefrom to the translator 330 to be translated, stored after translation in the first buffer storage element 400, and then retranslated together with successive information coming from the next row in the master and detail cards via the interim buffer storage elements 310 and 320. The newly translated information and retranslated information is again entered into the first buffer storage element 400, and the process continues until a complete card of information for both the master and detail cards is entered into the first buffer storage element 400.

It is necessary to regenerate the information from the first buffer storage element 400 and transmit the same to the translator 330 to be combined with the information coming to the translator 330 from the interim buffer storage elements 310 and 320 so as to take into account code changes that could develop through the combination of information previously read with that just read. The combined information after being translated is again transmitted to the first buffer storage element 400 and regenerated to be again combined at the translator 330 with the information coming from the interim buffer storage elements 310 and 320. This action continues until all the information in the master and detail cards has been translated from the IBM code to the 7-bit code and stored in the first buffer storage element 400.

By regenerating the information from the first buffer storage element 400 and transmitting the same back to the translator 330 to combine it with the information coming from the interim buffer storage elements 310 and 320, it is possible to handle perforations which express different data according to particular combinations of perforations as defined by the IBM code. For example, a perforation in row 1 of the record cards could express either a number digit 1 or an alphabetic letter, or else a special character through its combination with another or several other perforations, respectively.

The translator is shown in detail in FIG. 15. The master and detail cards each comprise eighty columns and twelve rows; and, according to the location of the perforations entered therein, it is possible for each of the cards to contain eighty characters. The lower ten rows of the cards are assigned to represent digits 0–9; and the upper three rows, again including the row 0, or the rows 0, 11 and 12, serve the purpose of defining the alphabetical letters and the special characters, the algebraic signs, etc., through their combination with other digital combinations, as in FIG. 13.

In order to represent an alphabetical character, the code is used which comprises two perforations in the same column for each letter, one of the perforations being one of the digits 1–9 and the other perforation being one of 0, 11 and 12. The code for special characters comprises either three perforations or two perforations. Those special characters represented by three perforations have a perforation in one of the rows 0, 11 and 12 and two perforations in the rows 1–9, while those special characters represented by two perforations have the same in the rows 1–9. It may be noted that, in any given column, a perforation in row 0 may indifferently correspond to digit 0, to an alphabetical letter, or to a special character, depending upon whether or not the perforation in the 0 row of the particular column is in the column by itself or in combination with other perforations in the same column but in different rows.

The IBM code is used in the interim buffer storage elements 310 and 320; but the 7-bit code of 1, 2, 4, 8, A, B and C is used in the seven buffer storage elements 400, 425, 450, 475, 500, 525 and 550. With reference to FIGS. 13 and 14, it may be seen how the digits, alphabetical letters and special characters are coded in both the IBM code and in the 7-bit code.

For the 7-bit code, 0 and 1 designate the bit values and, depending upon what bit values are present for each of the seven bits, the digit, alphabetical letter or special character may be represented. Further, since the bit values may be 1 or 0 and magnetic cores may be selectively placed in the 1 or 0 remanence state, the magnetic cores can be used to store the information in 7-bit code. The bits 1, 2, 4 and 8 of the 7-bit code facilitate the representation of digits 0–9 in the binary numeration system as follows:

| Decimal numeration | Binary numeration |
| --- | --- |
| 0 | 8+2 |
| 1 | 1 |
| 2 | 2 |
| 3 | 2+1 |
| 4 | 4 |
| 5 | 4+1 |
| 6 | 4+2 |
| 7 | 4+2+1 |
| 8 | 8 |
| 9 | 8+1 |

The bits A and B of the 7-bit code are grouped together with one or more of the bits 1, 2, 4 or 8 to represent an alphabetical letter or a special character, as shown in FIG. 14.

The C bit of the 7-bit code is a check or verification bit. For each digit, alphabetical letter, or special character, if the total number of bits having the value 1 to represent the same are of even order, the C bit must be added thereto. If the total number of bits having the value 1 to represent the digit, alphabetical letter or special character is of odd order, the C bit is not added. Hence, all digits, alphabetical letters and special characters will ultimately be represented by an odd number of bits including the representation for a "blank," which constitutes the C bit only. In this manner, the 7-bit code permits, at any one operation step of the electronic control unit 300, to disclose any error by checking to see if the bits representing any character is other than the odd order. Accordingly, the errors would be sensed when there is an absence of any bits having the value 1 or the bits having the value 1 total to an even order, including the C bit.

Of course, with the 7-bit code, it is possible to provide the C bit in such a manner that the total number of bits having the value 1 to represent any character is even. In this manner, if the total is other than of even order, an error is sensed; otherwise, the character is verified as being correct. While it doesn't make any difference so far as the present invention is concerned, the odd bit check appears to be preferable over the even bit check because it presents the advantage to sense an error in the situation where all the bits representing a character have the value 0, because this situation should not occur, because, with a digit value 0 or blank, the C bit makes the total number of bits odd; and, therefore, unless the total is odd, an error exists.

In translating from the IBM code to the 7-bit code, the perforations in the 0 row, which may either represent the digit 0, are then translated into bits 2+8, or an alphabetical letter or a special character through the combination with another perforation. Thus, for a given column of either the master or detail cards, the perforation in the 0 row must be translated into 8+2 or into some other bit combination, depending upon what other rows of the particular column have been perforated. To accommodate this particular situation or problem, the information at digit "10" time or "0" time is read into the interim buffer storage elements 310 and 320 and then compared with the information coming from the first buffer storage element 400, stored therein during preceding digit times. The retranslated information is then again entered into the first buffer storage element 400.

The translator 330 receives information generated by mechanical means to indicate the particular row being sensed by the brushes at the second sensing stations 150 and 155. This information is introduced into the translator 330 by circuit breakers CB1, CB2, CB4, CB8, CB0, CB0′, CBA, CBB and CBC. The translator also receives bit impulses from the first buffer storage element 400 through the seven sense latches T-1, T-2, T-4, T-8, T-A, T-B and T-C, set by impulses from the first buffer storage element 400 via sense amplifiers A-1, A-2, A-4, A-8, A-A, A-B and A-C, respectively, to indicate the information represented by perforations in the rows of the master and detail cards previously scanned. The signals from the interim buffer storage elements 310 and 320 and the signals from the circuit breakers CB1, CB2, CB4, CB8, CBA, CBB and CBC permit entry of the information just being sensed into the first buffer storage element 400. The information coming from the latches T-1, T-2, T-4, T-8, T-A, T-B and T-C permit re-entry of the information already sensed into the first buffer storage element 400.

The contacts operated by the circuit breakers CB1, CB2, CB4, CB8, CB0, CB0′, CBA, CBB and CBC are normally open but closed in accordance with the table indicated below to represent the digit time in binary form:

| Row or digit time | Circuit breakers closed |
|---|---|
| 9 | CB1-CB8 |
| 8 | CB8-CBC |
| 7 | CB1-CB2-CB4 |
| 6 | CB2-CB4 |
| 5 | CB1-CB4 |
| 4 | CB4-CBC |
| 3 | CB1-CB2 |
| 2 | CB2-CBC |
| 1 | CB1-CBC |
| 0 | CB0-CB0′ |
| 11 | CBB-CBC |
| 12 | CBA-CBC |

Additionally, the translator 330, FIG. 15, includes nine logical OR circuits O1, O2, O3, O4, O8, OA, OB, OC, On and Oh; six logical AND circuits e0, e0′, eA, eA′, eC and eC′; and three inverters In, Ie and Ie′.

The signals from the interim buffer storage elements 310 and 320 are applied over conductor 337 to the lower contacts of all circuit breakers CB1, CB2, CB4, CB8, CB0, CB0′, CBA, CBB and CBC. The upper contacts of CB1, CB2, CB4, CB8, CBA and CBB are connected to corresponding logical OR circuits O1, O2, O4, O8, OA and OB. The upper contact of CBC is connected to OR circuit Oh, and the upper contact of CB0 is connected as an input to logical AND circuits e0 and eA. The upper contact of CB0′ is connected as an input to logical AND circuits e0′ and eA′. The circuit breakers CB0 and CB0′ receive an impulse if any perforations are sensed in the row 0 of either the master or detail cards. The impulse representing a 0 must be translated into 8+2 or some other combination for the 7-bit code, depending upon whether or not the 0 is the only perforation in the particular column. Any other perforations in the column for rows preceding the 0 row will be available from the first buffer storage element 400 and effectively are reread when scanning or sensing the row 0. The information from the first buffer storage element will set the sense latches T-1, T-2, T-4, T-8, T-A, T-B and T-C, accordingly. If none of the sense latches T-1, T-2, T-4, T-8, T-A, T-B or T-C are set, this indicates that no information or no perforations were sensed during the preceding reading of the preceding rows 9-1, inclusive, and will correspond to the absence of a signal at the output of the inverter In having an input from the OR circuit On which has inputs from the sense latches T-1, T-2, T-4 and T-8. The OR circuit On, of course, does not have any inputs from the sense latches T-A, T-B or T-C because these latches would not be set in any event; i.e., the presence or absence of perforations during the reading of the preceding rows 9-1, inclusive. Hence, with no output from the inverter In, the perforation in the 0 row would be interpreted to be 0 and would require translation to 2+8. The output of the inverter In is connected as an input to the AND circuits e0 and e0′, the other inputs to logical AND circuits e0 and e0′ being from the upper contacts of the circuit breakers CB0 and CB0′. Hence, the logical AND circuits e0 and e0′ receive a signal only if a perforation is sensed when reading the row 0. Coincidence of input signals to the two logical AND circuits e0 and e0′ indicates the existence of a digit 0, which therefore must be coded as 2+8. To accomplish this coding, the output from the logical AND circuit e0 is connected as an input of an OR circuit O2 and the output of the logical AND circuit e0′ is connected as an input to an OR circuit O8.

However, a signal at the output of the OR circuit On will indicate the existence of at least one digital perforation sensed during the preceding reading of the preceding rows 9-1, inclusive. Hence, the perforation, if any, in the 0 row would indicate something other than the digit 0 because it would be combined with the information or perforation sensed previously and stored in the first buffer storage element 400. Accordingly, the output of the OR circuit On is connected as an input to logical AND circuits eA and eA′, which also have inputs from the upper contacts of CB0′ and CB0, respectively. Coincidence of signals at the logical AND circuits eA and eA′ indicates the existence of a non-digital 0, which therefore must be coded to represent its proper meaning as will be determined by the previous perforations sensed during the reading of rows 9-1, inclusive. The output of the logical AND circuit eA′ is connected as an input to a logical OR circuit OA, while the output of the AND circuit eA is connected as an input to a logical OR circuit Oh which enables to change bit C, as will be described shortly.

Essentially, when previous perforations have been sensed while reading rows 9-1, inclusive, it is equivalent to changing the even order of the total number of bits having the value 1 which are entered into the first buffer storage element 400. Therefore, in order to restore the even order, it is necessary to change or modify bit C; i.e., to delete the bit C if it had existed and to generate the bit C if it had not existed.

This change or modification of bit C must take place every time it is necessary to record an odd number of bits; for example, during the sensing of row 1, only bit 1 it to be entered into storage if a perforation is present. Hence, all contacts of the circuit breaker CBC make simultaneously with those of CB1 to start the change of bit C. The upper contact of circuit breaker CBC is connected as an input to the OR circuit Oh. A signal from the output of the OR circuit Oh means that it is necessary to change the bit C; i.e., it is to be deleted or generated.

There are two conditions to be considered for either change of bit C: bit C exists and must not be changed, and bit C does not exist and must be changed.

The first two mentioned conditions exist when there is coincidence of signals on the inputs to a logical AND circuit cC. One input of the AND circuit cC is connected to the sense latch T-C which, if "on," expresses the existence of the bit C. The other input to the AND circuit cC is connected to the output of an inverter Ic' which, if conducting, indicates the absence of a signal from the output of the OR circuit Oh to indicate that bit C must not be changed.

The latter two mentioned conditions are determined by whether or not simultaneous signals are applied at the inputs to the logical AND circuit cC'. The input to the logical AND circuit cC' from the inverter Ic has a signal thereon only if bit C does not exist and the other input to the AND circuit cC' from the OR circuit Oh receives a signal only if bit C must be changed. Hence, for both the former and latter-mentioned two conditions, a signal, either at the output of cC or cC', indicates that it is necessary to enter the bit C through the OR circuit OC. Information from the logical OR circuits OC, OB, OA, O8, O4, O2 and O1 is entered into the first buffer storage element 400 through corresponding inhibit drivers.

The information corresponding to the perforations scanned during the preceding reading of the preceding rows and entered into the first buffer storage element 400 is regenerated simultaneously with the scanning of each successive row.

Information read from the first buffer storage element or read signals are applied through sense amplifiers A-1, A-2, A-4, A-8, A-A and A-B to sense latches T-1, T-2, T-4, T-8, T-A and T-B, respectively. The outputs from the sense latches T-1, T-2, T-4, T-8, T-A and T-B are connected as inputs to corresponding logical OR circuits O1, O2, O4, O8, OA and OB. The outputs of the logical OR circuits O1, O2, O4, O8, OA, OB and OC are connected by conductors L1, L2, L4, L8, LA, LB and LC to the bit inhibit drivers B1, B2, B4, B8, BA, BB and BC, respectively, for the first buffer storage element 400.

In this manner, all data represented by perforations in a single row of the master and detail cards is entered in parallel to the interim buffer storage elements 310 and 320 directly from the reading brushes at the second brush sensing stations 150 and 155. Hence, after scanning the first row or, in this example, row 9 of the master and detail cards, the 80 magnetic cores for each of the interim buffer storage elements 310 and 320 are set to form an "image" of row 9; i.e., any of the 80 columns of row 9 which have perforations will set corresponding magnetic cores in the 1 state, while those columns not containing any perforations will permit the corresponding magnetic cores to remain in the 0 state. The information represented by the perforations in the columns of row 9 and entered into the interim buffer storage elements 310 and 320 is transferred to the first buffer storage element 400 via the translator 330 prior to scanning row 8 of the master and detail cards. When row 8 is scanned, the information therein, as represented by perforations, is entered into the interim buffer storage elements 310 and 320 and then read out of the same to be transferred to the translator 330 together with the information of row 9 which is simultaneously being read out of the first buffer storage element 400. The information of rows 8 and 9 is combined at the translator 330 and entered into the first buffer storage element 400. As successive rows of the master and detail cards are read, information therefrom is entered into the interim buffer storage elements 310 and 320 and read out to be combined at the translator 330 with information read out simultaneously from the first buffer storage element 400. The combined information is entered into the first buffer storage element 400, and this action continues until the first buffer storage element 400 contains the entire information or complete card "images" of the master and detail cards.

It is believed that the foregoing is sufficient description of the apparatus for reading information from the master and detail cards, translating it into the 7-bit code and entering the translated information into the first buffer storage element. For greater details, with respect to checking the translated information, reference may be had to the E. Estrems et al. application, Serial No. 704,779, filed December 23, 1957.

TRANSFER OF INFORMATION FROM BUFFER STORAGE ELEMENTS

After reading the first master and detail cards and translating the information thereof into 7-bit code, the information of the first master and detail cards will be residing in the first buffer storage element 400, FIG. 2a, which functions to store the 160 digits of information and make part of it, or the eighty digits of the name and address part of the entire 160 digits of information, available to the printing mechanism at the first print station S1 to print the name and address upon the first card document 710 fed from the card hopper 711 of the document preparation unit 600. The feeding of the card documents 710 through the document preparation unit 600 will be described in detail later herein.

The detail information or data from the first detail card will be transferred from the first buffer storage element 400 to the second buffer storage element 425, FIGS. 12a and 12b, to preserve the detail data of the first detail card to permit further processing of it or making it available for printing at the second print station S2. Further, as the detail information is transferred to the second buffer storage element 425, the first buffer storage element 400 becomes clear of all information pertaining to the first master and detail cards to permit entry of information from the second master and detail cards in the manner previously described under the headings of "Card Reader" and "Code Conversion." Before continuing with the transfer of the data information of the first detail card to the third buffer storage element 450, the information of the second master and detail cards will be considered.

There are two possibilities as to what information will be contained in the form of perforations in the second master and detail cards. First of all, the second master card could be a multiple name and address card containing information to complete the name and address on the first card document 710 fed from the card hopper 711 of the document preparation unit 600. Also, it may be noted that, if this were to be the situation, then the card document preparation unit 600 would become aware, through the collating circuitry of the card reader 100, that the gates 910 and 920 at the first print station S1 must both be operated to enter into the card path to selectively arrest the first card document of the card document preparation unit 600, at each of the two stopping positions at the first print station S1.

The possibility of the occurrence of multiple name and address cards exists when a 3-line name and address is to be printed and none of the lines thereof are preprinted, when a preprinted line of a 3-line name and address to be printed is in error, and when a 4-line name and address is to be printed and either none or only one line of the name and address is preprinted.

The existence of multiple name and address cards or master cards is detected in the master card reader unit 110 of the card reader 100 by the collating circuitry 115 for making a sequence check through the facility of the first and second brush sensing stations 140 and 150, FIG. 4. Similarly, the collating circuitry 115 of the master card reader unit 110 of the card reader 100 can ascertain that there is only a single name and address card or master card relating to the first card document of the card document preparation unit 600 by performing a sequence check between the first and second master cards which will be at the first and second brush sensing stations 140 and 150, respectively. The condition of multiple master cards is detected when the account number of the master card at the second sensing station 150 equals the account number of the master card at the first sensing station 140; if the account number of the master card at the second sensing station 150 compares low with respect to the account number of the master card at the first sensing station 140, the master cards are in their proper sequence and there is only one master card for the name and address.

The other possible condition would be the existence of multiple detail cards. This condition would be detected by the collating circuitry 125 for performing a sequence check between the first detail card at the second brush sensing station 155 of the detail card reader unit 120 and the second detail card at the first brush sensing station 145. If there is an indication that the two detail cards are equal; i.e., both contain the same serial number, then there are multiple items to be printed upon the first card document 710 of the card document preparation unit 600 at the second print station S2 thereof. Further, if the two detail cards are unequal, it will mean either one or two conditions: either the cards are not in their proper sequence, this occurs if the first detail card compares high with respect to the second detail card and the cards are being fed sequentially low order first; or the detail cards are in proper sequence but there is only a single item to be printed upon the card document 710 at the second print station S2 of the card document preparation unit 600, this occurs when the first detail card compares low with respect to the second detail card.

Since the clutches 131 and 132 for the master and detail card reader units 110 and 120 are selectively operable and are operated in accordance with the results of the collating operation, the information effectively read into the first buffer storage element 400, after reading therein the information of the first master and detail cards, may vary. If either of the master or detail card feeds is arrested while the other continues feeding cards, normally, only eighty digits of information or one card "image" would be entered into the first buffer storage element 400. However, if the cards in the card reader unit which continues to operate are caused to be fed at twice their normal rate, then 160 digits of information could be entered into the first buffer storage element to utilize the full capacity thereof.

In any event, all the information entered into the first buffer storage element 400 will be transferred therefrom to permit subsequent entries of information therein from the card reader 100. Further, the information transferred from the first buffer storage element 400 may be reentered into the first buffer storage element 400, entered into an accumulator 410, FIGS. 4, 12a and 12b, entered into the second buffer storage element 425, or transmitted to the first print station S1 of the card document preparation unit 600.

Information is read out of each of the seven buffer storage elements 400, 425, 450, 475, 500, 525 and 550 serial by digit and parallel by bit. The first buffer storage element 400 is a 3-dimensional magnetic core array having seven bit planes, sixteen digit planes, and ten word planes. While the structure and principle of operation of the buffer storage elements were described earlier herein, a more detailed description of 3-dimensional magnetic core arrays is contained in U.S. Patents No. 2,739,300 and No. 2,740,949.

Data or information in any of the seven buffer storage elements is read out during the 3-microsecond A time of each digit and information is written therein during the 3-microsecond B time of each digit time. Hence, at A time of a digit time, one of the points of the 16-point digit ring 333 will activate one of the sixteen digit drivers 411 and one of the points of the 10-point ring 334 will activate one of ten word drivers 412 to switch the state of the magnetic cores which are in the 1 state to the 0 state.

The sense windings threading the magnetic cores which have been switched will carry induced currents or signals to the corresponding sense amplifiers A–C, A–B, A–A, A–8, A–4, A–2 and A–1, respectively. The amplified signals will then be applied to the corresponding sense latches T–C, T–B, T–A, T–8, T–4, T–2 and T–1 to set the same "on." With the corresponding sense latches "on," a digit of information has been read out of the first buffer storage element. With the first digit of information read out of the first buffer storage element 400, the disposition of this digit of information will be described shortly, the sense latches T–C, T–B, T–A, T–8, T–4, T–2 and T–1 are reset by the 2-microsecond reset impulse which also advances the 16-point digit ring 333 one point; the 10-point word ring 334 will not be advanced until all sixteen points of the 16-point digit ring 333 have been advanced. This action continues and, thusly, the digits are read out of the first buffer storage element 400 serially as represented by parallel bits according to the 7-bit code.

The data flow line for the digit information is represented in FIGS. 12a and 12b by a single line, while, in actuality, seven lines are necessary to transmit the seven bits of data to comprise one digit of information. Accordingly, as digit data flows serially from the first buffer storage element 400 through the sense amplifiers and sense latches, it is applied by a conductor 413 which connects with conductors 414, 415, 416 and 417 connected as inputs to logical AND circuits 418, 419, 420 and 421.

The AND circuit 418 also has an input connection from a storage transfer gate 422, shown in block form, for controlling transfer of information from the first buffer storage element 400 to the second buffer storage element 425. A typical gate representative of all information transfer gates will be described shortly. Hence, coincident signals at the inputs to the logical AND circuit 418 will effect transfer of information from the first to the second buffer storage element. Therefore, by selectively controlling the storage transfer gate 422, selected information may be transferred to the second buffer storage element 425.

Similarly, the logical AND circuit 419 also has an input connection from a read out to accumulator gate 423 which is selectively operable to apply a signal at predetermined time intervals to condition the AND circuit 419 so that, upon coincidence of digit information signals, selected digit information will be passed by the AND circuit 419 to enter the accumulator 410. Further, the logical AND circuit 420 also has an input connection from a read out to the first print station gate 424 which is selectively operable to apply a signal at predetermined time intervals to condition the AND circuit 420 so that, upon coincidence of signals at the AND circuit 419 from the first buffer storage element 400 and the read out to the first print station gate 424, selected digit information will be transmitted to the print setup mechanism for presetting the matrix wires of the print heads P1 and P2 at the first print station S1.

Additionally, the logical AND circuit 421 also has an input connection from a logical OR circuit 426 having inputs from an inverter 427 and from a card read-in gate 428. The inverter 427 has an input conductor connected to the storage transfer gate 422. In this manner, coincidence of signals from the first buffer storage element 400 and the logical OR circuit 426 at the inputs of the AND circuit 421 will permit regeneration of information into the first buffer storage element 400. It is to be noted that, when information is read out of the magnetic cores of any buffer storage element, the magnetic cores are set to the 0 state. Hence, to retain information within the buffer storage elements, the information must be continuously read back into the buffer storage elements. By connecting the output of the storage transfer gate 422 to the inverter 427, information will not be regenerated to the first buffer storage element 400 while information is being transferred therefrom to the second buffer storage element 425 unless the card read-in gate 428 is operated; however, the timing of the operation of the card read-in gate 428 and the storage transfer gate 422 is such that the gates will not be operated simultaneously.

Figure 39B:
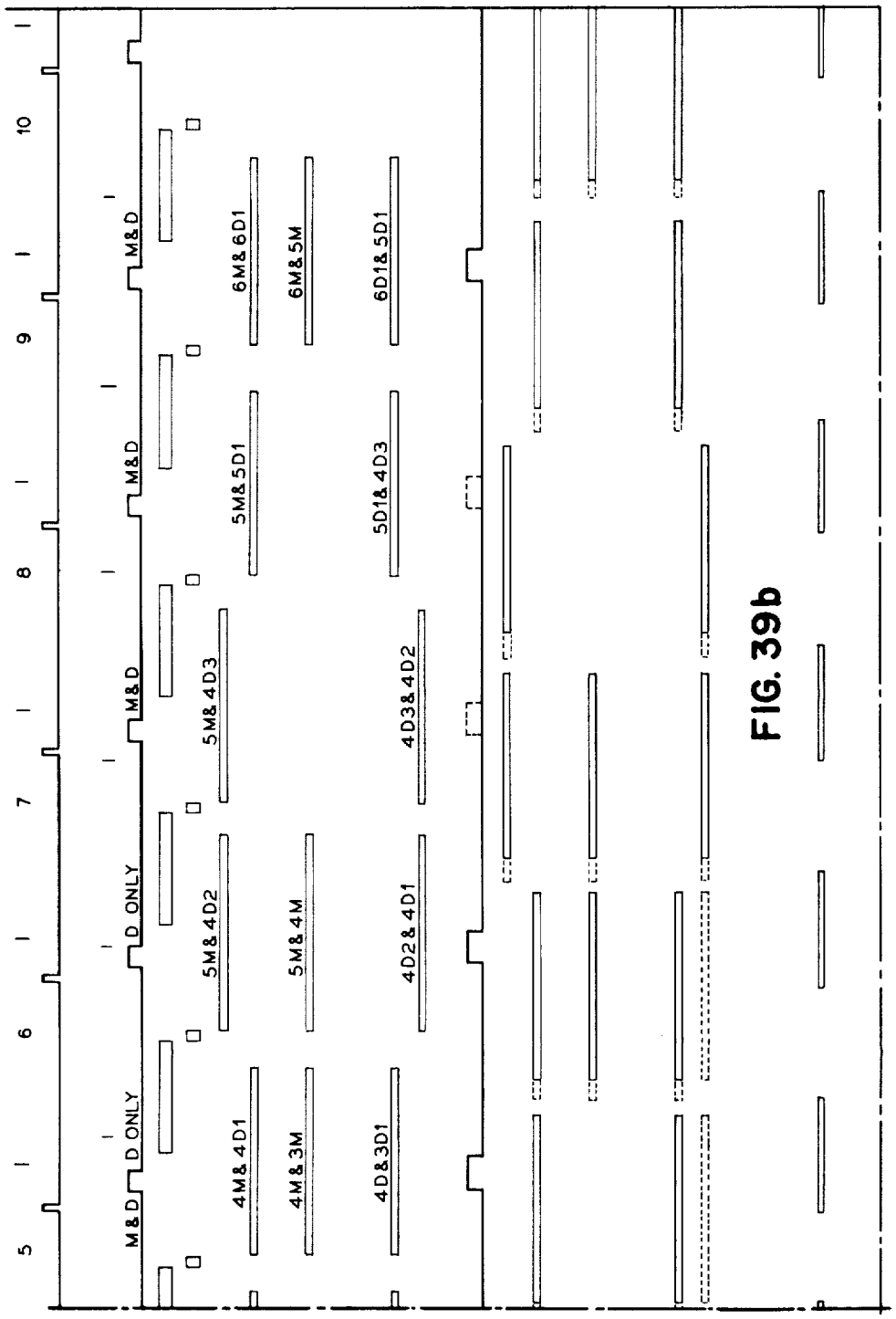
Figure 39C:
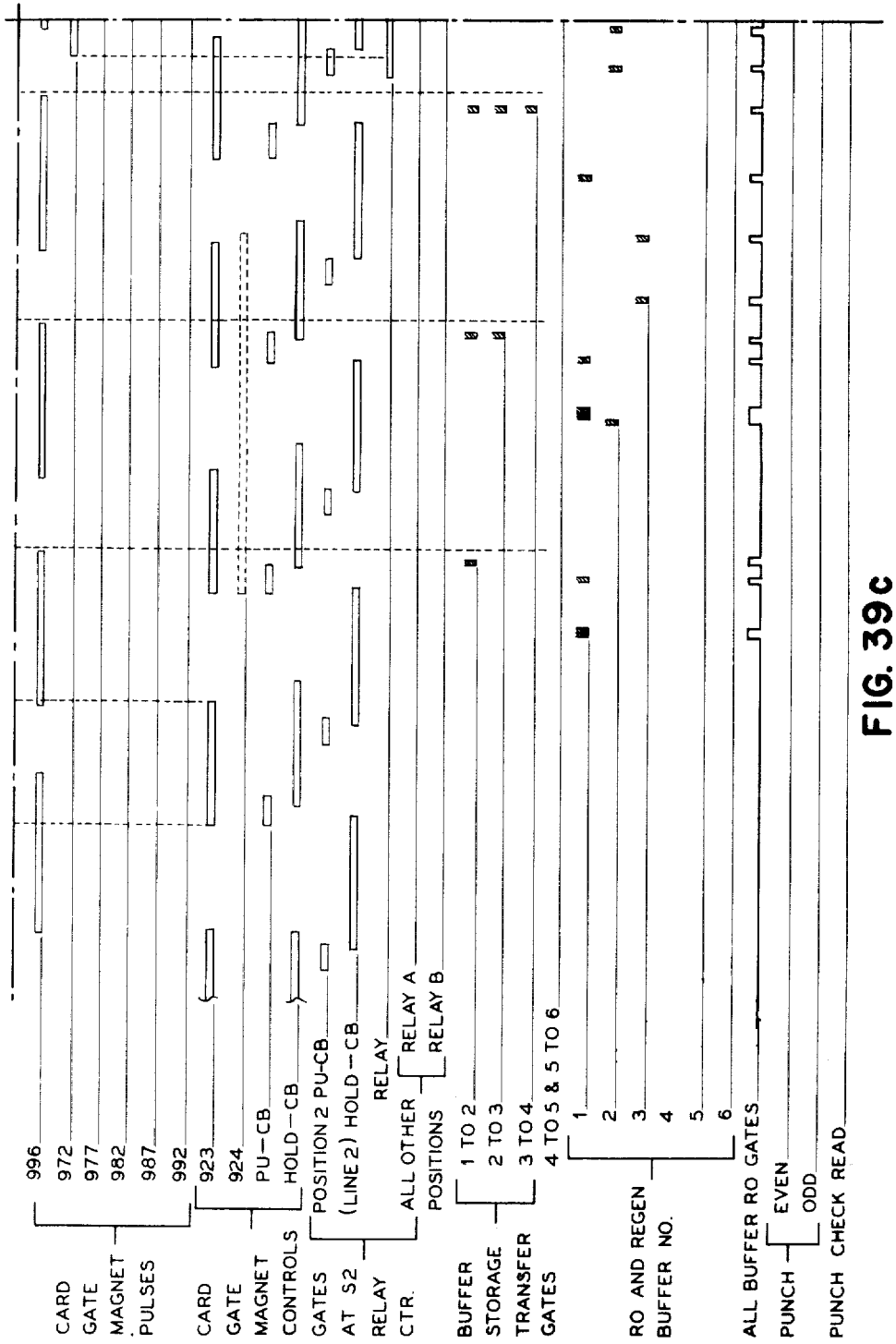
Figure 39D:
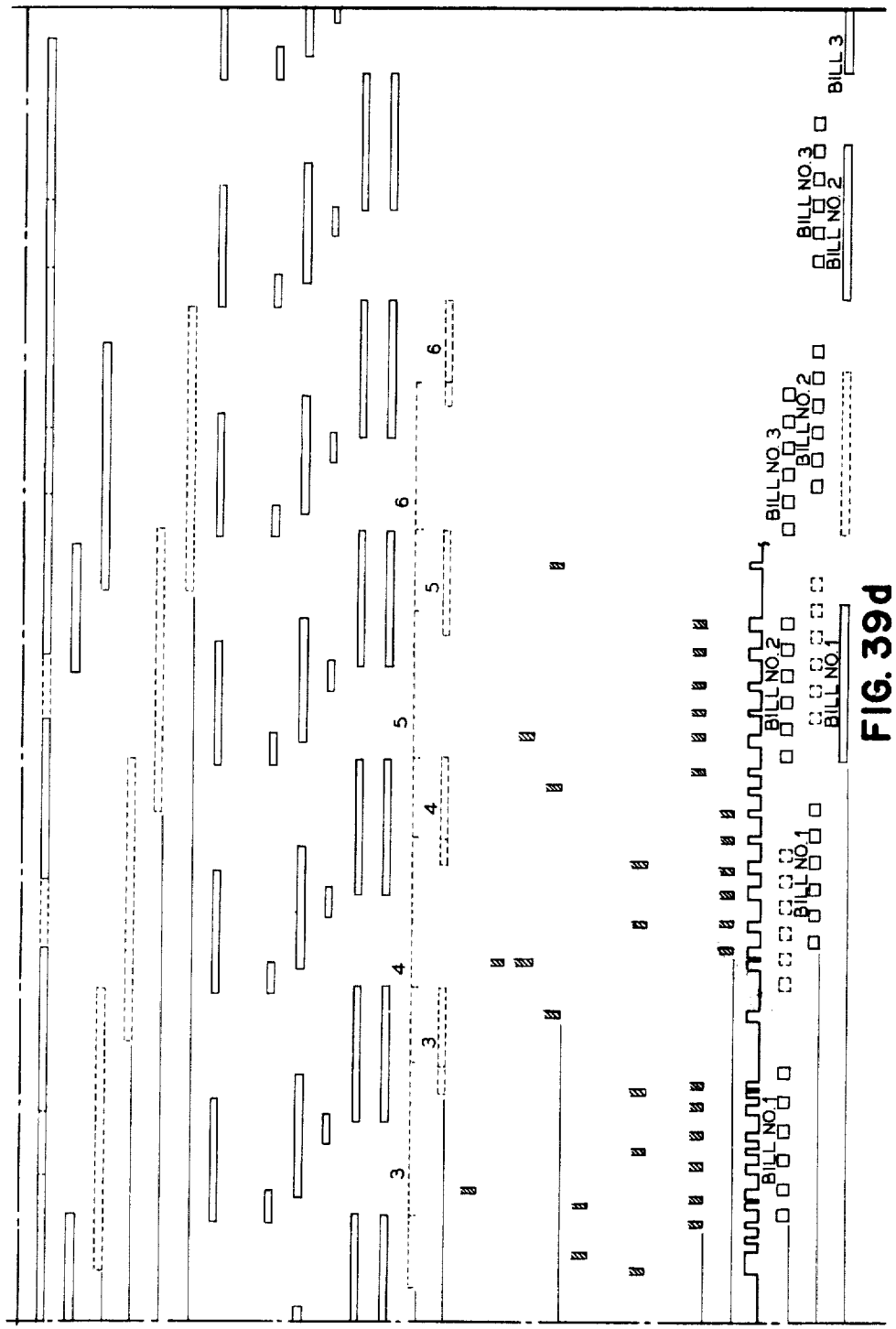

The storage transfer gate 422, read out to accumulator gate 423, read out to first punch station gate 424, and read in from card gate 428 are identical in structure but are operated at different times; accordingly, a gate representative of the aforementioned gates, shown in FIG. 18, will be described. The gates just mentioned are timed by circuit breakers which assure complete transfer of information and only a single transfer of information at any one time. The timing for the various gates mentioned is shown in FIGS. 34a and 34b, and 39c. Referring now to FIG. 18, the typical gate is shown as comprising a double inverter 430, of the type well known in the art, which is connected to receive impulses from a typical cam-operated circuit breaker, not shown, so that, upon the opening of the contacts controlled by the circuit breaker, a negative-going signal is passed by the double inverter 430 and transmitted as a negative-going signal to a cathode follower 431. Because cam-operated contacts have a tendency to bounce and thereby introduce background noise signals, the double inverter 430 and grid input circuit 429 tend to eliminate some of the background noise signals. The cathode follower 431 gives power to the signal and improves the shape thereof so that the signal, when transmitted to a single-shot multivibrator 432 which is connected to the cathode follower 431, will cause the same to operate. Once the single-shot multivibrator 432 is rendered operative, it continues to operate until a signal turns it off; i.e., it is a free-running device once it is started. The output of the single-shot multivibrator 432 is connected to a cathode follower 433 which functions to shape the output signal. The output of the cathode follower 433 is connected as an input to a logical OR circuit 434 which, in turn, is connected to a latch 435. The latch 435 is set by the signal coming from the single-shot multivibrator 432. With the latch set, the signal is effectively stored until the latch 435 is reset. The output of the latch 435 is connected to a cathode follower 436 for purposes of shaping the output signal. The output of the cathode follower 436 is connected to logical AND circuits 437 and 438. The logical AND circuit 438 also has an input 439 connected to permit a "home B" impulse to be applied thereto. A "home" impulse is generated initially when the digit ring and word ring are in their starting position and reoccurs once every 160 digit times or when the digit ring and word ring are again in their initial position. The "home" impulse is divided into "home A" and "home B" impulses, each of three microseconds duration.

The output of the logical AND circuit 438 is connected to a logical OR circuit 440 having its output connected to a latch 441. In this manner, upon coincidence of a "home B" impulse and an output signal from the latch 435 in the set or "on" position at the logical AND circuit 438, a signal will be passed to the logical OR circuit 440, which will also pass the signal for setting the latch 441. The latch 441 has an output connection 442 to the AND circuit 437 whose output is connected to the OR circuit 434. Hence, with the latch 435 set, the same will be reset when the "home B" impulse is applied to the AND circuit 438 because, with the latch 435 set, the application of the "home B" impulse to the AND circuit 438 will cause the latch 441 to be set; and, as the latch 441 is set, a signal is transmitted to and passed by the AND circuit 437, through the OR circuit 434, to reset the latch 435.

The latch 441 also has an output 443 connected to a cathode follower 444 for shaping the output signal. The output of the cathode follower 444 is connected as an input to the OR circuit 440 and as an input to, for example, the AND circuit 418 shown in FIG. 12a. Referring back to FIG. 18, the latch 441 remains set or "on" until reset by "home A" impulse transmitted over the conductor 445 which is connected to the latch 441.

With the latch 441 "on," information will be transferred from the first to the second buffer storage element. It is thus seen that a cam-operated circuit breaker, not shown, controls the setting of the latch 435 which, in turn, conditions the AND circuit 438 to permit setting of the latch 441. The latch 441, set by "home B" impulse and reset by "home A" impulse, conditions the particular AND circuits 418, 419, 420 and 421 to enable the same to pass information from the first buffer storage element 400 to the second buffer storage element 425 to the accumulator 410, to the first print station S1 and back to the first buffer storage element 400. It will be remembered that the preceding description is of a typical gate set through the facility of a typical cam-operated circuit breaker. Hence, while each gate or the storage transfer gate 422, the read out to accumulator gate 423, read out to first print station gate 424, and card read in gate 428 are identical in structure and principle of operation, these gates are selectively operable for determining what information is to go where from the first buffer storage element 400.

Information passed by the AND circuit 418 when the storage transfer gate 422 is set or up enters the second buffer storage element 425 through the logical OR circuit 447, as seen in FIG. 12b.

The second buffer storage element 425 has an information storage capacity of 112 digits of information. While it is possible to transfer only eighty digits of information from the first to the second storage element, an additional 32 digits of storage capacity is necessary to store information coming from the accumulator 410 so that the information coming from the detail card for a single item document and the accumulated information will be in the same buffer storage element and thereafter advance together from the second buffer storage element 425.

Information coming from the accumulator 410 is transmitted over a conductor 448 connected thereto and to the input of a logical AND circuit 449. The AND circuit 449 also has an input connection 451 from the collating circuitry 125 of the card reader unit 120 for indicating that the sequence of the detail cards is in order and the serial or some other identifying number of the detail card at the second brush sensing station 155 does not equal the serial or other identifying number of the detail card at the first brush reading station 150. Under these conditions, only a single item is to be printed upon the card document 710 being prepared by the card document preparation unit 600; and, therefore, the information coming from the accumulator 410 will be entered into the second buffer storage element 425 rather than being entered into the third buffer storage element 450, as it would if a multiple item instrument or card document were to be prepared by the card document preparation unit 600. When a multiple item card document is to be prepared; i.e., when there are indications from the cross-comparison collating circuitry 190 that more than one detail card compares equal to a single master card and from the detail sequence collating circuitry 125 that successive detail cards compare equal to each other, the information from the accumulator 410 will be entered into the third buffer storage element 450. The conductor 448 is also connected to a logical AND circuit 452 which also has an input 453 from the collating circuitry indicating that multiple items are to be printed upon the card document 710 by the card document preparation unit 600. The output of the AND circuit 452 is connected to a logical OR circuit 454 which is connected to the seven bit inhibit drivers for the third buffer storage element 450.

The particular information which may be entered into the third buffer storage element 450 will be described shortly. However, referring back to the second buffer storage element 425, it is seen in FIG. 12b that, while there are seven bit inhibit drivers and sixteen digit drivers, there are only seven word drivers. In view of the fact that the second buffer storage element 425 has a capacity for only 112 digits of information and there are sixteen digits of information to a word for each of the seven words, hence, only seven word drivers are necessary. The storage transfer gate 422 for controlling transfer of information from the first to the second buffer storage element is also utilized to control regeneration of information with respect to the second buffer storage element. An inverter 456 is connected to the storage transfer gate 422 by a conductor 457 and to a logical AND circuit 458 also having an input 459 represented by one line from the seven sense latches for the second buffer storage element 425 which receives signals therefrom via the seven sense amplifiers. The output of the AND circuit 458 is connected as an input to the logical OR circuit 447. Hence, when the storage transfer gate 422 for the first buffer storage element 400 is down or reset, information from the second buffer storage element 425 will be regenerated to enter the second buffer storage element.

Information coming from the second buffer storage element 425 via the seven sense amplifiers and latches is also transmitted over lines as represented by the single line 459 to logical AND circuits 461 and 462, respectively. The AND circuit 461 also has an input connection from the collating circuitry for indicating that a multiple item document or instrument is to be prepared. Additionally, the AND circuit 461 has an input connection from a read out to second print station gate 463, which is selectively operable to condition the AND circuit 461 so that selected digit information may be transferred to the print setup mechanism at the second print station S2. The read out to second print station gate 463 is similar to the read out to first print station gate 424 previously mentioned in connection with the description of a typical gate. The output from the AND circuit 461 is connected to a logical OR circuit 464.

The AND circuit 462 also has an input connection from a selectively operable storage transfer gate 466 for conditioning the AND circuit 462 so that selected digit information may be transferred from the second to the third buffer storage element. The storage transfer gate 466 is similar to the storage transfer gate 422 previously mentioned in connection with the description of a typical gate.

The output from the AND circuit 462 is connected as an input to the logical OR circuit 454 which is connected to the seven bit inhibit drivers for the third buffer storage element 450. The third buffer storage element 450 also has a storage capacity for 112 digits or seven words, sixteen digits each, of information. Hence, there are sixteen digit drivers and seven word drivers associated with the third buffer storage element 450.

When there is an indication from the collating circuitry of the card reader 100 that a multiple item document is to be prepared, information from the accumulator 410 will be passed by the logical AND circuit 452 to the logical OR circuit 454 connected thereto.

As the sixteen digit and seven word drivers are operated to cause information to be read out of the third buffer storage element 450, the information is amplified by sense amplifiers and transmitted to set sense latches associated therewith. It should be kept in mind that the sense latches associated with each buffer storage element are set each digit time by information coming therefrom and reset each digit time by the 2-microsecond reset impulse.

The outputs from the seven sense latches are represented as a single line 467 which is connected to logical AND circuits 468, 469 and 470.

The logical AND circuit 468 also has an input connection from an inverter 471 connected to the storage transfer gate 466 for selectively controlling transfer of information from the second to the third buffer storage element. The output of the AND circuit 468 is connected as an input to the OR circuit 454. Hence, information from the third buffer storage element 450 will be regenerated therewith provided information is not being entered from the second buffer storage element.

The logical AND circuit 469 also has an input connection from the read out to second print station gate 463 and an input connection from the collating circuitry of the card reader indicating that a single item instrument is to be prepared by the card document preparation unit 600. The output of the AND circuit 469 is connected to the print setup mechanism at the second print station S2. In this manner, selected digit information is transmitted to the print setup mechanism for presetting the matrix wires of the print heads P3 and P4 at the second print station S2 of the card document preparation unit 600 to facilitate the printing of the first line of detail and total line of accumulated data on the instrument or document being prepared.

The logical AND circuit 470 also has an input connection from the storage transfer gate 466 for controlling the transfer of selected digit information from the second to the third buffer storage element. When the transfer storage gate 466 is set or up, the AND circuit 470 is conditioned to pass information coming from the third storage element. The output of the AND circuit 470, FIG. 12b, is connected to a logical OR circuit 472, FIG. 12a, which has its output connected to the seven bit inhibit drivers of the fourth buffer storage element 475.

Hence, when information is being transferred from the second to the third buffer storage element, information cannot be regenerated back into the third buffer storage element but is transferred to the fourth buffer storage element 475.

Information entering the fourth from the third buffer storage element will be a maximum of eighty digits because, in this example, only eighty digits of information will be punched into the instrument or document being prepared. The particular information which will be punched into the document is at the discretion of the machine operator. The machine operator may select the particular information to be punched into the document by selectively wiring the pluggable control panel in the well-known manner.

Accordingly, the fourth buffer storage element 475 has an information storage capacity for eighty digits or five words, each word having sixteen digits of information. Therefore, there are sixteen digit drivers and five word drivers associated with the fourth buffer storage element 475.

Information read from the fourth buffer storage element by means of the digit and word drivers is amplified by seven sense amplifiers and thereafter transmitted to set sense latches. The outputs of the sense latches are represented by a single line 474 which connects to logical AND circuits 476 and 477. The logical AND circuit 476 also has an input connection 478 from an inverter 479 connected to a storage transfer gate 480 for controlling the transfer of information from the fourth to the fifth buffer storage element. Hence, with the input connection 478 to the AND circuit 476 from the inverter 479 which, in turn, is connected to the storage transfer gate 480, there is a signal present at the input of the AND circuit 476 to condition the same to pass information when the transfer storage gate 480 is down or reset. The output of the AND circuit 476 is connected to the logical OR circuit 472. Hence, when the transfer storage gate 480 is reset, information coming from the fourth buffer storage element 475 will be regenerated therein.

The AND circuit 477 also has an input connection 481 from the storage transfer gate 480, FIGS. 12a and 12b. The output of the AND circuit 477 is connected to a logical OR circuit 482 having its output connected to seven bit inhibit drivers associated with the fifth buffer storage element 500. The storage transfer gate 480 is connected to the AND circuit 477 in a manner to condition the same when the storage transfer gate 480 is up or set. Accordingly, with the storage transfer gate 480 set, information coming from the fourth buffer storage element 475 will be passed by the AND circuit 477 to the logical OR circuit 482 and from there to the seven bit inhibit drivers associated with the fifth buffer storage element 500. During the time the storage transfer gate 480 is set, information will not be regenerated within the fourth buffer storage element 475 because the AND circuit 476 will not be conditioned. Hence, all the information in the fourth buffer storage element 475 will be transferred to the fifth buffer storage element 500 when the storage transfer gate 480 is set.

Since none of the information from the fourth buffer storage element 475 is transferred to the card document preparation unit 600, it is seen that the function of the fourth buffer storage element 475 is for delay purposes only. Referring to FIGS. 2a and 2b, it is seen that the card path within the card document preparation unit 600 requires that the information to be punched in the card document being prepared be held in storage or be kept in time with the card documents as the same flow through the card document preparation unit 600 so that it is available at the proper time to permit punching of perforations into the even-numbered rows of the card documents at the first punch station 1600.

Hence, the information entering into the fifth from the fourth buffer storage element is the information which will be punched into the card documents being prepared. Eighty digits of information may be punched into the card documents at either the first or the second punch stations 1600 and 1700, respectively; therefore, the fifth buffer storage element 500 has a capacity for eighty digits of information so as to contain all of the information transferred from the fourth storage element 475. In this manner, the information will be kept in step with the card documents 710 as they progress through the punch portion 1500 of the card document preparation unit 600.

Since the fifth buffer storage element 500 has a capacity for eighty digits of information, there are sixteen digit and five word drivers associated with the fifth buffer storage element. As information is read from the fifth buffer storage element 500 through the facility of the sixteen digit and five word drivers, it is amplified by seven sense amplifiers which are connected to corresponding seven sense latches. The outputs of the seven sense latches are represented by a single line 510 which leads to logical AND circuits 511, 512 and 513.

The AND circuit 511 also has an input connection 478 from the inverter 479 so that the AND circuit 511 will be conditioned to pass information when the storage transfer gate 480 is reset. The output of the AND circuit 511 is connected to the logical OR circuit 482. Hence, when information is not being transferred from the fourth to the fifth buffer storage element, it will be passed by the AND circuit 511 to be regenerated therein through the OR circuit 482 and through the facility of the seven bit inhibit drivers together with the associated sixteen digit and five word drivers.

The AND circuit 512 also has an input connection 514 from a read out to first punch station gate 515. The read out to first punch station gate 515 is similar in construction and principle of operation to the typical gate previously described. With the gate 515 up or set, information from the fifth buffer storage element 500 will be passed by the AND circuit 512 to the first punch station 1600 of the card document preparation unit 600, the output of the AND circuit 512 being connected to the punch setup mechanism of the first punch station 1600.

The AND circuit 513 also has an input connection 481 from the storage transfer gate 480. The input connection 481 to the AND circuit 513 is such that, when the storage transfer gate 480 is set or up, the information coming from the fifth buffer storage element 500 will be passed by the AND circuit 513. The output of the AND circuit 513 is connected as an input to a logical OR circuit 516 having its output connected to seven bit inhibit drivers associated with the sixth storage element 525 which also has a storage capacity for eighty digits of information. Hence, as information is transferred from the fourth to the fifth buffer storage element, information will also be transferred from the fifth to the sixth buffer storage element. Further, it is seen that the fifth buffer storage element 500 makes information available to the first punch station 1600 to facilitate the punching of the even rows in the card documents and also permits the information to be kept in step with the card document as it progresses through the card document preparation unit 600 to the second punch station 1700, because the information in the fifth buffer storage element 500 is transferred to the sixth buffer storage element 525 from which the information is made available to the second punch station 1700.

Again, eighty digits of information may be punched into the odd rows of the card documents 710 at the second punch station 1700; hence, eighty digits of information are transferred to the sixth buffer storage element to permit the entire eighty digits of information to be kept in step with the card documents 710 as the same progresses through the card document preparation unit 600.

Because the sixth buffer storage element has a storage capacity for eighty digits of information, there are sixteen digit and five word drivers associated with the sixth buffer storage element 525. Through the facility of these sixteen digit and five word drivers, information is read from the sixth buffer storage element 525 to seven sense amplifiers. The outputs of the seven sense amplifiers are connected to seven sense latches. The outputs from the seven sense latches are represented by a single line 526 which connects with the logical AND circuits 527, 528 and 529.

The AND circuit 527 also has an input connection 478 from the inverter 479 connected to the storage transfer gate 480. The output of the AND circuit 527 is connected to the input of the logical OR circuit 516. Hence, with the storage transfer gate 480 down or reset, the AND circuit 527 is conditioned to pass information from the sixth buffer storage element 525 to the logical OR circuit 516; and, in this manner, information is regenerated into the sixth buffer storage element 525 when information is not being transferred from the fifth to the sixth buffer storage element or, as will be seen shortly, from the sixth to the seventh buffer storage element.

The AND circuit 528 also has an input connection 530 from a read out to second punch station gate 531 which is similar in structure and principle of operation to the read out to first punch station gate 515 and the typical gate described above. The output of the AND circuit 528 is connected to the punch setup mechanism at the second punch station 1700.

Accordingly, when information is being read out of the sixth buffer storage element and the read out to second punch station gate is set, the AND circuit 628 will pass the information to the second punch station 1700 to permit the information to be punched into the odd rows of the card document 710 being prepared. It is thus seen that provision has been made for the punching of the even rows of one of the card documents being prepared while the odd rows of another card document are being punched.

The AND circuit 529 also has an input connection 481 from the storage transfer gate 480. Therefore, the AND circuit 529 will be conditioned to pass information when the storage transfer gate 480 is set or up. Since the output of the AND circuit 529 is connected to the input of a logical OR circuit 532 which has its output connected to seven bit inhibit drivers associated with the seventh buffer storage element 550, information will be transferred from the sixth to the seventh buffer storage element when information is being read out of the sixth buffer storage element 525 and the storage transfer gate 480 is set or up. This occurs at the same time information is transferred from the fourth to the fifth and from the fifth to the sixth buffer storage elements.

At the same time information is transferring from the sixth to the seventh buffer storage element, the card document 710 being prepared is passing from the second punch station 1700 in the card document preparation unit 600 toward the punch checking station 1810.

The seventh buffer storage element 550 has a data storage capacity of eighty digits of information. Therefore, all of the information which may be entered in the form of perforations into the card documents being prepared will be contained in the seventh buffer storage element 550. The purpose of the seventh buffer storage element 550 is to make the information which has been punched into the card documents available for checking purposes to permit verification of the data entered into the card documents in the form of perforations.

The information in the seventh buffer storage element 550 will be read therefrom through the facility of sixteen digit and five word drivers. The information leaving the seventh buffer storage element is amplified by seven sense amplifiers which are connected to seven corresponding sense latches. The outputs of the seven sense latches are represented by a single line 551 or conductor connected to logical AND circuits 552 and 553.

The AND circuit 552 also has an input connection 478 from the inverter 479 connected to the storage transfer gate 480 and is conditioned thereby to pass information coming from the seventh buffer storage element 550 when the storage transfer gate 480 is reset or down, which is at a time other than that for transferring information to the seventh from the sixth buffer storage element. The output of the AND circuit 552 is connected to the OR circuit 532 so that, with the storage transfer gate 480 down, information will be regenerated within the seventh buffer storage element 550.

The AND circuit 553 also has an input connection 554 from a read out to punch check gate 555 which is similar in structure and principles of operation to the typical gate shown in FIG. 18. With the read out to punch check gate 555 set or up, the AND circuit 553 is conditioned to pass information coming from the seventh buffer storage element 550. The output of the AND circuit 553 is connected to the punch check device, not shown, which also receives information from the punch checking station 1810, to be described later herein. The read out to punch check gate 555 is operated to condition the AND circuit 553 so that information from the seventh buffer storage element 550 will be at the punch check device at the same time information read out from the completed card document by the card brush sensing element at the checking station 1810 is made available thereto.

From the foregoing, it is seen that information from the master and detail cards 60 and 50, respectively, is read into the first buffer storage element 400, FIGS. 12a, 12b, 34a and 34b. With reference to FIGS. 34a and 34b, when information is read into the buffer storage elements, it is indicated by the symbol ▨ and, when information is read from the buffer storage elements, it is indicated by the symbol ◫. Information stored in the first buffer storage element 400 is regenerated when the storage transfer gate 422 is down or reset. Before the storage transfer gate 422 is up or set, the read out to first print station gate 424 is set or up to permit name and address information derived from the master cards to be passed to the print setup mechanism. It should be noted that, while name and address information is being read out of the first buffer storage element 400 and is permitted by the read out to first print station gate 424 during the "a" subcycle to be passed to the print setup mechanism, the same information is also being regenerated into the first buffer storage element 400 and will be read out again at a later time but, of course, before the information is transferred from the first to the second buffer storage element. As the read out to first print station gate 424 is reset, the read out to accumulator gate 423 is set. Hence, immediately after the name and address information is gated out to the print setup mechanism, the detail information which follows is entered into the accumulator 410. Again, while detail information is read out to the accumulator 410, it is also regenerated to remain within the first buffer storage element 400. Sometime after the detail information is read out to the accummulator 410, the name and address information is again passed to the print setup mechanism, through the facility of the read out to first print station gate 424 being set, to complete the setup for printing two lines of name and address information which is accomplished in two steps during subcycles "a" and "b." While the name and address information is being read to the print setup mechanism for the second time or during the subcycle "b," the same information is not being regenerated into the first buffer storage element because it is no longer needed; only the detail information is retained in the first buffer storage element 400 to be subsequently transferred to the second buffer storage element 425.

Since the information of the first master and detail cards has been properly disposed so far as the print setup mechanism and the accumulator 410 are concerned, it becomes necessary to transfer the data information of the first detail card from the first buffer storage element 400 to the second buffer storage element 425 to maintain the data information in step with the card document 710 being prepared and to permit the storage of new information into the first buffer storage element 400 for the next card document to be prepared. Therefore, the data storage transfer gate 422 is set to permit the data information to be transferred to the second storage element 425 and, while this information is being transferred, it is not regenerated into the first buffer storage element. Hence, the first buffer storage element is clear of all information and is ready to accept information from the second master and detail cards.

With the detail data information from the first detail card stored in the second buffer storage element 425, information in the accumulator 410 is read out to the second buffer storage element 425 to reside therein. With only a single detail card associated with a single master card, the second buffer storage element 425 functions as a delay device. The second buffer storage element 425 now has received detail data information from the first detail card via the first buffer storage element 400 and accumulated data information via the accumulator 410, which may be the information used for printing the total upon the card document being prepared. The fact that the detail sequence collating circuitry 125 of the detail card read unit 120 detects that the account number of the first detail card at the second brush sensing station 155 is not equal to the account number of the second detail card at the first brush sensing station 145 is an indication to the AND circuit 449, FIGS. 4 and 12b, that information in the accumulator 410 may be entered into the second buffer storage element 425. It may be noted that, shortly after the information in the accumulator 410 is transferred to the second buffer storage element 425, FIGS. 34a and 34b, the detail data information of the second detail card is read out from the first buffer storage element 425 into the accumulator 410.

Information in the second buffer storage element 425 is continuously regenerated except for the time when information is being transferred from the first to the second buffer storage element. Unless there is multiple item printing to take place at the second print station S2, information will not be read out of the second buffer storage element 425 to the print setup mechanism. Hence, even though the read out to second print station gate 463 is set, the AND circuit 461 does not pass data information from the second buffer storage element 425 to the print setup mechanism to permit printing at the second print station S2 unless the detail sequence collating circuitry 125 provides an indication that there is more than one detail card associated with a single master card, so as to condition the AND circuit 461. Further, the kind of information which would be transferred from the second buffer storage element 425 to the print setup mechanism, in the instance of multiple item printing, would be detail information other than accumulated detail information because information from the accumulator 410 will not be passed by the AND circuit 449 since it has not been conditioned by the detail sequence collating circuitry 125 indicating that multiple item printing is not to take place, while the AND circuit 452, which is conditioned by the detail sequence collating circuitry, in view of the fact that multiple item printing is to take place, permits information from the accumulator 410 to pass directly to the third buffer storage element 450 via the OR circuit 454.

Hence, in the instance of the first master card being accompanied by or associated with a single detail card, the information from the second buffer storage element 425, which will be data information of the first detail card plus accumulated information, will be transferred to the third buffer storage element 450 when the storage transfer gate 466 is set. However, at the same time that data and accumulated information of the second buffer storage element 425 is transferred to the third buffer storage element 450, data information from the first buffer storage element 400 is being entered into the second buffer storage element 425.

The data and accumulated information transferred from the second buffer storage element 425 is regenerated into the third buffer storage element 450 constantly until the storage transfer gate 466 is set. Shortly after the data and accumulated data information is entered into the third from the second buffer storage element, information is read out of the third buffer storage element to the print setup mechanism to enable printing at the second print station S2. It will be recalled that printing takes place at each print station S1 and S2 during two subcycles because the print heads print in one position and then must be shifted laterally to print in an adjacent position to complete a line of print. Hence, shortly after reading our information from the third buffer storage element 450 to the print setup mechanism for the first time, information is again read out to the print setup mechanism to permit printing of the first and total lines on the card document at the second print station S2 to be completed. Of course, it should be noted that the name and address information for the second card document being prepared had been furnished to the print setup mechanism prior to the transfer of data and accumulated information from the second to the third buffer storage element. It is seen from FIG. 34a that information transfers from the first to the second buffer storage element at the same time that information is transferred from the second to the third buffer storage element. Hence, it is seen that information from more than one buffer storage element will not be supplied to the print setup mechanism at any one time.

Further, shortly after the time the information from the first detail card and accumulated data is transferred from the second to the third buffer storage element, information of the third detail card is read into the first buffer storage element 400. The information from the second detail card was transferred from the first to the second buffer storage element at the same time the information of the first detail card and accumulated data was transferred to the third buffer storage element 450. It will be seen that, when discussing the examples for explaining the over-all operation later herein, the third detail card is actually the second or multiple detail card associated with the second or single master card. Also, it should be noted that the data information of the second detail card fed from the detail card feed hopper 135 is transferred to the accumulator 410 while it was still in the first buffer storage element 400. The information of the third detail card is in the first buffer storage element 400, while the data of the first detail card is in the third buffer storage element 450. The information of the third detail card in the first buffer storage element 400 is read out to the accumulator 410 before being transferred to the second buffer storage element 425. Information of the third detail card is transferred simultaneously with information of the second and first detail cards to the second, third and fourth buffer storage elements, respectively. Before proceeding, it should be noted that no information has been transferred from the accumulator 410 since the first transfer of accumulated data information therefrom to the second buffer storage element 425. Hence, the data information of the second and third detail cards is still in the accumulator 410.

Just after the simultaneous transfer of information from the first to the second, the second to third, and the third to fourth buffer storage elements, information from the third master and fourth detail cards is read into the first buffer storage element 400. While name and address and detail information of the third master and fourth detail cards, respectively, is being read into the first buffer storage element 400, data information from the third detail card, which is now in the second buffer storage element 425, is read out therefrom and transferred for the first time through the facility of read out to second print station gate 463, FIG. 12b, to the print setup mechanism to permit the first part of printing at the second print station S2 of the second line of data on the second card document 710 being prepared. Shortly thereafter, and still while the information from the third master and fourth detail cards is being read into the first buffer storage element 400, information of the third detail card is again read out of the second buffer storage element 425 through the facility of the read out to second print station gate 463 to the print setup mechanism to enable the second part of second line of data information to be printed on the second card document being prepared to complete the second data or item line of printing. It is pointed out that this second data or item line of printing on the second card document being prepared takes place at the second print station S2 during the printing subcycles "c" and "d."

After the information of the third detail card is read out of the second buffer storage element 425 to the print setup mechanism for the second time, the information of the third master card and fourth detail card has been completely stored within the first buffer storage element 400; the name and address information of the third master card is read out to the print setup mechanism through the facility of the read out to first print station gate 424 to permit the name and address to be printed on the third card document being prepared. At approximately the same time, accumulated information relating to data of the second and third detail cards is read out of the accumulator 410 and entered into the third buffer storage element 450 via the AND circuit 452, which has been conditioned by the detail sequence collating circuitry 125 of the detail card reader unit 120, the OR circuit 454, and the seven bit inhibit drivers associated with the third buffer storage element 450.

Immediately after the name and address information of the third master card is read out of the first buffer storage element 400 to the print setup mechanism for the first time, data information of the fourth detail card is read from the first buffer storage element 400 to the accumulator 410. Shortly thereafter, the information of the first detail card and accumulated data in the fourth buffer storage element 475 is transferred to the fifth buffer storage element 500 through the facility of the storage transfer gate 480. It should be noted that transfer of information from the fourth to the fifth buffer storage element does not take place simultaneously with the transfer of information from the first to the second, from the second to the third, and from the third to the fourth buffer storage element.

Information in the fifth buffer storage element 500 is read out and, through the selective operation of the read out to first punch station gate 515, certain information of the information so read out is passed by the AND circuit 512 to the punch setup mechanism at the first punch station 1600. Before information is again read out of the fifth buffer storage element 500 to the punch setup mechanism at the first punch station 1600, name and address information of the third master card is read out for the second time from the first buffer storage element 400 to the print setup mechanism, through the facility of the read out to first print station gate 424, to enable completion of the name and address lines of printing upon the third card document being prepared by the print heads P1 and P2 at the first print station S1 which have been shifted laterally one column. After reading the name and address information of the third master card out of the first buffer storage element 400, additional information is passed, as information is read out of the fifth buffer storage element 500, by the AND circuit 512 to the punch setup mechanism at the first punch station 1600. Thereafter, information of the fourth detail card is transferred from the first to the second buffer storage element and detail information of the third detail card is destroyed by failure to transfer from second to third buffer storage element and failure to be regenerated because the AND circuit 458 has not been conditioned, while information of the second detail card, together with accumulated data, remains in the third buffer storage element 450.

To continue, without discussing the read-in of data from the fourth master and fifth detail cards and all other subsequent master and detail cards into the first buffer storage element 400, information is again read out of the fifth buffer storage element 500 and certain selected data, through the facility of the read out to first punch station gate 515, is passed by the AND circuit 512 to the punch setup mechanism at the first punch station 1600.

Shortly after passing data information to the punch setup mechanism at the first punch station 1600 for the third time, data information of the second detail card and accumulated data is read out of the third buffer storage element 450 and, through the facility of the read out to second print station gate 463 and the presence of a signal from the detail sequence collating circuitry 125 indicating that the account number of the fourth detail card is not equal to the account number of the third detail card, therefore, it is not related to the second master card; information is passed by the AND circuit 469 to the print setup mechanism to enable printing of the first part of the first and total lines of item or data and accumulated information on the second card document at the second print station S2.

Information, thereafter, is again read out from the fifth buffer storage element 500 twice in succession without an intervening read out from any of the other buffer storage elements to the punch setup mechanism at the first punch station 1600.

Thereafter, information of the second detail card and accumulated data is read from the third buffer storage element 450 and, again, is permitted to pass the AND circuit 469, which has been conditioned by the read out to second print station gate 463, to the print setup mechanism to permit the printing of the second part of the first and total lines of item or data and accumulated information to complete the printing of the second card document at the second print station S2.

Information is then read out of the fifth buffer storage element 500 and, again, is passed by the AND circuit 512 to the punch setup mechanism at the first punch station 1600.

The necessary information has now been read out of the fifth buffer storage element 500 to permit the punch setup mechanism to be properly activated for enabling the punching of all of the even-numbered rows of the first card document being prepared.

However, before the information in the fifth buffer storage element 500 is transferred to the sixth buffer storage element 525, the accumulated data relative to the fourth detail card is transferred from the accumulator 410 to the second buffer storage element 425 which, as it will be recalled, already contains information of the fourth detail card.

Information is then transferred from the fifth to the sixth buffer storage element so as to be kept in step with the first card document 710 being prepared as it progresses through the card document preparation unit 600. In this manner, information of the first detail card will be available in the sixth buffer storage element 525 to be furnished to the setup mechanism at the second punch station 1700.

However, before information from the sixth buffer storage element 525 is transmitted to the punch setup mechanism at the second punch station 1700, information of the fourth detail card and accumulated data related thereto is transferred from the second to the third buffer storage element and, simultaneously with this transfer, information of the second detail card and related accumulated data is transferred from the third to the fourth buffer storage element.

Information to be punched in row 11 of the first card document being prepared is read out of the sixth buffer storage element 525 through the facility of the read out to second punch station gate 531, which is operated to condition the AND circuit 528 so that selective information will be passed to the punch setup mechanism at the second punch station 1700. To avoid undue repetition, it may suffice to say that information will be successively read out of the sixth buffer storage element 525 and successively passed at the proper time by the AND circuit 528 to the punch setup mechanism to enable the punching of information into the remaining odd rows or rows 1, 3, 5, 7, and 9 of the first card document as it progresses through the second punch station 1700. After the odd rows have been punched, the first card document being prepared has been completed and the only remaining operations with respect to it are the checking of the punched information therein and the placing of the finished document in one of two stackers 1830 or 1840.

Of the two remaining operations with respect to the first card document, only one concerns the electronic control unit 300. As the first card document 710 passes from the second punch station 1700 in the card document preparation unit 600, FIGS. 2a and 2b, it encounters the check brush sensing station 1810. Before the first card document encounters the check brush sensing station 1810, the same information which had been punched therein is transferred from the sixth to the seventh buffer storage element. Information in the seventh buffer storage element 550 is read out in synchronism with the reading of information of the first card document at the check brush sensing station 1810. The information read out of the seventh buffer storage element 550 is passed by the AND circuit 553 to the checking circuitry 556 as the information read from the first card document is read by the sensing brushes and is also transmitted thereto. The checking circuitry is represented in block form by the block 556 and could comprise logical AND circuitry whereby, if the information in the card document checked with the information in the seventh buffer storage element 550, there would be an output from the AND circuitry; otherwise, the absence of an output from the AND circuitry would indicate an error. The checking circuitry represented by the block 556 could also take the form of a half adder where the presence of an output therefrom would indicate an error. In this manner, whether the information in the seventh buffer storage element did not compare with the information in the card document so as to effect an output, or if the half adder circuitry failed so as to effect an output, an error would be indicated. Since the checking circuitry does not concern the essence of the present invention, a more detailed description thereof is not thought to be necessary.

It is thus seen that the seven buffer storage elements made the proper information available at the correct time to the data operable elements of the card document preparation unit 600 to permit the preparation of a card document.

During the immediate preceding description of information read-in, readout and transfer, with respect to the buffer storage elements, each action was described as it took place. However, in continuing with the description of information flow respecting the buffer storage elements, each buffer storage element involved will be discussed separately.

Hence, referring back to the time that information of the fourth detail card and accumulated data concerning the same is transferred from the second to the third buffer storage element, the information thereafter is read out of the third buffer storage element 450 continuously and is also continuously regenerated therewithin. Sometime during this continuous readout and regeneration, selective information is passed by the AND circuit 469, which is selectively conditioned by the readout to second print station gate 463 and the signal from the detail sequence collating circuitry 125 indicating the non-existence of multiple item printing, to the print setup mechanism to enable the printing of the first part of the first and total lines of data information upon the third card document being prepared at the second print station S2. Sometime later, information read out of the third buffer storage element 450 is again passed by AND circuit 469, in the manner previously indicated, to the print setup mechanism to permit the printing of the second part of the first and total lines of data information upon the third card document being prepared; the print heads P3 and P4 at the second print station having been shifted laterally one column.

While this completes the printing of the third card document being prepared, the information of the fourth detail card and the accumulated data with respect to it must be preserved and made available to permit punching of the same into said third card document. Hence, the information is transferred to the fourth buffer storage element 475, which happens, at this particular time, to be void of information.

Before further discussing the events concerning the information of the fourth detail card and accumulated data concerning the same which is presently in the fourth buffer storage element 475, the events taking place just after the transfer of information of the second detail card and accumulated data concerning the same from the third to the fourth buffer storage element will be discussed. It will be recalled that earlier herein it was stated that the function of the fourth buffer storage element 475 is for delay purposes only; hence, the information of the second detail card and the accumulated data concerning the same is held in the fourth buffer storage element 475 until it is to be transferred to the fifth buffer storage element 500 so as to be made available to the punch setup mechanism as the second card document comes into the first punch station 1600. Likewise, the information of the fourth detail card and accumulated data concerning the same, which is transferred into the fourth buffer storage element 475 after the information of the second detail card and accumulated data concerning the same has been transferred to the fifth buffer storage element 500, is transferred to the fifth buffer storage element 500 so as to be made available to the punch setup mechanism at the time the third card document is coming into the first punching station 1600. Of course, at the time the information of the fourth detail card and accumulated data concerning the same is transferred from the third to the fourth buffer storage element, the information of the second detail card and accumulated data concerning the same had already been transferred to the fifth buffer storage element 500.

The information of the second detail card and accumulated data concerning the same, while in the fifth buffer storage element 500, is made available to the punch setup mechanism at the first punch station 1600 to permit the punching of information into the even rows of the second card document being prepared and, thereafter, is transferred to the sixth buffer storage element 525.

After the information of the second detail card and associated accumulated data has been transferred to the sixth buffer storage element 525, the information of the fourth detail card and associated accumulated data is transferred from the fourth to the fifth buffer storage element to become available to the punch setup mechanism at the first punch station 1600 to permit the punching of the even rows in the third card document being prepared.

While the even rows of the third card document are being punched at the first punch station 1600, the odd rows in the second card document are also being punched at the second punch station 1700.

After the odd rows of the second card document have been punched, the information of the second detail card and associated accumulated data is transferred from the sixth to the seventh buffer storage element. Simultaneously with this transfer, the information of the fourth detail card and associated accumulated data is transferred from the fifth to the sixth buffer storage element so as to become available to the punch setup mechanism at the second punch station 1700 to enable the odd rows of the third card document to be punched and thereby complete the preparation of the same. While the odd rows of the third card document are being punched, the information of the second card document is being read at the check brush sensing station 1810 to the checking circuitry 556 together with information from the seventh buffer storage element 550 to determine whether or not the proper information had been punched in the second card document.

After the odd rows of the third card document have been punched, the information of the fourth detail card and associated accumulated data is transferred from the sixth to the seventh buffer storage element via the AND circuit 529, which has been conditioned by the storage transfer gate 480, the OR circuit 532, and the associated seven bit inhibit drivers.

The foregoing describes the data flow from the master and detail cards to the electronic control unit 300 and from there to the card document preparation unit 600. Furthermore, description of data flow has been given for instances where there are both single and multiple detail cards associated with a single master card. It may suffice to say that, in the instance of multiple master cards, the information therefrom would be always stored in the first buffer storage element only; and from there it would be read out and passed by the AND circuit 420, through the facility of the read out to first print station gate 424, to the print setup mechanism to permit name and address information to be printed at the first print station S1 upon the document being prepared. For example, in the instance of multiple name and address cards, the feeding of detail cards would or would not continue depending upon whether or not there are associated multiple detail cards; the information of the first master card would be read into the first buffer storage element 400 and, while therein, it would be read out in two steps to the print setup mechanism to permit the printing of a portion of the name and address in the usual manner. Since the information of the first master card has been fully used and it is not needed by the card document preparation unit for any other operations, it may be destroyed in the same manner as it would be for a single master card containing the entire name and address information.

Accordingly, information of the second master card for completing the name and address is read into the first buffer element 400 and then is made available at the proper time to the print setup mechanism to permit the printing of the remaining portion of the name and address of the card document being prepared.

While the instance of multiple detail cards associated with a single master card already has been discussed, in the example above the second and third detail cards were both associated with the second master card, it may be generalized that, upon an indication of the instance of multiple detail cards by the detail sequence collating circuitry 125 of the detail card reader unit 120, the information of the detail cards which are multiple; i.e., those detail cards in a sequence which are related to a first detail card or those detail cards which contain the information which is to be printed upon the card document being prepared as the second and all other successive items, may be destroyed after it has been read from the second buffer storage element 425 to the print setup mechanism to permit the printing at the second print station S2 of the second and successive lines or items of information upon the card document being prepared. The reason that the information of the second and successive detail cards associated with a single master card may be destroyed after it has been read out of the second buffer storage element to the print setup mechanism lies in the fact that this information has already been entered into the accumulator and is processed to give the accumulated data which becomes associated with the first detail card of multiple detail cards so that the first item line of information and the accumulated totals of all items may be printed together at the second print station S2. At the time the first item line and accumulated totals of all items is to be printed, the information concerning the same is contained in the third buffer storage element 450. Hence, in this manner, by adopting the position that the majority of card documents prepared will be single item cards, it is possible to print a single item line and accumulated totals at one time and still permit the printing of multiple item lines. It is this versatility of the system which makes the present invention so very important and desirable.

ACCUMULATOR

The accumulator 410, shown in FIG. 4, is part of the electronic control unit 300. The requirements of the accumulator are dependent upon the type of instrument to be prepared by the card document preparation unit 600. In this example, for preparation of the utility bill, it is only necessary for the accumulator to add and subtract and to store a maximum of 32 digits of coded information. The detail cards will furnish net amounts; however, if the net amounts were to be computed, this would impose upon the accumulator the requirements of being able to perform the mathematical computation of multiplication and, in some instances, the mathematical computation of division may also be required.

It is believed that accumulators do exist which will meet the requirements stated and it is known that the already existing accumulators could be modified by those skilled in the art to more particularly suit the requirements stated above. Hence, the general nature of the accumulator necessary for the example given will be described keeping in mind that the accumulator is only required to add and subtract and store 32 digits of information.

Since the information entering the accumulator is coming from the first buffer storage element and the information leaving the accumulator is to be re-entered into the second or the third buffer storage element, it would be desirable to have an accumulator which may process coded data parallel by bit and serial by digit.

It should be noted that, while information flows from one buffer storage element to another or to the print or punch setup mechanism with the high order digit first, the arithmetic operations must be performed low order first; therefore, the control of information flowing into the accumulator is governed by the read out to accumulator gate 423, FIG. 12a.

Basically, the accumulator is another data storage device, like the buffer storage elements, in combination with a single digit adder, not shown. Information from the first buffer storage element 400 is transferred to the accumulator 410 via the single digit adder. As each digit of information is transferred from the first buffer storage element 400, it is entered into one input of the single digit adder in step with the corresponding digit from the accumulator 410. The sum or difference of the two digits is then stored back in the accumulator 410. Information thus stored in the accumulator is made available to the second or third buffer storage elements, respectively. Whether or not the information from the accumulator 410 will be entered into the second or third buffer storage element is dependent upon the conditions of the AND circuits 449 and 452, respectively, FIGS. 4, 12a and 12b. The AND circuit 449 is conditioned to pass information if the detail sequence collating circuitry of the detail card reader unit 120 indicates that there is only a single detail card accompanying a single master card. Hence, unless there is more than one detail card associated with a master card, the information from the accumulator 410 will be entered into the second buffer storage element 425.

The AND circuit 452 is conditioned to pass information when the detail sequence collating circuitry 125 of the detail card reader unit 120 indicates that there is more than a single item card associated with a master card. Therefore, in the instance of more than one detail card associated with a master card, information from the accumulator 410 will be entered into the third buffer storage element 450.

It is thus seen that, while information from the accumulator may be entered into either the second or third buffer storage element, depending upon the conditions of the AND circuits 449 and 452, information is entered into the accumulator 410 only from the first buffer storage element 400.

CARD DOCUMENT PREPARATION UNIT

Card Feed and Transport

The function of the card document preparation unit 600 is to prepare card documents in the form of record cards with printed and punched information derived from master and detail cards and from the accumulator 410 of the electronic control unit 300.

Since the card document preparation unit 600 is to produce card documents bearing printed and punched data obtained from a plurality of data sources and since the card documents are to be produced in one continuous operation, it is necessary that the card documents being prepared are in the proper position to be operated upon by the printing and punching units so that they will bear the correct data.

The card document 710 prepared by the card document preparation unit 600 are either in blank form or contain preprinted and/or prepunched information. The record cards 710, FIGS. 1, 2a and 2b, to be processed by the card document preparation unit 600, placed in the card hopper 711 with the reverse faces up and row 9 facing in the direction of card travel, are advanced in seriatim by a clutch-controlled picker knife 713 to the cooperating feed rolls 810 and 811. The picker knife 713 is controlled by a clutch 712, schematically shown in FIG. 4. The clutch 712 is a single tooth, 1-revolution clutch; hence, each revolution of the clutch will effect the feeding of one record card or card document 710 from the card hopper 711. The clutch 712 is connected to a drive, not shown, so as to complete approximately 500 revolutions in one minute. Each operation of the clutch 712 will therefore constitute a card cycle which will be approximately 120 milliseconds in duration. While a master timer 714 furnishes an impulse to energize the clutch 712 once every 120 milliseconds or every card cycle, the impulse is transmitted to a logical AND circuit 715 which is connected to the timer 714. The AND circuit 715 also has an input connection 716 from the detail sequence collating circuitry 125 of the detail card reader unit 120 to be conditioned so as to pass the impulse from the timer 714 unless there are multiple detail cards. Of course, if the master or detail cards are out of sequence, the stop control of the card document preparation unit 600, which will be described in greater detail, is operated to arrest further operations until the master and detail cards are again in proper sequence.

Hence, record card documents 710 are fed from the card hopper 711 by means of the clutch-controlled picker knife 713 to the feed rolls 810 and 811 which are also controlled by the clutch 712. The feed rolls 810 and 811, when driven, convey the card documents past the first brush sensing station 812 to the clutch-controlled feed rolls 813 and 814 which, in turn, feed the card documents to the clutch-controlled feed rolls 813a and 814a for feeding the card documents past the second brush sensing station 815. In this manner, upon the first revolution of the clutch 712, the first record card document 710 is advanced from the card hopper 711 by the picker knife 713 to the cooperating feed rolls 810 and 811 which will feed the card up to, but not past, the brushes at the first brush sensing station 812. Upon the clutch 712 being operated again, the first card document 710 is fed by the feed rolls 810 and 811 past the brushes at the first brush sensing station 812 to the feed rolls 813 and 814 which feed the first card document 710 to the feed rolls 813a and 814a. The feed rolls 813a and 814a feed the first card document up to, but not past, the brushes at the second brush sensing station 815. During this time, the second record card document 710 is fed from the card hopper by the picker knife 713 to the feed rolls which feed the second card document 710 up to, but not past, the brushes at the first brush sensing station 812. The first and second brush sensing stations 812 and 815 are not essential to the operation of the card document preparation unit 600 but are provided to enable the checking or interpreting of information prepunched into the record card documents 710. For instance, if the card documents 710 are placed in the card hopper 711 in sequence according to account numbers, the first and second brush sensing stations 812 and 815 make it possible to detect when the card documents 710 are not in their proper sequence.

When the clutch 712 is again engaged to enable the picker knife 713 to feed the third card document 710 from the card hopper 711, the first card document 710 is advanced by the feed rolls 813a and 814a to the continuously running feed rolls 816 and 817 which will, in turn, feed the first card document 710 to the skid rolls 818 and 819 for bringing the card documents 710 into the first print station S1. It should be noted that the impulse to the clutch 712 arrives so as to permit continuous motion of the picker knife 713 and clutched feed rolls upon successive clutch impulses. Since the skid rolls 818 and 819 are driven at a higher speed than the previously mentioned feed rolls 816 and 817, as indicated above, it is necessary that the continuously running feed rolls 816 and 817 lose control over the card documents as they engage the first pair of skid rolls 818 and 819; otherwise, the skid rolls would tend to pull the cards away from the continuously running feed rolls and thereby perhaps damage the cards and, more importantly, change the timing of the cards at a critical time. In order to enable the continuously running feed rolls 816 and 817 to lose control over the card documents 710 as they engage the first pair of skid rolls 818 and 819, the lower feed roll 816 is provided with a cam surface, not shown, adapted to elevate the upper feed roll 817 and thereby permit the first pair of skid rolls 818 and 819 to take control over the card documents 710 at the critical time of entering the first print station S1. The second pair of skid rolls 820 and 821 take the card documents 710 over from the first pair of skid rolls 818 and 819 to feed them against the card gates 910 and 920, if the same are operated, to enter the card path and thereby arrest the documents 710 in selected positions to permit the print heads P1 and P2 to print the name and address information in the proper positions upon the card documents at the first print station S1.

The card gates 910 and 920, FIG. 2a, are illustrated as being levers connected at right angles to the end of armatures 921 and 922 of magnets 923 and 924, respectively. The levers 910 and 920 are normally maintained out of the card path by means of springs 925 and 926 which are attached at one end to the levers 910 and 920 and at their other end to fixed members, not shown, respectively. As the magnets 923 and 924 are selectively energized, the associated armatures 921 and 922 are attracted toward the magnets 923 and 924 and thereby cause the card gates 910 and 920 to be displaced into the card path in opposition to the force of the springs 925 and 926. When the magnets 923 and 924 are de-energized, the springs 925 and 926 return the card gates 910 and 920 to the home position or out of the card path. The controls for selectively operating the magnets 923 and 924 will be described later herein. It is thus seen that the card gates 910 and 920 function to arrest the card documents 710 in preselected positions at the first print station S1 and the second pair of skid rolls 820 and 821 is utilized to advance the card documents 710 within and from the first print station S1.

As the card documents 710 leave the first print station S1 through the facility of the skid rolls 820 and 821, they engage the cooperating feed rolls 952 and 953 of the card inverter 950. However, before going into the details of the card inverter 950, which will be described later herein, the other transport elements of the card document preparation unit 600 will be described. The card documents 710, before entering the card inverter 950, were travelling through the card document preparation unit 600 with row 9 or "9" edge facing in the direction of card travel and had name and address information printed on their obverse faces at the first print station S1. When the card documents 710 leave the card inverter, row 12 of "12" edge is facing in the direction of card travel; and the reverse face of the card document 710, which had been facing upward, is now facing downward to permit item information to be printed thereon at the second print station S2.

The card documents 710 are transported from the card inverter 950 to the second print station S2 by the pairs of skid rolls 965 and 966 which are rotating at the same velocity as the skid rolls 820 and 821 and the card inverter rolls 952 and 953 and 954. The first pair of skid rolls 965 and 966 advances the card documents to the second pair of skid rolls 967 and 968 for advancing the same through the second print station S2. In this example, there are six selectively operable card gates 970, 975, 980, 985, 990 and 995 at the second print station S2 to arrest the card documents 710 in preselected stopping positions so that the print heads P3 and P4 may print item information upon the reverse face of the card documents in the proper position. If each of the card gates 970, 975, 980, 985, 990 and 995 was operated to enter the card path in succession, the card documents would be fed by the skid rolls 967 and 968 against the succeeding gates after the preceding gates are actuated out of the card path and thereby be intermittently fed through the second print station S2 to the skid rolls 997 and 998. More than one card gate of the six card gates at the second print station S2 are operated when there are multiple items to be printed upon the card documents 710 being prepared. The progress of a multiple item card document through the second print station S2 is shown in FIG. 27.

The skid rolls 997 and 998, in addition to feeding the card documents 710 from the second print station S2, also serve to align the card documents 710 in the lateral direction before they enter the first punch station 1600. The skid rolls 997, 998 and 1550 and 1551 are set at a slight angle with respect to the direction of normal card flow and, in this manner, as the card documents 710 are fed forward, the side edges of the cards engage a stationary aligning surface, not shown, and thereby are aligned laterally. Longitudinal alignment of the card documents 710 also takes place dynamically. The skid rolls 1550 and 1551 feed the card documents 710 forward to engage the toothed abutment 1555 on feed roll 1561 of the cooperating feed rolls 1560 and 1561. The card documents 710 engage the abutment 1555 before the same becomes normal to the card path as the feed rolls 1560 and 1561 rotate. The feed rolls 1560 and 1561 are rotating at a lower velocity than the skid rolls 1550 and 1551; hence, the abutment 1555 is effective to slow the card documents down to the speed of the feed rolls 1560 and 1561 before entering the bite formed therebetween. In this manner, the card documents 710 will enter the first punch station 1600 to permit 8-cycle point punching. The card documents 710 are punched in flight and, therefore, motion of the card documents through the first punch station 1600 is continuous, or without stopping. Feed rolls 1562 and 1563 engage the card documents 710 as they emerge from the punch unit 1610 at the first punch station 1600 and feed the cards to intermediate skid rolls 1564 and 1565. The intermediate skid rolls 1564 and 1565 are set at an angle with respect to the normal direction of card travel so as to re-align the card documents 710 laterally in cooperation with an aligning surface, not shown. Further, the skid rolls 1564 and 1565 are driven at an increased velocity to feed the card documents 710 forward toward the abutment 1566 carried on the feed roll 1568 of the cooperating feed rolls 1567 and 1568. The card documents 710 travelling at an increased velocity will therefore engage the abutment 1566 prior to the same becoming oriented normal to the card path as the feed rolls 1567 and 1568 rotate. In this manner, the card documents are re-aligned longitudinally before entering the second punch station 1700. The feed rolls 1567 and 1568, in addition to facilitating longitudinal re-alignment of the card documents 710, serve to feed the card documents forward past the punch unit 1710 at the second punch station 1700 to the cooperating feed rolls 1569 and 1570. The feed rolls 1569 and 1570 are rotating at the same velocity as the feed rolls 1567 and 1568 and serve to feed the card documents 710 in cooperation with feed rolls 1571 and 1572 past the check brush sensing station 1810. The feed rolls 1573 and 1574, depending upon whether or not the card deflector 1820 is operated, will feed the card documents to the card stacker 1830 or to the cooperating feed rolls 1575 and 1576, which, in turn, feed the card documents in cooperation with feed rolls 1577 and 1578 to the rotary drum stacker 1840.

From the foregoing, it is seen that the record card documents 710, which are the basis of the card documents prepared by the card document preparation unit 600, are selectively fed with reverse face up and row 9 facing in the direction of card travel from the card hopper 711 to the first print station S1. However, the card documents 710 may be arrested intermediate the first print station S1 and card hopper 711 depending upon whether or not a subsequent card document 710 at a particular card cycle is to be fed from the card hopper 711. Further, the card documents 710 are accelerated at a critical time as they enter the first print station S1.

After the card documents 710 leave the first print station S1, they are inverted by the card inverter 950 so that the reverse face is directed downward and row 12 is facing in the direction of card travel. Additionally, the card documents 710 leave the first print station S1 at the same speed they had upon entry and enter and emerge from the card inverter 950 at the same speed. The card documents 710 enter the second print station S2 at the same speed as they have when entering the first print station S1. The card documents leave the second print station S2 and are aligned and slowed down before entering the first punch station 1600.

The card documents 710 then continue and travel through the first and second punch stations 1600 and 1700 and are re-aligned therebetween. After the card documents 710 leave the second punch station 1700, they are transported past the check brush sensing unit 1810 to one of two stackers 1830 and 1840.

CARD DOCUMENT PREPARATION UNIT

Card Inverter

The card inverter 950 is positioned between the first and second print stations S1 and S2. Since printing is performed from only one side of the card path and information is to be printed on both the obverse and reverse faces of the record card documents 710, it is necessary to invert the cards after they leave the first print station S1 and before entering the second print station S2. Furthermore, the inversion of the record card documents 710 must be performed in sufficient time so that the card documents will arrive at the second print station S2 before the print heads P3 and P4 are actuated to cause print impressions.

The card inverter 950 essentially comprises a curved pocket 951 into which the card documents 710 are directed and ejected, as shown in FIGS. 1, 2b and 29. The card documents 710 are guided from the skid rolls 820 and 821 to the feed rolls 952 and 953 and into the curved pocket 951 by means of the card guides 956 and deflector 957 pivotally attached to the side of the machine frame member 958. The curved pocket 951 is fixed between the machine frame members 958, only one member shown, and is slotted at the bottom portion to receive the cantilever spring element 955 fixed to the edge of the machine frame member 958 to extend therefrom through the slot in the curved pocket 951. The card documents are advanced by the feed rolls 952 and 953 toward the curved pocket 951. The present leading edge of the card document strikes the inner curved surface of the upper portion of the pocket 951 and is thereby bent or curved rearwardly. As the feed rolls 952 and 953 continue to feed the card document into the curved pocket 951, the present leading edge strikes or engages the cantilever spring 955 to deflect the same. The spring 955 remains deflected until the trailing edge of the card document leaves the bite of the feed rolls 952 and 953. As the card document leaves the feed rolls 952 and 953, it attempts to straighten out and, in doing so, the trailing edge of the card is displaced forwardly toward the bite formed between the feed rolls 953 and 954. With the trailing edge of the card document free, the deflected spring 955 straightens to displace the trailing edge upward into the bite of the feed rolls 953 and 954. As the trailing edge of the card document emerges from the bite of the feed rolls 953 and 954, it is guided into the bite of skid rolls 965 and 966 by card guides 959 fixed to the frame members 958. Hence, the trailing edge of the card document entering the card inverter 950 becomes the leading edge as it leaves the same. The reverse face of the card document, which had been facing upward, is now facing downward so as to be in the proper position for receiving print impressions from the print heads P3 and P4 at the second print station S2. A more detailed explanation of the card inverter is contained in the application to W. W. Wagner, Serial No. 653,482, filed April 17, 1957, now Patent No. 2,901,246.

CARD DOCUMENT PREPARATION UNIT

*Print Mechanism for First and Second Print Stations*

The apparatus for effecting print impressions at the second print station S2 is identical to that at the first print station S1. At the first print station S1, FIGS. 1, 2a and 26, there are two rows of print heads P1 and P2 spaced apart at a fixed distance of one-fourth of an inch. There are thirty print heads in each row uniformly spaced from each other to cover sixty columns of the card documents. Hence in order for each row of thirty print heads to print a line of data sixty columns wide, the print heads are permitted to make a print impression and then be laterally shifted the distance of one column to complete the sixty column line of printing. The print heads P1 and P2 for printing the information on the card are of the type utilizing a presettable matrix of print wires for forming the characters. The matrix wires 1010, the control ends of the matrix wires are shown in FIG. 21, of each print head P1 and P2 are set to form a particular character by a wire setting device known as a code rod 1020, FIGS. 19 and 21. The matrix wires 1010 of each print head P1 and P2 are arranged in a rectangular pattern of wires seven high and five wide; however, the control ends of the matrix wires 1010 are arranged so as to lie in a single vertical plane parallelly spaced from each other. The matrix wires 1010 of each print head are set through the facility of the associated code rod 1020; the wires, after being set, are restrained against free endwise movement and then carried forward to print by impact the character represented by the preset matrix wires on the record card documents 710 through the facility of an inked ribbon, not shown, interposed between the print heads P1 and P2 and the card document backed by associated platens P.

Hence, when the card documents are arrested at the first print station S1 by the gate 910, the two spaced apart rows of thirty print heads P1 and P2, having their matrix wires 1010 preset to form the characters for printing the name and address information, will be operated to effect two rows of print impressions with thirty characters in each row. The card document remains stationary at the first print station S1 and the matrix wires 1010 of the print heads P1 and P2 are reset and set up to form new characters so that, after the print heads P1 and P2 are laterally shifted one column, the print heads P1 and P2 may be driven forward to create thirty additional inked print impressions in each of the two rows to complete two lines of name and address information. The matrix wires 1010 of the two rows of thirty print heads P1 and P2 are first set up during the "a" subcycle and, after the heads P1 and P2 are operated to cause two lines of print impressions with thirty characters to each line, the matrix wires 1010 of the print heads are again set up but this time during the "b" subcycle, while the print heads P1 and P2 are laterally shifted one column and then operated to print an additional thirty characters adjacent to the already printed characters in each of the two rows to thereby complete two lines of printing.

If the name and address requires only two consecutive lines of printing, the record card document 710 would be released from the first print station S1 and advanced toward the card inverter 950. However, if additional lines of printing are necessary to complete the name and address, then the card gate 920 would also be operated to enter the card path so that the card document 710 will be advanced and held thereagainst by the skid rolls 821 when the card gate 910 is actuated from the card path to a remote position. It may be pointed out that it is possible to suppress the printing of any line of information; hence, while the card document 710 is advanced into the new position, either one or two additional lines of name and address information may be printed upon the card document. Of course, the printing of a line of information upon the card document 710 at the first stopping position may also be suppressed.

The printing of two lines of name and address information at the second stopping position takes place in the manner indicated for the first stopping position. The edge of gates 910 and 920 for engaging the card document are spaced from each other approximately one-half of an inch so as to maintain the one-fourth inch line spacing between lines, as seen in FIG. 26. The print heads P1 and P2 for each row are shown in FIG. 26 as being attached on a carrier 911 at a fixed distance from each other. The carrier 911 is adjustable so as to permit selective location of the name and address lines of printing on the obverse face of the card documents 710.

There are also two rows of print heads P3 and P4 at the second print station S2, FIGS. 1, 2a, 19 and 27, with thirty print heads in each row uniformly spaced from each other to cover sixty columns on the card documents. The rows of print heads are spaced from each other one and one-half inches. Generally, the item or data information will be printed upon the reverse face of the card documents 710 at the second print station S2 in a manner similar to that for printing name and address information on the obverse face of the card documents at the first print station S1. Two lines of item information may be printed in two subcycles, or the "c" and "d" subcycles. However, the print heads P3 and P4 of any one row for any particular item line of information may be prevented from effecting print impressions. A single gate 995 is capable of positioning the card documents 710 at the second print station S2 to permit the first and total lines of item information to be printed at one time, or during the "c" and "d" subcycles. The first card gate 970 in line to stop the card document 710 at the second print station S2, when actuated into the card path, registers the card document 710 to permit the printing of the second line of item information thereon. Hence, for any line of item information other than the first and total lines, only one line of information is printed at a time and, therefore, while the row of print heads P3 is capable of printing a line of information, the print heads P3 are suppressed or prevented from effecting print impressions when lines other than the first and total are printed. The reason for this particular arrangement is that the majority of card documents 710 will require only first and total item lines of information to be printed.

Accordingly, as seen in FIG. 27, the second card gate 975 in line will arrest the card document 710 to permit the printing of the third line of item information. The card documents 710 are advanced within the second print station S2 by the skid rolls 967 and 968 from card gate to card gate, depending upon which card gates are interposed in the card path. In this example, there are a total of six card gates and, under the arrangement just described, only seven lines of information will be printed; however, it is possible to print twelve lines of information. The last card gate 995 in line is the one for arresting the card documents 710 to permit the simultaneous printing of the first and total lines of item information. The card gates are spaced from each other so that the arresting edges thereof are one-fourth inch apart.

The foregoing described arrangement, where name and address information is printed upon one card document 710 at the first print station S1 during "a" and "b" subcycle time and detail or item information upon another card document 710 at the second print station S2 during "c" and "d" subcycle time, permits the use of a common print setup mechanism for presetting the matrix wires 1010 of the print heads P1, P2, P3 and P4 to form the characters for printing the proper information on the respective card documents 710 at the first and second print stations S1 and S2.

Three different arrangements for enabling the matrix wires 1010 of the print heads P1, P2, P3 and P4 at the first and second print stations S1 and S2 to share the common print setup mechanisms 1300, FIG. 1, will be described. Since there are sixty print heads at both the first and second print stations S1 and S2 or a total of 120 print heads, there are sixty print setup mechanisms 1300 provided to preset the matrix wires 1010 to form the desired characters.

Before describing the three different arrangements for sharing the common print setup mechanisms 1300, a brief general description of the printers already well known in the art and capable of being modified to accommodate the three different arrangements of apparatus for sharing the common print setup mechanism 1300 will be described.

However, in discussing the general operation of the wire printer suitable for the present invention, reference will be made to some of the structure involved in the three different arrangements for sharing the common print setup mechanism 1300.

A wire printer suitable for the present invention would generally be of the type described in the patents to Reynold B. Johnson, No. 2,785,627 and No. 2,802,414; to F. Furman et al., No. 2,829,592; and applications to Furman et al., Serial No. 478,650 (filed December 30, 1954), now Patent No. 2,909,994, and Serial No. 479,106 (filed December 31, 1954), now Patent No. 2,907,270.

The Patent 2,785,627 describes an improved wire printer wherein provision is made for moving the print ends of the matrix wires against a relatively fixed platen, however, with an inked ribbon and media for receiving print impressions interposed therebetween. The matrix wires are supported in movable print heads for carrying the print ends of the matrix wires toward and away from the platen. The matrix wires are preset to form the desired character patterns by the code rods which are effective to selectively displace the matrix wires axially. After the selected matrix wires are displaced axially to form the desired characters, all of the matrix wires are locked against free endwise movement relative to the print heads in order for the matrix wires to hold their setting after the characters are formed because the code rods are withdrawn for adjustment to a new character setting.

The matrix wires at their control ends, or the ends which are associated with the code rods are held by rigid guide means and, from this guide means, the wires extend within guide tubes which are secured at their ends to the print heads. The print ends of the matrix wires forming the character patterns project from their associated tubes so that they will be the only matrix wires to engage the inked ribbon and thereby create print impressions as the print heads are moved toward the platen. The control end of the matrix wires extend through inertia slugs which aid the matrix wires in forming print impressions and are also utilized in the restoration or resetting of the matrix wires.

After the preset matrix wires have been carried forward by the print heads to form the print impressions, the matrix wires are restored to a non-set condition. During the time the print impressions were effected, the code rods were adjusted to permit the formation of new characters. The code rods, with their new character settings, are moved against the control ends of the restored matrix wires to form new character patterns on the print ends of the matrix wires.

In the present invention, the elements just described are shown in FIGS. 1, 19, 20 and 21. In FIGS 19 and 20, the control tubes are schematically shown as leading the print heads P1, P2, P3 and P4. The print heads P1, P2, P3 and P4 are disposed opposite platen members P. In FIG. 21, guide tubes 1011, which were shown to terminate at one of their ends in the print heads P1, P2, P3 and P4, FIG. 19, are anchored at their other ends in a vertical plate 1012 which is fixed to a frame plate 1013 mounted in the printer by a number of crossbars 1014. The frame plate 1013 is provided with a notch 1015 which is adapted to engage the bar 1014 to thereby support the frame 1013 in a discrete vertical position through the facility of a comb 1016 attached to the bar 1014. The other bars 1014 are also provided with combs 1016 to accurately locate the frame plate 1013 in position. The frame plate 1013 essentially is for the purpose of supporting the matrix wire setting mechanism 1200 normally associated with one of the print heads; and set up by the print setup mechanisms 1300 will be shared, each print setup mechanism 1300 is associated with two print heads.

The matrix wires 1010 extend from the guide tubes 1011 beyond the anchored ends thereof to extend through inertia slugs 1017 and terminate in wire setting bail 1018. The normal wire setting bail 1018 essentially constitutes a plate 1019 having a plate 1021 affixed thereto. The plate 1021 is grooved to accommodate the control ends of the matrix wires 1010 extending from the guide tubes 1011. The plate 1019 is provided with a plurality of spaced apart fingers 1022 for holding a carrier or code rod tube 1023 in aligned grooves formed in extensions or lugs on the plate 1019. The code rod tube 1023 carries the code rod 1020 which is mounted therein for rotational and longitudinal movement and biased upwardly by a spring 1024. The lower end of the code rod 1020 is fitted with a gear 1025 and thrust washer 1026 to facilitate rotational and longitudinal movement of the code rod 1020 to enable it to effect different settings of the matrix wires 1010 when moved against the control ends thereof by the wire setting bail 1018. In FIG. 22, the wire setting bail 1018 is shown as being formed in two sections; this particular arrangement will be described in connection with one of the arrangements for sharing the print setup mechanism 1300. However, it should be noted that, in FIGS. 19, 21 and 22, the wire setting bail 1018 is shown in the modified form and not as would be seen in the above-referenced patents and patent applications.

The code rod 1020 is moved against the control ends of the matrix wires 1010 to preset the same as the wire setting bail 1018 is translated by the continuously rotating cams 1027. The cams 1027 are fixedly mounted on a shaft 1028 rotatably mounted in a housing 1029 of the printer and extending through side frames 1030, FIGS. 19, 21 and 23, of the printer. As the cams 1027 rotate, they simultaneously operate a pair of rocker arms 1031 through cam follower rollers 1032, respectively. The rocker arms 1031 are mounted on vertically spaced transversely extending shafts 1033 and 1034 also carried by the housing 1029. The rocker arms 1031 carry at their free end the rollers 1032 which are urged by springs 1035 to ride the surface of the cams 1027 to follow the movement thereof. The motion of the rocker arms 1031 actuates the shafts 1033 and 1034 which also carry projecting arm plates 1036 and 1037, respectively. The arm plates 1036 and 1037 are provided with adjustable screws 1039 extending through their free ends. The screws 1039 are adapted to engage oppositely disposed rods 1040 which are slidably mounted in a pair of vertically spaced horizontal bars 1041 and 1042 fixed to the housing 1029. The slidable rods 1040 are shown as being disposed to engage the bottom surface 1043 of a channel 1044 formed in the plate 1019. The wire setting bail 1018 is slidably mounted at its upper and lower ends on the frame plate 1013 and is restrained in a home position by springs 1045.

Hence, as the cams 1027 rotate to pivot rocker arms 1031 through the cam followers 1032, the arms 1036 and 1037 attached to the shafts 1033 and 1034, respectively, are moved in opposition to the springs 1035 to displace the rods 1040 forwardly and thereby carry the slidable wire setting bail 1018, comprising the plates 1019 and 1021, forward to bring the code rod 1020 against the control ends of the matrix wires 1010 to preset the same. A more detailed description of the code rod and its operation is contained in the patent to Furman et al., No. 2,785,628. The code rod 1020 is essentially a hollow perforated tube with the perforations discretely located in the peripheral surface of the tube. The code rod tube 1023 for containing the code rod 1020 is provided with perforations 1023a aligned with the control ends of the matrix wires 1010 to guide the same to the code rod 1020. If a perforation in the code rod 1020 is aligned with one of the perforations 1023a in the code rod tube 1023, then, as the wire setting bail 1018 is displaced forwardly to bring the code rod 1020 against the control ends of the matrix wires 1010 associated with one of the print heads P1, P2, P3 and P4, the matrix wire 1010 associated with the perforation 1023a in said code rod tube 1023 will not be displaced longitudinally relative to the print head. However, if there isn't a perforation in the code rod 1020 aligned with the perforation 1023a in the code rod tube 1023, then the associated matrix wire 1010 will be displaced longitudinally relative to the print head as the wire setting bail 1018 is moved forward.

The wire setting bail 1018 is returned to a home position by the springs 1045 as the cam followers 1032 follow the fall of the cams 1027.

With the matrix wires 1010 of the print heads preset to form the desired characters, the print heads P1, P2, P3 and P4, FIGS. 19 and 20, are driven forward toward the inked ribbon, not shown, and the opposed platen members P. The print heads P1, P2, P3 and P4, shown schematically in FIGS. 19 and 20, carry the guide tubes 1011 and matrix wires 1010 therewithin. The print heads P1, P2, P3 and P4 are selectively reciprocated toward and away from the platen members P by means of a cam arrangement. The cam arrangement may be of the type described in the Furman et al. patent, No. 2,829,592, which permits selective suppression of the operation of the print heads P1, P2, P3 and P4.

In order to selectively suppress the operation of the print heads P1, P2, P3 and P4, two similar, but spaced, cams, not shown, synchronized with the operation of print hammers 1050, effective to move associated print heads P1, P2, P3 and P4 through print strokes, are utilized. The cams, not shown, are provided with high positions for causing cam followers, not shown, to shift a universal bar, not shown, into the path of and against all of the print hammers 1050 if a magnet, not shown, has been energized. This magnet, when energized, moves interposers, not show, carried by the universal bar at its respective ends into driving engagement with links, not shown, connected to the respective cam followers. Hence, if the magnet is energized, the print hammers 1050 are prevented from operating and the print heads P1, P2, P3 and P4 do not undergo an impact stroke. However, when the magnet is not energized, the universal bar is not moved by the cams and does not interfere with the operation of the print hammers so that printing takes place in the subcycle. The elements just described, but not shown, are contained in the Furman et al. patent, No. 2,829,592.

The print heads P1, P2, P3 and P4 are made to undergo an impact stroke through the action of the print hammers, or actuating arms 1050. The actuating arms 1050 are pivotally mounted on transversely extending rods 1051 mounted on forwardly and downwardly extending brackets 1052, FIG. 19, carried by housings 1053. The housings 1053, shown in the plan view of FIG. 20, are generally U-shaped in cross-section. The forward legs 1054 of the housings 1053 are apertured to receive one end of spring 1055, the other end of the spring 1055 being attached to the actuating arms 1050.

The actuating arms 1050 carry cam followers 1056 disposed to follow the contour of cams 1057. The cams 1057 are suitably mounted on shafts 1058 which are driven so as to complete one revolution in each print subcycle.

The movements of the actuating arms 1050 are imparted to the print heads P1, P2, P3 and P4 through a tube and wire arrangement. Tubes 1060 are fixed at their rearward ends to the top of the rearward leg 1061 of the U-shaped housing 1053 and at its forward end to a bracket, not shown. The drive wires 1000, slidable within the tubes 1060, are pivotally attached at one end to the actuating arms 1050 and at their other ends to the print heads P1, P2, P3 and P4. Hence, when permitted by the cams 1057, the springs 1055 will drive the print heads P1, P2, P3 and P4 forward through the actuating arms 1050 and drive wires 1000. The depression in the cams 1057 to permit the springs 1055 to pivot the actuating arms 1050 is of minimum length; and the cam followers 1056 are almost immediately forced onto the high portion of the cams 1057, with the result that the actuating arms 1050 are caused to pull the drive wires 1000 rearward and retract the print heads P1, P2, P3 and P4.

If the operation of the actuating arms 1050 is to be suppressed for any print subcycle, it is necessary to provide a means which is effective at the time the cam followers 1056 drop into the depression in the cams 1057. Accordingly, a second set of cams, not shown, are provided to actuate bell cranks through cam followers, not shown, also mounted on the shaft for mounting the actuating arms 1050. The other arms o fthe bell cranks is pivotally connected to horizontal links slidably carried through slots in interposers movable in and out of the corresponding ends of a transversely extending universal bar, as shown in the Patent 2,829,592. The interposers are selectively actuated by a magnet. The interposers may be actuated to cause the universal bar to strike the actuating arms and thereby prevent the print heads from being carried forward to effect a print impression. The universal bar restores when the cam followers fall off the high point of the cams. Hence, if the universal bar is not caused to strike the actuating arms, the print heads will undergo a print stroke.

While the print heads P1, P2, P3 and P4 are being actuated to effect print impressions, the code rods 1020 are being set up to permit the formation of new characters. The code rods 1020 each have seven positions in the angular direction and eight positions in the longitudinal or axial direction for a total of 56 character determining positions. The lower end of each code rod 1020, FIG. 21, has a stem 1020a attached which carries at its lower end the elongated gear 1025 and thrust washer 1026. Hence, by rotation and axial displacement of the code rod 1020, the same may be indexed to any one of its character determining positions. The lower end of the frame plate 1013 supports certain linkage for effecting the selective positioning of the code rods 1020.

The vertical indexing of the code rods 1020 is accomplished by moving them downward from their normal position by a compound lever 1070. The lever 1070 is suitably pivoted on a stud 1071 anchored to the plate 1013 and is provided with a bifurcated extension 1072 which embraces the code rod stem 1020a and against which the thrust washer 1026 normally rests through the action of the spring 1024 on the upper end of the code rod 1020. The compound lever 1070 is urged to a raised position by a spring 1073 anchored at one end to the lever 1070 and at its other end to the frame plate 1013. The compound lever 1073 is controlled by a wire link 1074 fixed to a clip 1075 attached to a depending arm of the lever 1070. Hence, if a pull is exerted upon the wire link 1074, there will be a downward displacement of the code rod 1020 corresponding to the amount of displacement imparted to the wire link 1074.

The details of the mechanism for selectively displacing the wire link 1074 are contained in the application Serial No. 479,106.

Rotation of the code rod 1020 to any of its seven positions is accomplished by racks 1080 and 1081 which cooperate with the gear 1025 fixed to the code rod stem 1020*a*. The racks 1080 and 1081 are suitably supported by a carrier 1082 secured to the frame plate. The ends of the racks 1080 and 1081 extend upwardly and downwardly, respectively. The downwardly extending end of the rack 1081 is received in a readily attachable and detachable clip 1083 anchored at one end of a wire link 1084. The clip 1083 is provided with a slot for receiving the lower end of a lever 1085 pivoted intermediate of its ends upon a stud 1086 fixed to the frame plate 1013. The upper end of the lever 1085 is pivotally connected to the upwardly projecting end of the rack 1080. A spring 1087 is attached to the other end of the rack 1080 and urges the same in a home position while a spring 1088 anchored at one end to a stud 1089 in the frame plate 1013 and its other end to the upper end of the lever 1085 biases the lever 1085 so as to maintain the wire link 1084 taut at all times.

By this arrangement, a pull on the wire link 1084 will move the rack 1081 rearward while imparting a corresponding forward movement to the rack 1080. The wire print setup mechanism for selectively operating the wire link 1084 is described in the referenced application Serial No. 479,106.

The description of the mechanism for operating the wire printer on a subcycle basis and for laterally shifting the print heads P1, P2, P3 and P4 to enable the same to print in alternate columns on the card documents is fully contained in the patent to Johnson, No. 2,802,414. In FIGS. 6*a*–6*d*, inclusive, of this patent, there is an illustration as to how four lines of printing would be accomplished on a series parallel basis with four rows of print heads in four subcycles by laterally shifting the print heads of each row three times. In the present invention, there are two rows of print heads P1 and P2 at the first print station S1 and print heads P3 and P4 at the second print station S2 which share four subcycles of printing. Further, in the present invention, the print heads P1, P2, P3 and P4 are shifted only once, through the facility of cams 1090 and 1091, to accomplish a line of printing. It is thus seen that the referenced patent discloses adequate structure for accomplishing the lateral shifting of the print heads P1, P2, P3 and P4 in the present invention.

It is believed that the foregoing description and references utilized to supplement the description is sufficient to understand the print mechanism of the present invention in connection with the three different arrangements for sharing the common print setup mechanisms 1300.

In order to preset the matrix wires 1010 of the print heads P1, P2, P3 and P4 at the first and second print stations S1 and S2, sixty print setup mechanisms 1300 are provided. The print setup mechanisms 1300 are operable to set the code rods 1020 which then present the matrix wires 1010 of sixty print heads in each of the subcycles "*a*," "*b*," "*c*" and "*d*."

The first arrangement to be described for sharing the common print setup mechanism 1300 is termed "code rod shift mechanism." In this arrangement, FIGS. 19, 21, 22 and 23, one code rod 1020, associated with one print setup mechanism 1300, is utilized to set up the matrix wires 1010 of one of the print heads at the first print station S1 and then is laterally shifted to set up the matrix wires 1010 of one of the print heads at the second print station S2. Normally, the matrix wires 1010 of a single print head are associated with a single code rod 1010. However, for purposes of economy and flexibility, a single code rod 1020 is utilized to preset the matrix wires 1010 of two print heads. In order to permit the single code rod 1020 to set up, alternatively, the matrix wires 1010 of two print heads, the slidable wire setting bail 1018 is modified as shown in FIG. 22. In FIG. 22, the wire setting bail 1018 is divided into the code rod holder, or carrier member 1019, and the matrix wire restore member 1021. The code rod carrier member 1019 retains the code rod tubes 1023 for containing the code rods 1020 in a manner similar to the apparatus for containing the code rods as described in the referenced patents and patent applications. A series of longitudinally spaced bands 1092 hold the code rod tubes 1023 in the code rod carrier member 1019 but in a manner so as to permit rotational and longitudinal movement of the code rods 1020. The code rod carrier member 1019 is still slidable relative to the frame plate 1013; but, in the modified form, it also slides relative to the wire restore member or plate 1021 to alternately present the code rods 1020 in the code rod tubes 1023 in alignment with, first, the control ends of the matrix wires of one print head at the first print station S1 and, then, with the matrix wires 1010 of one print head at the second print station S2. As it will be seen shortly, the horizontal bars 1041 and 1042 are still secured to the housing 1029, which, however, is no longer stationary but is adapted to be shifted laterally and thereby laterally shift the code rods 1020 with respect to the control ends of the matrix wires 1010 associated with the individual print heads at the first and second print stations S1 and S2.

Instead of the matrix wire restore member 1021 associated with each frame plate 1013 guiding and restoring the matrix wires 1010 for two print heads, it now guides and restores matrix wires 1010 for four print heads. Two sets of the four sets of matrix wires are associated with two print heads of the print heads P1 and P2 at the first print station S1 while the other two sets of matrix wires 1010 are associated with two print heads of the print heads P3 and P4 at the second print station S2, as seen in FIG. 22. The one set of matrix wires 1010 for one of the print heads of the first print station S1 is disposed alongside of one set of matrix wires 1010 for one of the print heads at the second print station S2, and each of these sets of matrix wires commonly share a single code rod 1020. The same arrangement is provided for the other two sets of matrix wires just discussed. By this arrangement, during the "*a*" and "*b*" subcycles, the code rods 1020 will be in position to preset the matrix wires for two of the print heads at the first print station S1 and will be shifted between "*b*" and "*c*" subcycle times to preset the matrix wires 1010 for two of the print heads which will effect print impressions at the second print station S2 during the "*c*" and "*d*" subcycles.

Before discussing the mechanism for shifting the code rods 1020 to align the same with respect to different sets of matrix wires 1010, it should be noted that, in FIG. 22, the slidable rods 1040 will displace the code rod carrier 1019 forward to bring the code rods 1020 toward the control ends of the matrix wires 1010. As the code rod carrier 1019 is moved forward, the central projection 1019*a* of the carrier 1019, which normally abuts the matrix wire restore member 1021 of the wire setting bail 1018, will also carry the matrix wire restore member 1021 forward so that the same moves relative to the matrix wires 1010. Then, as the code rod carrier 1019 continues to move forward, the code rods 1020 within the code rod tubes 1023 come into proximity of the matrix wires 1010 to displace the same forwardly if holes are not present in the code rod. Referring to FIG. 21, when the cams 1027 permit the springs 1045 to return the matrix wire restore member 1021 to the home position, the wire matrix restore member 1021, which abuts the code rod carrier 1019, restores the same to the home position. Hence, while the code rod carrier 1019 and matrix wire restore member 1021 of the wire setting bail 1018 are now individual members to permit the code rod carrier 1019 to be shifted laterally with respect to the matrix wire restore member 1021, they are displaced forwardly and rearwardly as a unit through the action of the springs 1045 attached to the frame plate 1013 on one end and on the other end to the matrix wire restore member 1021.

The code rod carrier member 1019 is displaced laterally with the housing 1029 by a complementary cam arrangement to bring the code rods 1020 in alignment; first with the two sets of matrix wires 1010 associated with two print heads at the first print station S1 and then with the two sets of matrix wires 1010 associated with two print heads at the second print station S2. The housing 1029, FIG. 23, which is normally fixed as described in the above-mentioned reference patents and patent applications, carries nested U-shaped brackets 1125 projecting inwardly so that cam follower rollers 1126, journaled on pin shafts 1127 fixed between the nested brackets 1125, are in position to follow the cam surfaces of cams 1128. The cams 1128 are fixed to and positioned along the shaft 1028, which also carries the cams 1027 for effectively driving the rods 1040, to be in engagement with the cam followers 1126, respectively. As the housing 1029 is shifted laterally by action of the cams 1128 and cam followers 1126, it is guided in its lateral movement by vertically spaced horizontal guide rods 1129 which are fixed to extend from the machine frames, as seen in FIGS. 19 and 23. The matrix wires 1010 associated with one of the print heads at the first print station S1 is positioned .100 of an inch from the adjacent set of matrix wires 1010 associated with one of the print heads at the second print station S2, as in FIG. 22. Hence, the code rods 1020 are shifted laterally .100 of an inch as the housing 1029 is laterally shifted by the cams 1128 through the cam followers 1126. It is thus seen that the code rods 1020 may be shared between the matrix wires 1010 for the print heads at the first and second print stations S1 and S2. It may be noted that, by this arrangement for sharing the common print setup mechanism, it is not necessary to suppress the operation of the print heads at either the first or second print stations S1 and S2 because the matrix wires 1010 of the print heads at the first print station S1 will not be set up at the same time the matrix wires are preset for the print heads at the second print station S2.

The second arrangement for sharing the common print setup mechanism 1300, as shown in FIG. 24, does require the suppression of the operation of the print heads at the print station where it is desired not to effect print impressions. For instance, when printing during the "a" and "b" subcycles at the first print station S1, operation of the print heads at the second print station S2 will be suppressed; and, similarly, when printing during the "c" and "d" subcycles at the second print station S2, operation of the print heads at the first print station S1 will be suppressed. The necessity for suppressing the operation of the print heads in the manner just indicated will be appreciated during the description of the second arrangement for sharing the common print setup mechanisms 1300, which is termed the "Y-wire arrangement."

In this arrangement, FIG. 24, as in the code rod shift arrangement, there are sixty print setup mechanisms 1300 and sixty code rods associated therewith and with the total of 120 print heads or sixty print heads at each print station. The matrix wires 1010 of the print heads P1 and P2 at the first print station S1 are commoned or joined at the control ends with the matrix wires 1010 of the print heads at the second print station S2. The matrix wires 1010 from the second print station S2 may be joined to the matrix wires 1010 at the first print station S1 at the point of entry into one end of the inertia slugs 1017. Common single wires 1010a project from the other end of the inertia slugs 1017 toward the code rods 1020. Hence, when the code rods 1020 act upon the common single wires 1010a to selectively displace the same forwardly, the matrix wires 1010 associated with the common single wires 1010a will also be displaced to project from the print heads in a preset manner to form identical characters at both the first and second print stations S1 and S2. Since each code rod 1020 will preset the matrix wires identically for two print heads, one print head at the first print station S1 and the other print head at the second print station S2, it is necessary to suppress operation of the print heads at one of the print stations, unless it is desired to print identical information at both of the print stations S1 and S2. The mechanism for suppressing the operation of the print heads at either the first or second print stations may be of the type described above.

The third arrangement for sharing the common print setup mechanism 1300 also requires suppression of the operation of the print heads at one of the print stations if it is desired to print information only at the other print station. The third arrangement is termed the "double code rod arrangement." While there are only sixty setup mechanisms 1300 for selectively rotating and longitudinally moving the code rods 1020 in the manner previously described, there are 120 code rods in this arrangement. Since two code rods 1020 each share a setup mechanism 1300, they will be set up with common information or to identically displace the matrix wires 1010 associated therewith; and, therefore, as in the Y-wire arrangement, it is necessary to suppress the operation of the print heads at one print station if it is desired to print information at only the other print station. The code rods 1020 are paired together to become associated with a common setup mechanism 1300 so that they rotate and translate equal amounts. The paired code rods each have an identical gear 1095 fixed to their lower ends which are in mesh with a gear 1096 fixed to the upper end of a shortened rod 1020 having a stem 1020a and the usual elongated gear 1025 on the end thereof. The stem 1020a is also adapted to be displaced longitudinally in the usual manner by the bifurcated member 1072. Hence, as the shortened rod 1020 is rotated and translated, the code rods 1020 associated therewith through the gears 1095 and 1096 will also be rotated and translated. After the code rods 1020 are set up in the manner just indicated, they will be moved forward toward the control ends of the matrix wires 1010 to set the same and thereby form identical character patterns for the associated print heads at the first and second print stations S1 and S2.

In summary, it is seen that a common print setup mechanism 1300, of the type described in the application to Furman et al., Serial No. 479,106 (filed December 31, 1954), may be shared by the print heads at the first and second print stations S1 and S2. Further, printing during any one subcycle may take place at either both or only one of the print stations. Moreover, printing may take place at only one of the print stations without suppression of the operations of the print heads at the other print station. Additionally, it may be pointed out that, in connection with the code rod shift arrangement, the cams 1128 for shifting the code rods 1020 could be clutch controlled to provide selective shifting of the code rods and thereby permit repetitive printing at either of the print stations.

CARD DOCUMENT PREPARATION UNIT

Information Read Out to Print Thyratrons

The code rods 1020 for presetting the matrix wires 1010 are set up through linkage arrangements described in the patents to Johnson, No. 2,785,627 and No. 2,802,414. The linkages there described are actuated through six magnets. Each of the six magnets is controlled by an associated thyratron which, when fired, energizes the associated magnet. Additionally, a seventh thyratron and magnet are included for checking purposes, as previously described. If the redundancy bit is present, the seventh thyratron is fired to energize the seventh magnet. When the code rod 1020 operates, it transfers a checking contact and the printer continues to operate. Hence, if the information read from the buffer storage elements 400, 425 and 450 and the code rod setup do not agree, the operation of the printer is stopped. The information read out from the buffer storage elements 400, 425 and 450 to the first and second print stations S1 and S2 is transmitted for each digit position over conductors 420a and 464a to an OR circuit 1240 and from the OR circuit 1240 to the control grids of print thyratrons 1250 and 1275, respectively, shown in FIG. 28. The shield grids 1251 and 1276 of the thyratrons 1250 and 1275 are connectable through a series of relay contacts 1252 and 1277 to plug hubs 1253 for the name and address information and for the billing or item information which, in turn, are connected to plug hubs 1254 for receiving impulses from the digit emitter, shown in FIG. 12a, for the eighty digits of each of the master card and detail card. The shield grids 1251 and 1276 of the thyratrons 1250 and 1275 are commonly connected to transfer contacts 1260 and 1261, respectively. The transfer contacts 1260 and 1261 are associated with normally open and closed contacts 1260 and 1261, respectively. The normally open contacts 1260 and 1261 are connected to the transfer contacts of normally open and closed contacts 1262 and 1263, while the normally closed contacts 1260 and 1261 are connected to transfer contacts of normally open and closed contacts 1264 and 1265. The normally open contact 1263 is connected to the normally closed contact 1266 of the equal detail sequence collating circuitry, and the normally closed contact 1263 is connected to a normally closed contact 1267 of the equal detail sequence collating circuitry. The normally closed contacts 1266 and 1267 of the equal detail sequence collating circuitry are connected to plug hubs 1253 for the first item line of information.

The normally open contact 1262 is connected to the transfer contact of normally open and closed contacts 1268, and the normally closed contact 1262 is connected to the transfer contact of normally open and closed contacts 1269. The normally open contacts 1268 and 1269 are connected to plug hubs 1253 for the second, third, fourth, fifth and sixth lines of billing or item information. The normally closed contacts 1268 and 1269 are connected to plug hubs 1253 for the total line.

Furthermore, the normally closed contact 1264 is connected to a transfer contact of normally open and closed contacts 1270, while the normally open contact 1264 is connected to the transfer contact of normally open and closed contacts 1271. The normally closed contacts 1270 and 1271 are connected to street line plug hubs 1253, while the normally open contacts 1270 and 1271 are connected to the city-state line plug hubs 1253.

The normally closed contact 1265 is connected to the transfer contact of normally open and closed contacts 1272, and the normally open contact 1265 is connected to the transfer contact of normally open and closed contacts 1273. The normally closed contacts 1272 and 1273 are connected to name plug hubs 1253 and the normally open contacts 1272 and 1273 are connected to X plug hubs for permitting the preprinted city-state line to be crossed out.

As the various contacts just mentioned are transferred, the shield grids 1251 and 1276 of the thyratrons 1250 and 1275 will be properly conditioned to be capable of firing upon an impulse from the buffer storage elements being applied to the control grids.

Because there are four print subcycles "a," "b," "c" and "d" for each print setup mechanism, there are four separate digit times to read information from the buffer storage elements to the print thyratrons 1250 and 1275. Further, the setup times are switched by means of the contacts mentioned above to accommodate multiple master and detail cards.

CARD DOCUMENT PREPARATION UNIT

*Card Gate Control at First and Second Print Stations*

The card gates 910, 920, 970, 975, 980, 985, 990 and 995 for selectively entering the card path to arrest or stop card documents 710 at predetermined positions relative to the two spaced rows of print heads P1, P2, and P3, P4 at the first and second print stations S1 and S2 are magnetically operated and, for all practical purposes, are identical in structure and principle of operation. The card gates 910, 920, 970, 975, 980, 985, 990 and 995, dependingly attached to the ends of armatures 921, 922, 971, 976, 981, 986, 991 and 996a associated with magnets 923, 924, 972, 977, 982, 987, 992 and 996, are normally held out of the card path by springs 925, 926, 973, 978, 983, 988, 993 and 996b. The magnets are selectively energized to selectively bring the card gates into the card path at the first and second print stations S1 and S2.

At the firt print station S1, the name and address information is to be printed upon the obverse face of the card documents 710. To accomplish the printing of the name and address upon the obverse face of the card documents 710, two spaced apart rows of print heads P1 and P2 are provided. However, these print heads P1 and P2 are adapted to print information with the card documents 710 at rest. Hence, some means, and in this instance, the card gates 910 and 920, are necessary to arrest the card documents in position to permit the print heads P1 and P2 to print information thereon.

The card gates 910 and 920 at the first print station S1 are positioned relative to the print heads P1 and P2 to successively arrest the card documents 710 in two different positions to enable the printing of a maximum of four lines.

If the name and first line of the address are not preprinted, the first card gate 910 in line or in the direction of card travel will be operated every machine cycle of the card document preparation unit 600. However, since the third line or city-state line of the address may be preprinted, the second card gate 920 in line at the first print station will be selectively operated. The master sequence collating circuitry 115 for sequence check of the master card reader unit 110 controls the operation of the second card gate 920 at the first print station S1. An indication from the master sequence collating circuitry 115 of the master card reader unit 110 that the account number of the master card 960 at the first brush sensing station 140 equals the account number of the master card 960 at the second brush sensing station 150, or in other words, an equal condition exists when checking sequence in the master card reader unit 110, would mean that there are multiple master cards and that the second card gate 920 must be brought into the card path. However, since the card documents 710 are moved by the skid rolls 820 and 821 only a short distance in going from the first card gate 910 to the second card gate 920, it is necessary to bring the second card gate 920 into the card path prior to permitting the first card gate 910 to return to the home position or out of the card path.

Since the first gate 910 in line at the first print station S1 is operated every machine cycle of the card document preparation unit 600, the first card gate 910 is operated by the magnet 923 which is energized under two conditions. While the first card gate 910 is to enter the card path at least once every machine cycle of the card document preparation unit 600, it may also be necessary to hold or maintain the first card gate 910 in the card path to continuously hold the card document 710 at the first print station S1. This would occur when multiple items are to be printed upon the reverse face of another card document 710 at the second print station S2. In order to meet these two requirements imposed upon the first card gate 910 at the first print station S1, a cam-operated contact C7, FIG. 35a, is electrically connected in series with the magnet 923 to provide a circuit path traceable from the +48 volt supply to the cam-operated contact C7, from the cam-operated contact C7 to the magnet 923, and from the magnet 923 to ground potential. The cam-operated contact C7 is closed in the latter-third portion of a machine cycle and remains closed approximately until the first third of the next or following machine cycle. Accordingly, if the magnet 923 were only under the control of the cam-operated contact C7, it would be energized to bring the first card gate 910 into the card path at approximately 277° of one machine cycle and remain energized to hold the first card gate in the card path until 105° of the following machine cycle. However, to enable the first card gate 910 to remain in the card path, a relay R4 is provided. The relay R4 has a normally open contact R4a connected between the +48 volt supply and the magnet 923. Hence, by this arrangement, even though the cam-operated contact C7 is open, it still is possible to maintain the magnet 923 energized and thereby hold the first card gate 910 into the card path so as to maintain the card document 710 at the first print station S1 while multiple items are being printed upon another card document 710 at the second print station S2.

The relay R4 for additionally controlling the first card gate 910 has a pick coil electrically connected between ground potential and a normally open contact R5a of a relay R5. The normally open contact R5a of the relay R5 is connected to a cam operated contact C8 which, in turn, is connected to the +48 volt supply. Thus, it is seen that, just to energize the relay R4, two additional requirements must be met; first, the relay R5 must be energized to close the normally open contact R5a and, at or during the same time the normally open contact R5a is transferred to the closed position, the cam-operated contact C8 must be closed. Further, once the relay R4 is energized, it remains energized by means of a hold coil which is connected between ground potential and a cam-operated contact C9 through the normally open contact R4b of the relay R4. Hence, once the relay R4 is energized, it will remain energized during the period that the cam-operated contact C9 is closed.

The relay R5 is energized upon an indication from the equal detail sequence collating circuitry 125 that the sequence of detail cards is equal. The cam-operated contact C8 is closed once every machine cycle at approximately 30° and remains closed for approximately 45° or until 75° of the machine cycle. Hence, relay R4 will be picked before the magnet 923 could become de-energized since the cam-operated contact C7 is still closed while the cam-operated contact C8 is closed and the relay R5 is energized. Further, the relay R4, energized through now transferred normally open contact R4b of relay R4 and the closed cam-operated contact C9, remains energized through its own transferred normally open contact R4b and the cam-operated contact C9, which was closed just prior to the opening of the cam-operated contact C8, or at approximately 67°, and remains closed until approximately 292°, or well after the cam-operated contact is closed at 277°.

It is thus seen that the first card gate 910 enters the card path once every machine cycle of the card document preparation unit 600 to arrest the card documents 710 at the first print station S1 at approximately 277° and remains in the card path to hold the card documents 710 at the first print station S1 until approximately 105° of the following machine cycle. Subsequently, the first card gate 910 will be withdrawn from the card path, unless the relay R4 is energized. In the event the relay R4 is energized, the first card gate 910 remains in the card path to hold the card document 710 at the first print station S1 for all of the following machine cycle and part of the next machine cycle, or until 105°. Of course, if the relay R4 remains energized, which would occur if there were successive equal detail cards, the first card gate 910 would remain in the card path to hold the card document 710 at the first print station S1.

The second card gate 920 at the first print station S1 is under control of magnet 924. The magnet 924 is electrically connected between ground and a cam-operated contact C10 through a normally open contact R3a of relay R3. The cam-operated contact C10 is connected to the +48 volt supply. Hence, when the cam-operated contact C10 and the normally open contact R3a of relay R3 are closed, the magnet 924 will be energized. The cam-operated contact C10 is closed at approximately 60° of a machine cycle of the card document preparation unit 600 and remains closed for approximately 60° or until 120° of that machine cycle. The relay R3, which controls the normally open contact R3a, is under control of the equal master sequence collating circuitry 115 for indicating equal sequence of master cards 60. The relay R3 has a pick coil connected between ground potential and a cam-operated contact C11 through the contacts EMS4 which will be closed when the account number of the master cards 60 at the first brush sensing station 140 of the master card reader unit 110 equals the account number of the master card 60 at the second brush sensing station 150. The cam-operated contact C11 is closed at approximately 285° and remains closed until 345°. The relay R3, when picked at 285°, remains energized through a hold coil connected between ground potential and the cam-operated contact C10 through the normally open contact R3a and also between ground potential and +48 volt supply through the normally open contacts EMS5 of the equal master sequence collating circuitry 115 and through the normally open contact R3a. Hence, the relay R3 remains energized only so long as the cam-operated contact C10 is closed or from 285° of one machine cycle until 120° of another machine cycle. Hence, even though the cam-operated contact C11 is closed, the second card gate 920 at the first print station S1 will not be operated to enter the card path unless there is an indication from the equal master sequence collating circuitry 115 that account numbers of the master cards 60 at the first and second brush sensing stations 140 and 150 of the master card reader unit 110 are equal and the cam-operated contact C11 is closed at that time. It is also seen by this arrangement the magnet 924 will be energized to bring the second card gate 920 into the card path at approximately 60° of a machine cycle which is well prior to the release or removal of the first card gate 910 from the card path at 105°.

The second card gate 920 at the first print station S1 must be removed from the card path slightly later in time than the first card gate 910; however, the removal of the second card gate 920 from the card path to release the card document 710 so that it may enter the card inverter 950 and from there to the second print station S2 is precisely timed to insure that the card document 710 arrives at the second print station S2 at the proper time. It should be noted that, while the second card gate 920 is removed from the card path slightly later in time with respect to removal of the first card gate 910 from the card path, the second card gate 920 is physically located closer to the second print station S2 than the first card gate 910. Hence, the card document 710, whether it is released to the second print station S2 by either the first card gate 910 at 105° or at the second card gate 920 at 120°, it will arrive there at the proper time.

The card documents 710, as they enter the second print station S2, may be stopped in any and all of six positions to permit the print heads P3 and P4 to print item or billing information upon the reverse face of the card documents 710. While the card documents 710 may be stopped in any or all of the six available stopping positions, every card document 710 will be stopped in the last or sixth stopping position. When the card documents 710 are at the sixth stopping position, they are in proper register with respect to the two spaced apart rows of print heads P3 and P4 to enable the printing of the first and total lines of billing information on the card document 710. In order to stop the card in the six different stopping positions, six spaced apart card gates 970, 975, 980, 985, 990 and 995 are provided. The six card gates normally positioned out of the card path are selectively operated into the card path by magnets 972, 977, 982, 987, 992 and 996, respectively. The first card gate 970 in line at the second print station S2 arrests the card documents 710 in position to permit the first row of print heads P3 to print the second line of item information to appear upon the card documents, as in FIG. 27. In this particular example, the second row of print heads P4 are suppressed from printing. The second, third, fourth and fifth card gates 975, 980, 985 and 990 are selectively positioned into the card path by their associated magnets 997, 982, 987 and 992 to selectively arrest the card documents 710 to enable the selective printing by the first row of print heads P3 of the third, fourth, fifth and sixth lines of item information, respectively. The sixth and last card gate 995 in line at the second print station S2 is actuated into the card path by the magnet 996 to arrest the card documents 710 into position to permit the first and second rows of print heads P3 and P4 to simultaneously print the last or total and first lines of billing information on the card documents 710, respectively. Hence, the first row of print heads P3 is used to print all lines including the total of item or billing information except the first line, and the second row of print heads P4 prints the first line.

Since all cards have first and total lines of billing information printed thereon, the sixth card gate 995 in line will be operated to enter the card path once every card cycle. The sixth card gate 995 may enter the card path only at the time prior to the card documents 710 arriving at the second print station S2. However, the sixth card gate 995 must be operated from the card path at the proper time to enable the card documents 710 to be at the first punch station 1600 at the specified time. Hence, the magnet 996 for operating the sixth card gate 995 to bring it into the card path is essentially controlled by a cam-operated contact C12. The magnet 996 is connected between ground potential and the cam-operated contact C12 which is connected to the +48 volt supply. The cam-operated contact C12 is closed at 97° once every machine cycle of the card document preparation unit 600 and remains closed during that machine cycle until 353°. Additional control over the sixth card gate 995 is provided for the occurrence of printing multiple items upon the card documents 710. When multiple items are to be printed, the sixth card gate 995 must be positioned in the card path to arrest the card documents upon the release of the same by any one of the preceding five card gates 970, 975, 980, 985 and 990. Hence, under the conditions just mentioned, the sixth card gate 995 must enter the card path just after the first card gate 970 enters the card path and remain in the card path at least until after the fifth card gate 990 leaves the card path.

However, before discussing the additional control over the magnet 996 for selectively operating the sixth card gate 995, the controls over the magnets 972, 977, 982, 987 and 992 for operating the first, second, third, fourth and fifth card gates 970, 975, 980, 985 and 990 will be described.

The control over the magnets 972, 977, 982, 987 and 992 for selectively operating the first five card gates 970, 975, 980, 985 and 990 is essentially a shifting register 1400 of relays, FIG. 4, which may be cleared on any machine cycle. The logic of the shifting register 1400 is shown in FIG. 4. The shifting register 1400 is set upon receiving impulses from the equal detail sequence collating circuitry 125 indicating equal sequence of detail cards and reset upon an indication from the detail sequence collating circuitry 125 indicating that the detail card 50 at the first brush sensing station 145 of the detail card reader unit 120 has a higher account number than the detail card 50 at the second brush sensing station 155.

The magnet 972 for operating the first card gate 970 in line at the second print station S2 is connected between ground potential and the cam-operated contact C9 through a normally open contact R6a of a relay R6. Hence, the magnet 972 will be energized if the relay R6 has been energized and the cam-operated contact C9 is closed. The relay R6 is energized by means of a pick coil connected between ground potential and the cam-operated contact C8 through normally closed contacts R7a, R8a, R9a and R10a of relays R7, R8, R9 and R10, and the normally open contact R5a of relay R5. The relay R5 is energized when the sequence of detail cards is equal. The relay R5, FIG. 35b, is energized by means of a pick coil connected between ground potential and the +48 volt supply through normally open contacts EDS4 of the equal detail sequence collating circuitry 125 and a cam-operated contact C13. The cam-operated contact C13 is closed at approximately 127° of a machine cycle and remains closed until approximately 172° of the same machine cycle. The relay R5 remains energized through the facility of a hold coil connected between ground potential and the +48 volt supply through a cam-operated contact C14. The cam-operated contact C14 closes at approximately 127° of a machine cycle and remains closed until about 75° of the following machine cycle. Accordingly, if the relays R7, R8, R9 and R10 are not energized and the relay R5 is energized, the relay R6 becomes energized and, therefore, the magnet 972 will be energized to bring the first card gate 970 into the card path at the time the cam-operated contact C8 is closed, or at 30° of a machine cycle, and remains closed until approximately 75° of the same machine cycle. The relay R6 remains energized through a hold coil connected between ground potential and the +48 volt supply through a normally open contact R6a and the cam-operated contact C9. Hence, the magnet 972 will remain energized to hold the first card gate 970 in the card path so long as the cam-operated contact C9 is closed. The cam-operated contact C9 closes at 67° and remains closed until approximately 292° of the same machine cycle. The first card gate 970 is removed from the card path to release the card documents 710 just after the first row of print heads P3 have printed the second line of billing information upon the reverse face of the card document 710 at the second print station S2.

The magnet 977 for controlling the operation of the second card gate 975 is connected between ground potential and the +48 volt supply through parallelly connected normally open contacts R7b and R11a of relays R7 and R11, respectively, FIG. 35a.

The relay R7 is energized through a pick coil which is connected between ground potential and a cam-operated contact C15 through normally open relay contacts R6b and R5b of relays R6 and R5, respectively, FIGS. 35a and 35b. The cam-controlled contact C15 is closed at 180° of a machine cycle and remains closed until 240° of the same machine cycle. The relays R5 and R6 are energized in the manner indicated above. The relay R7 remains energized through a hold coil connected between ground potential and a normally open contact R7b of the relay R7 connected to a cam-operated contact C16 which, in turn, is connected to the +48 volt supply. The cam-operated contact C16 is closed at approximately 233° of one machine cycle and remains closed until 180° of the following machine cycle. The normally open contact R7b, of course, is closed when the relay R7 is energized.

The relay R11 is energized through a pick coil connected between ground potential and the +48 volt supply through a normally open contact R7c of relay R7 and the cam-operated contact C13. The normally open contact R7c will be closed when the relay R7 is energized in the previously indicated manner. The cam-operated contact closes at 127° of a machine cycle and remains closed until 172° of the same machine cycle. The relay R11 remains energized through a hold coil connected between ground potential and the +48 volt supply through a normally open contact R11b of relay R11 and a cam-operated contact C17. The normally open contact R11b of relay R11, of course, is closed when the relay R11 is energized. The cam-operated contact C17 is closed at 165° and remains closed until approximately 292° of the same machine cycle. Hence, the second card gate 975 will be brought into the card path at approximately 67° and remains in the card path until approximately 292°.

The magnet 982 for controlling the operation of the third card gate 980 is connected between ground potential and the +48 volt supply through parallelly connected normally open relay contacts R8b and R12a of relays R8 and R12, respectively. The relay R8 is energized by means of a pick coil connected between ground potential and the +48 volt supply through a normally open contact R11c of the relay R11 and connected in series with the normally open contact R5b which, in turn, is connected in series with the cam-operated contact C15. Hence, the relay R8 will be energized when both the cam-operated contact C15 and the normally open contacts R11b and R5b of the relays R11 and R5, respectively, are closed. Once the relay R8 is energized, it remains energized for a predetermined period of time by means of a hold coil connected between ground potential and the +48 volt supply through a normally open contact R8c and the cam-operated contact C16. It is thus seen that the relay R8 will be energized when the relays R5 and R11 are energized and the cam-operated contact C15 is closed. The cam-operated contact C15 closes at 180° of a machine cycle and remains closed until 240° of the same machine cycle. The relay R8 then remains energized during the period that the cam-operated contact R16 is closed which is from 233° of one machine cycle until 180° of the next machine cycle.

The relay R12 is energized through the facility of a pick coil connected between ground potential and the +48 volt supply through a normally open contact R8d of the relay R8 and the cam-operated contact C13. It is thus seen that the relay R8 must first be energized before the relay R12 will be capable of becoming energized. The relay R12 remains energized over a predetermined period of time by means of a hold coil connected between ground potential and the +48 volt supply through a normally open contact R12b of the relay R12 and the cam-operated contact C17.

It is thus seen that the relay R12 will become energized only sometime after the relay R8 is energized and when the cam-operated contact C13 is closed. The cam-operated contact C13 is closed from 127° of one machine cycle until 172° of the same machine cycle. The relay R12 then remains energized by means of the cam-operated contact C17 which is closed from 165° of a machine cycle until approximately 292° of the same machine cycle.

In this manner, the magnet 982 for controlling the operation of the third card gate 980 at the second print station S2 will be energized to bring the third card gate 980 into the card path at approximately 203° of one machine cycle and remains energized to hold the third card gate 980 in the card path until approximately 292° of the next machine cycle.

The magnet 987 for controlling the operation of the fourth card gate 985 is connected between ground potential and the +48 volt supply through parallelly connected normally open contacts R9b and R13a of relays R9 and R13, respectively. The relay R9 is energized by means of a pick coil connected between ground potential and the +48 volt supply through a normally open contact R12c of the relay R12 and connected in series with the normally open contact R5b which, in turn, is connected in series with the cam-operated contact C15. It is thus seen that the relay R9 cannot become energized until the relay R12 first becomes energized; and, of course, the normally open contact R5b must be and will be closed under the condition of equal sequence of detail cards; and the cam-operated contact C15 will be closed from 180° of one machine cycle until 240° of the same machine cycle.

Once the relay R9 is energized, it remains energized for a predetermined period of time by means of a hold coil connected between ground potential and the +48 volt supply through the normally open contact R9c of the relay R9 and the cam-operated contact C16. The normally open contact R9c will be closed because the relay R9 is energized and the cam-operated contact C16 closes at 233° of one machine cycle and remains closed until 180° of the next machine cycle. It is thus seen that the relay R9 becomes energized at approximately 180° of one machine cycle and remains energized until 180° of the following machine cycle.

The relay R13 is energized by means of a pick coil connected between ground potential and the +48 volt supply through a normally open contact R9d of the relay R9 and the cam-operated contact C13. It is thus seen that the relay R9 must be energized before the relay R13 may become energized even though the cam-operated contact C13 is closed. The cam-operated contact C13 closes at 127° of a machine cycle and remains closed until 172° of the same machine cycle. Once the relay R13 is energized, it remains energized for a predetermined period of time through a hold coil connected between ground potential and the +48 volt supply through a normally open contact R13b of the relay R13 and the cam-operated contact C17. The normally open contact R13b, of course, will be closed when the relay R13 is energized. The cam-operated contact C17 is closed at 165° of a machine cycle and remains closed until 292° of the same machine cycle.

Hence, the magnet 987 for controlling the operation of the fourth card gate at the second print station S2 will be energized to bring the fourth card gate 985 into the card path at approximately 203° of a machine cycle and remain energized to hold the third card gate 980 in the card path until approximately 292° of the next machine cycle.

The magnet 992 for controlling the operation of the fifth card gate 990 is connected between ground potential and the +48 volt supply through parallelly connected normally open contacts R10b and R14a of relays R10 and R14. The relay R10 is energized by means of a hold coil connected between ground potential and the +48 volt supply through the normally open contact R13c of the relay R13 and connected in series with the normally open contact R5b of the relay R5 which, in turn, is connected in series with the cam-operated contact C15. In this manner, the relay R10 cannot be energized unless the relay R13 is first energized. The normally open contact R5b is closed when the relay R5 is energized, and this ocurs when the equal detail sequence collating circuitry 125 indicates the condition of equal sequence of detail cards and the cam-operated contact C13 is closed. The cam-operated contact C15 closes at 180° of a machine cycle and remains closed until 240° of the same machine cycle.

Once the relay R10 is energized, it remains energized for a predetermined period of time by means of a hold coil connected between ground potential and the +48 volt supply through a normally open contact R10c of the relay R10 and the cam-operated contact C16 connected in series therewith. The normally open contact R10c, of course, is closed at the time the relay R10 is energized. The cam-operated contact C16 is closed at 233° of one machine cycle and remains closed until 180° of the next machine cycle. Hence, the relay R10 becomes energized at approximately 180° of one machine cycle and remains energized until 180° of the following machine cycle.

The relay R14 is energized by means of a pick coil connected between ground potential and the +48 supply through a normally open contact R10*d* of the relay R10 which is connected in series with the cam-operated contact C13. By this arrangement, the relay R14 will not be energized unless the relay R10 is already energized. The cam-operated contact C13 closes at 127° of a machine cycle and remains closed until 172° of the same machine cycle.

Once the relay R14 is energized, it remains energized for a predetermined period of time by means of a hold coil connected between ground potential and the +48 volt supply through a normally open contact R14*b* of the relay R14 and the cam-operated contact C17. The normally open contact R14*b* will be closed when the relay R14 is energized. The cam-operated contact C17 closes at 165° of a machine cycle and remains closed until 292° of the same machine cycle.

Hence, the magnet 992 for controlling the operation of the fifth card gate 990 at the second print station S2 will be energized to bring the fifth card gate 990 into the card path at approximately 203° of a machine cycle and remain energized to hold the fifth card gate 990 in the card path until approximately 292° of the next machine cycle.

While the operation of the sixth card gate 995 has been partially described above, additional control is provided over the sixth card gate 995 in view of the fact that the card documents 710 must remain at the second print station S2 to permit the first row of print heads P3 to print the total or last line of billing information and to permit the second row of print heads P4 to print the first line of billing information. Accordingly, the release of the card documents 710 by the sixth card gate 995 is quite critical since there is the additional requirement that the card documents 710 arrive at the first punch station 1600 at the proper time. The added control over the sixth card gate 995 is provided by means of a relay R15. The relay R15 is energized by means of a pick coil connected between ground potential and the +48 volt supply through a normally open contact R16*a* of a relay R16 and the cam-operated contact C15. The relay R16 is energized by means of a pick coil connected between ground potential and the +48 volt supply through a normally open contact R5*c* of the relay R5 connected in series with the cam-operated contact C11. The normally open contact R5*c* will be closed when the relay R5 is energized, which occurs under the condition of an equal detail card sequence and when the cam-operated contact C13 is closed. The cam-operated contact C11 is closed at 285° of a machine cycle and remains closed until 345° of the same machine cycle. Once the relay R16 is energized, it remains energized over a predetermined period of time by means of a hold coil connected between ground potential and the +48 volt supply through a normally open relay contact R16*b* of the relay R16 and a cam-operated contact C18. The relay R16 is energized and, therefore, the normally open contact R16*b* will be closed. The cam-operated contact C18 is closed at 330° of a machine cycle and remains closed until 255° of the following machine cycle. Hence, the relay R16 is energized at 285° of a machine cycle and remains energized until 255° of the following machine cycle.

With the relay R16 energized, the normally open contact will be closed to permit the relay R15 to become energized at the time the cam-operated contact C15 closes. The cam-operated contact C15 closes at 180° of a machine cycle and remains closed until 240° of the same machine cycle.

Once the relay R15 is energized, it remains energized over a predetermined period of time through a hold coil connected between ground potential and the +48 volt supply through a normally open contact R15*a* of relay R15 and the cam-operated contact C16. The relay R15 will be energized at this time and, therefore, the normally open contact R15*a* will be closed. The cam-operated contact C16 closes at 233° and remains closed until 180° of the same machine cycle. In this manner, the relay is energized at 180° of a machine cycle and remains energized until 180° of the following machine cycle.

The magnet 996 for controlling the sixth card gate 995 at the second print station S2 is also connected to the +48 volt supply through a normally open contact R15*b* of the relay R15. Hence, the sixth card gate 995 is controlled by the magnet 996 which is energized when the cam-operated contact C12 is closed at 97° of one machine cycle and will remain energized until at least 353° of the same machine cycle. However, if they are multiple detail cards, as indicated by an equal detail sequence condition, the relay R15 will remain energized during the period from 353° of one machine cycle to 97° of the following machine cycle, at which time the cam-operated contact C12 is again closed so that the magnet 996 still is energized and remains energized until 353° of said following machine cycle. It is thus seen that additional control has been provided over the magnet 996 for controlling the sixth card gate 995 so that the same will be held into the card path continuously while there are multiple detail cards.

The control over the magnets 972, 977, 982, 987, 992 and 996 for controlling each of the six card gates 970, 975, 980, 985, 990 and 995 has been shown to be capable of selectively operating the card gates to bring the first card gate 970 into position to arrest the approaching card document 710. The first card gate 970 will then hold the card document in the stopped position for a sufficient period of time to permit the first row of print heads P3 to print a line of item information on the reverse face of the card document 710. This line of item information so printed appears on the second line of the card document 710.

If there is still an indication from the equal detail sequence collating circuitry 125 that there are multiple detail cards, then the second card gate 975 must be operated to enter the card path to arrest the card document 710 in a new position relative to the two rows of print heads P3 and P4 at the second print station S2 to permit the first row of print heads P3 to print the third line of item information upon the card document 710. To provide the proper control over the second card gate 975, the normally open contact R6*b* of the relay R6 for controlling the energization of the magnet 972 for controlling the first card gate 970 in the circuit of the relay R7, in combination with the relay R11, controls the energization of the magnet 977 for controlling the second card gate 975. The relay R11 permits the relay R6 to de-energize within a machine cycle and still provide for the energization of the magnet 977 to hold the second card gate 975 in the card path for more than one machine cycle. The succeeding third, fourth and fifth card gates 980, 985 and 990 are controlled in a manner similar to the second card gate 975. Initiating closure of each of the second, third, fourth and fifth card gates 975, 980, 985 and 990 depends upon two factors. One factor is that the relay R5 is energized, which means that there is an indication from the equal detail sequence collating circuitry 125 that the condition of equal detail card sequence exists, and the other factor is that the preceding card gate is already held in the card path. The fact that the preceding card gate; for example, the second card gate 975, is already held in the card path means that the relay R11, or the last relay to be energized of the two relays R7 and R11, for controlling the energization of the gate control magnet 977 is still energized. It should also be noted that, whenever the relay R5 is de-energized, which occurs when the detail card sequence is unequal, it is not possible to bring a succeeding card gate of the card gates 975, 980, 985 and 990 into the card path, except for the sixth card gate 995; and the card gate which is already in the card path will be removed therefrom to the home position at the proper time as the associated cam-operated contact is opened. It should also be noted that, in FIG. 35a, the relay R6 for controlling the energization of the magnet 972 for controlling the operation of the first card gate 970 is connected in series with normally closed contacts R7a, R8a, R9a and R10a, respectively. In this manner, the first card gate 970 will not be operated to enter the card path every time the relay R5 is energized at the time any of the other relays R7, R8, R9 and R10 are energized because the relay R6 will not be energized.

CARD DOCUMENT PREPARATION UNIT

First and Second Punch Stations

The first and second punch stations 1600 and 1700, FIGS. 1, 2a, 4 and 32, have the function of recording selected information into the card documents 710 in the form of perforations. In this example, a maximum of eighty digits of information may be entered into the card documents 710. The particular kind of information which will be entered into the card documents 710 is at the discretion of the machine operator. More than likely, the account number for each card document 710 being prepared will be entered therein in the form of perforations. The information which is to be entered into the card documents 710 in the form of perforations will be coming from the fifth and sixth buffer storage elements 500 and 525, FIGS. 4, 12a and 12b. The information is made available in such a manner that a portion of the information may be entered into one of the card card documents 710 at the first punch station 1600 and the remainder of the information is entered at the second punch station 1700. This is quite significant because this permits a higher output rate of completed card documents 710. Each of the individual punch units 1610 and 1710 at the corresponding first and second punch stations 1600 and 1700 will be operating at only one-half the speed of the operating speed of the card document preparation unit 600; i.e., the punch units 1610 and 1710 will be operating at 4,000 strokes per minute at eight strokes per card while the card document preparation unit 600 operates at 500 cards per minute.

Normally, it is quite difficult to provide a punch unit which is capable of performing selective punching of record cards at the rate of 4,000 strokes per minute; and, for the most part, punch units for selectively punching record cards at higher speeds have not been successfully developed. Therefore, by this arrangement, it is possible to achieve the higher punching rate by proportioning the amount of information punched in the card documents 710 at any one punch station. In this example, the punch unit 1610 at the first punch station 1600 is to punch the index positions of the card documents 710 in flight for the even rows or rows 12, 0, 2, 4, 6 and 8 and the punch unit 1710 at the second punch station 1700 is to punch the index positions of the record card documents 710 in flight for the odd rows or rows 11, 1, 3, 5, 7 and 9.

The punch units 1610 and 1710 at the first and second punch stations 1600 and 1700 are identical in principle of operation and practically identical in structure. The punch and die assembly 1625 of each punch unit 1610 and 1710 operates to oscillate back and forth while a vertically reciprocating punch element 1615 moves up and down, both the vertical and horizontal movements being timed with the feeding of the card documents 710 so as to make it unnecessary to stop the card documents during the punching operation. These types of punch units are already known in the prior art and the type of punch in the present invention is quite similar to the punch units described in the patents to C. D. Lake et al., No. 2,451,752 and No. 2,845,122, and the patent to G. F. Daly et al., No. 2,547,445.

Referring to FIG. 32, it is seen that the punch units 1610 and 1710 comprise a punch and die assembly 1625 supported by a pivot 1651 to have oscillatory motion. Oscillations of the punch and die assembly 1625 are effected by complementary cams 1652 and 1653 fixed to be rotated by shafts 1654 and 1655, respectively. The complementary cams 1652 and 1653 are adapted to act upon a roller 1656 carried or supported by the punch and die assembly 1625 and thereby oscillate the same about the pivot 1651 in a pendulum manner. The rate of angular oscillation is such that the cutting end of a vertically reciprocable punch member 1615 is moving at the speed of the card documents 710 while in contact therewith on the forward stroke or oscillation. This rate of oscillation is provided by the particular contour of the complementary cams 1652 and 1653. The forward stroke occupies approximately two-thirds of a cycle point, while the return stroke requires one one-third of a cycle point. The punch member 1615 is guided in a frame 1657 of the punch and die assembly 1625 for vertical reciprocable movement. The punch member 1615 is provided with a notch 1658 at its upper end and limited in its upward movement by a fixed projection 1659 extending inwardly from the frame 1657 which engages the lower side 1660 of the notch 1658. However, it should be pointed out that the punch member 1615 is never driven against the fixed projection 1659; it is merely carried thereagainst by its own inertia. The punch interposer element 1640 permits selective reciprocation of the punch member 1615. The interposer 1640 is provided with a ball end 1662 adapted to reside in an outwardly opening socket 1663 of a punch selector lever 1664 pivotally mounted intermediate of its ends by a pin 1665. A spring 1666 attached at one end to the punch selector lever 1664 and at its other end to the punch interposer 1640 holds the punch interposer 1640 in a slightly elevated position and against the cam surface of a punch cam 1630, the ball end 1662 being capable of pivoting in the socket 1663. The punch selector lever 1664 is provided with a forked end 1667 adapted to be engaged by the end of an armature 1668 of a punch select magnet 1669. The other end 1670 of the punch selector lever 1664 is adapted to engage a selector cam 1671. Additionally, the punch selector lever 1664 is urged to pivot in a counterclockwise direction by means of a compression spring 1672 residing in a bore 1673 of a fixed block 1674 with one end engaging a block 1675 sealing off the bore 1673 and the other end in engagement with a shoulder 1676 of the selector lever 1664. The armature 1668 of the magnet 1669, with the magnet 1669 energized, prevents the spring 1672 from moving the punch selector lever 1664 counterclockwise about the pivot 1665. With the punch selector lever 1664 in its restrained or latched position, a depending projection 1677 on the punch interposer 1640 lies out of engagement with the top or upper end 1678 of the punch member 1615. However, when the magnet 1669 is energized to attract its armature 1668, the punch selector lever 1664 is free to be pivoted, counterclockwise by the spring 1672. The selector cam 1671 is mounted on a shaft 1679 to be rotated counterclockwise. The impulses for energizing the magnet 1669 come at a predetermined time; and, therefore, the selector cam 1671 is timed to actuate the punch selector lever 1664 so as to free the forked end 1667 of the armature 1668 and thereby permit the magnet 1669 to attract the armature 1668 rapidly. While the armature 1668 is held attracted to the magnet 1669, the punch selector lever 1664 is urged by the spring 1672 to follow the selector cam 1671. In following the punch selector cam 1671, the punch selector lever 1664 is pivoted counterclockwise and the punch interposer 1640 is shifted to the right to bring the depending projection 1677 over the top end 1678 of the punch member 1615.

The punch interposer 1640 has a surface 1680 which follows the punch cam 1630 fixed to be rotated counterclockwise by a shaft 1681. As the surface 1680 on the punch interposer 1640 follows the cam 1630, the punch interposer 1640 will be displaced downwardly. It is thus seen that, if the depending projection 1677 of the punch interposer 1640 is not over the top end 1678 of the punch member 1615, the same will not be moved through a punch stroke. However, with the depending projection 1677 over the top end 1678 of the punch member 1615, the punch member 1615 will be displaced downwardly by the punch cam 1630 and enter the die member 1620 of the punch and die assembly 1625. The die member 1620 is supported to withstand the downward pressure to the punch member 1615 during a punching operation by a rotatable die support roll 1682. The linear velocity of the die member 1620 during the time the punch member 1615 enters therein matches the peripheral velocity of the support roll 1682.

As the punch member 1615 reaches the end or limit of its downward stroke, the punch selector lever 1664 is pivoted clockwise by the selector cam 1671 which overcomes the urging of the spring 1672 to pivot the punch selector lever 1664 counterclockwise. The punch selector lever 1664, as it pivots clockwise by action of the selector cam 1671, is shifted to the left and thereby displaces the depending projection 1677 from its position over the top end 1678 of the punch member 1615. Furthermore, as the punch selector lever 1664 is pivoted clockwise, the left fork of the forked end 1667 of the punch selector lever 1664 contacts the beveled end of the armature 1668 to carry it away from the magnet 1669 if it happens to remain attracted thereto through residual magnetism. In this manner, the punch selector lever 1664 will again be restrained from pivotal movement by the armature 1668.

The punch member 1615 is positively restored or withdrawn from the die member 1620 by means of a bell crank 1683 pivotally mounted by a pin 1684 and having an arm 1685 which carries a projection 1686 for engaging the upper surface of the notch 1659 in the punch member 1615 and a projection 1687 for engaging an arcuate surface 1688 of the punch interposer 1640. A spring 1689, attached on one end to the bell crank 1683 and on its other end to a fixed pin, now shown, tends to pivot the bell crank 1683 clockwise to hold the projection 1687 in constant contact with the arcuate surface 1688 of the punch interposer 1640.

The bell crank 1683 also has an arm 1690 provided with a curved surface 1691 to be engaged by the punch cam 1630. As the punch cam 1630 engages the curved surface 1691, the bell crank 1683 is pivoted clockwise so that the projection 1686 engages the upper surface of the notch 1659 in the punch member 1615 and carries the punch member 1615 upward. The punch member 1615 is thereby restored in position to permit the depending projection 1677 of the punch interposer 1640 to be brought over the top end 1678 thereof by the punch selector lever 1664 when the magnet 1669 is again energized.

From the foregoing, it is seen that the punch and die assembly 1625 is oscillated about the pivot 1651 by the complementary cams 1652 and 1653 at a rate so that the cutting end of the punch member 1615 is moving at the speed of the card documents 710 while in contact therewith on the forward stroke of the oscillation. The punch cam 1630 is rotated in a particular manner to actuate the punch member 1615 through a punch stroke at the time the punch and die assembly 1625 is moving at the same rate as the card documents 710. The punch cam 1630 also functions to restore the punch member 1615 through the bell crank 1683. Additionally, it is seen that the selector cam 1671 performs three distinct functions. The selector cam 1671 controls the positioning of the depending projection 1677 of the punch interposer 1640 over the top end 1678 of the punch member 1615, it controls the withdrawal or shifting of the punch interposer 1640, and it provides positive restoration of the armature 1668 when the magnet 1669 is de-energized.

The punch members 1615 are carried spacedly apart and in line in the frame member 1657; and each punch member 1615 is associated with its own punch magnet 1669, punch selector lever 1664, punch interposer 1640, and bell crank 1683. Hence, by selectively energizing the punch magnets 1669, selected punch members 1615 will be actuated through a punch stroke.

In order to provide access to the card path to permit removal of card documents 710 in the event of a card document jam, the lower cooperating feed rolls 1560, 1562, 1567 and 1569 are contained in units 1692 and 1693, FIG. 31, which are adapted to be pivoted downwardly by links 1694 and 1695, respectively. Chip chutes 1696 and 1697 for receiving and containing the chip punched from the card document are adapted to fold when the units 1692 and 1693 are pivoted downward.

The units can be removed by squeezing locking pins 1698 and 1699, shown in FIG. 30. With the units 1692 and 1693 removed, the punch and die assembly 1625 may be removed.

The magnets 1669 at the first and second punch stations 1600 and 1700 are selectively energized by information from the fifth and sixth buffer storage elements 500 and 525, respectively, to enable selective punching of the card documents 710. However, the information from the fifth and sixth buffer storage elements 500 and 525 is in the 7-bit code and must be translated to the IBM code so as to be able to properly energize the magnets.

Information from the fifth buffer storage element 500 passed by the logical AND circuit 512, FIG. 12a, is transmitted as bipolar inputs to seven logical AND circuits 1751, 1752, 1753, 1754, 1755, 1756 and 1757, shown in FIG. 33. Additionally, the logical AND circuits 1751, 1752, 1753, 1754, 1755, 1756 and 1757 each have an input connection from a punch emitter 1758, FIG. 37h, which generates digit impulses for digit times 12, 0, 2, 4, 6, 8 and 0, respectively; the first 0 is for a zone function while the second 0 is for the digit 0. Hence, the logical AND circuits 1751, 1752, 1753, 1754, 1755, 1756 and 1757 function to translate the information from the fifth buffer storage element 500, which is in the 7-bit code, to the IBM code.

The outputs of the logical AND circuits 1751, 1752, 1753, 1754, 1755, 1756 and 1757 are connected to a logical OR circuit 1759, FIG. 33. The output of the logical OR circuit 1759 is connected to a conductor 1760 for commonly connecting the control grids 1761 of eighty thyratrons 1762 which control the energization of eighty magnets 1669 connected in their plate circuit. The eighty magnets 1669 are positioned at the first punch station 1600 to permit selective punching in any of the eighty columns of the card documents 710 for the even rows. The shield grids 1763 of the thyratrons 1762 are individually connected to eighty plug hubs 1764, respectively. The plug hubs 1764 are selectively connectable to eighty plug hubs 1765 impulsed by a digit emitter, shown in FIG. 12a, for providing eighty digit impulses of the available 160 digit impulses. By this arrangement, it is possible to permit the punching of the index positions of selected columns of the eighty columns of each even row of the card documents 710.

Similarly, information from the sixth buffer storage element 525 passed by the logical AND circuit 528, FIG. 12b, is transmitted as bipolar inputs to six logical AND circuits 1781, 1782, 1783, 1784, 1785 and 1786. Additionally, the logical AND circuits 1781, 1782, 1783, 1784, 1785 and 1786 each have an input connection from a punch emitter 1788, FIG. 37h, which generates digit impulses for digit times 11, 1, 3, 5, 7 and 9. The logical AND circuits 1781, 1782, 1783, 1784, 1785 and 1786 function to translate the information from the sixth buffer storage element 525, which is in the 7-bit code, into the IBM code. The output of the logical AND circuits 1781, 1782, 1783, 1784, 1785 and 1786 are connected to a logical OR circuit 1789, and the output of the logical OR circuit 1789 is connected to a conductor 1790 for commonly connecting the control grids 1791 of eighty thyratrons 1792. The eighty thyratrons 1792 control the energization of eighty magnets 1669 connected in their plate circuit. The eighty magnets 1669 are positioned at the second punch station 1700 to permit selective punching in any of the eighty columns of a card document for the odd rows. The shield grids 1793 of the eighty thyratrons 1792 are also individually connected to the eighty plug hubs 1764, respectively.

From the above, it is thus seen that the index positions for any of the eighty columns in any row of the card documents 710 may be selectively perforated by the punches at the first and second punch stations 1600 and 1700.

CARD DOCUMENT PREPARATION UNIT

Machine Control

The picker knife 713, FIG. 2*b*, for feeding the card documents 710 from the card hopper 711 to the feed rolls 810 and 811 and the other various feed rolls described above for feeding the card documents 710 through the card document preparation unit are driven through a drive arrangement powered by a drive motor 1850, shown in FIG. 1 and schematically represented in FIG. 37*a*.

The drive motor 1850, FIG. 37*a*, is connected through a main line switch SW to a source of alternating electric current, not shown. The source of alternating electric current is also applied to a power supply 1851 for supplying the +48 volt D.C. voltage. A start key SK controls the operation of feeding card documents 710 through the card document preparation unit 600. The start key SK, FIG. 37*a*, has a normally open contact SK1 connected between the cam-operated contact C1 and a normally open contact R16 of a relay R16. The cam-operated contact C1 is connected to the +48 volt supply while the normally open contact R16*a* is connected to a normally open contact R17*a* of a relay R17 which is closed when the card reader 100 is ready. The card reader is ready when the first master and detail cards have been fed by manual depression of a start key, not shown, for the card reader 100, to the first brush sensing stations 140 and 145, respectively. The first master and detail cards, when fed to the first brush sensing stations 140 and 145, operate card levers CLC1 and CLC2 to close card lever contacts CLC1 and CLC2. The card lever contacts CLC1 and CLC2 are connected in series with a cam-operated contact C19 and the relay R17. Hence, when both card lever contacts CLC1 and CLC2 are closed and the cam-operated contact C19 is closed, the relay R17 will be energized to close the contact R17*a*. The normally open contact R17*a* is connected to a pick coil of the relay R1 which, in turn, is connected to the —48 volt supply. The cam-operated contact C1 is closed at 0° of a machine cycle and remains closed until 240° of the same machine cycle. The relay R16 is connected between the — and +48 volt supply through the normally open card hopper contact CH1 located in the card hopper 711 of the card document preparation unit 600. Hence, the relay R16 will be energized to close the normally open contact R16*a* when there are card documents 710 in the card hopper 711 to close the normally open card hopper contact CH1. In this manner, the depression of the start key SK will cause the relay R1 to become energized upon the simultaneous occurrence or the existence of the conditions that the card reader 100 is ready or the relay R17 is energized, that the card hopper CHC1 is closed and that the cam-operated contact C1 is closed. It should be noted that the normally open contact R17*a* is also connected to the cam-operated contact C1 through two other parallel circuits. One parallel circuit includes a normally closed contact R18*a* of a relay R18 in series with a normally open contact R1*c* of the relay R1, while the other parallel circuit includes a normally open contact RO1 of a run-out key ROK.

Once the relay R1 is energized through its pick coil, in the manner just indicated, it will remain energized through the facility of a hold coil connected from the —48 volt supply to the +48 volt supply through the normally open contact R1*a* of the relay R1 and the cam-operated contact C2. The normally open contact R1*a*, of course, will be closed whenever the relay R1 is energized. The cam-operated contact C2 closes at 230° of a machine cycle and remains closed until 7° of the following machine cycle. It will be seen in FIG. 38 that the cam-operated contact C1 will be closed whenever the cam-operated contact C2 is open and vice versa. The operation of the clutch 712, FIG. 4, of the card document preparation unit 600 is controlled by a clutch magnet CM2, FIG. 37*b*. The clutch magnet CM2 is connected between the +48 volt supply through a normally closed contact R5*d* of the relay R5, a normally closed contact EMS6 of the equal master sequence collating circuitry 115 of the master card reader unit 110, a normally open contact R1*d* of the relay R1, and a cam-operated contact C20. The cam-operated contact C20 is closed at 315° of a machine cycle and remains closed until 360° of the same machine cycle. Therefore, with the relay R1 energized and the contacts R5*d* and EMS6 closed, the magnet CM2 will become energized, whereby the clutch 712 will become engaged at the start of a machine cycle for the card document preparation unit 600. Hence, once the card document preparation unit 600 is started by the start key SK, it will continue to run until a stop condition is encountered. The various stop conditions which will cause the card document preparation unit 600 to cease operating include the stopping of the operating of the card reader 100, the depressing of a stop key STK, occurrence of a jam of the card documents 710 within the card document preparation unit 600, and the filling of the card pockets in either card stacker 1830 or 1840. It may be noted that the card reader 100 would also stop for any one of these stop conditions.

The stop key STK is electrically connected between a pick coil of a relay R18 and a cam-operated contact C21. The pick coil of the relay R18 is also connected to the —48 volt supply while the cam-operated contact C21 is connected to the +48 volt supply. The pick coil of the relay R18 is also connected to the cam-operated contact C21 through several parallel circuits. The pick coil of the relay R21 is connected to the cam-operated contact C21 through a circuit of a normally closed contact SK2 of the start key SK in series with a normally closed contact R19*a* of a relay R19, through a circuit of the normally closed contact SK2 of the start key SK in series with a normally open contact R18*b* of the relay R18, through a normally open contact R20*a* of a relay R20, and through a normally open contact R21*a* of a relay R21. The cam-operated contact is closed at 0° of a machine cycle and remains closed until 255° of the same machine cycle.

The normally closed contact R19*a* will be open when the relay R19 is energized. The relay R19 is energized through the facility of a pick coil electrically connected from the —48 volt supply to a cam-operated contact C22 through normally open contacts R16*b* and R22*a* of the relay R16 and a relay R22. The relay R16 remains energized so long as there are card documents 710 in the card hopper 711. Hence, the normally open contact R16*b* will be closed so long as there are card documents 710 in the card hopper 711. The relay R22 is connected between the — and +48 volt supply through a normally open card lever contact CLC3. The card lever contact CLC3 is one of a series of card lever contacts adapted to be operated to the closed position by the card documents 710 which are placed at predetermined positions along the card path, the card lever contact CLC3 being the first one in line. Hence, the relay R22 becomes energized when the card documents 710 close the card lever contact CLC3. The cam-operated contact C22 is closed at approximately 95° of a machine cycle and remains closed until approximately 145° of the same machine cycle. It is thus seen that, after the card document preparation unit 600 has been started and the start key SK has been released so that the normally closed contact SK2 is closed, the card document preparation unit 600 will continue to run if the card hopper contact CHC1 and the card lever contact CLC3 are closed. Because under these conditions, the relay R19 becomes energized to transfer the normally closed contact R19a to the open position. It may be noted that, if either the card hopper contact CHC1 or the card lever contact CLC3 were open, the relay R19 would not be energized and, therefore, the relay R18 would become energized; or, if any of the other stop conditions existed to close the normally open contacts R18b, STK1, R20a, or R21a, the relay R18 would be energized when the cam-operated contact C21 is closed. Once the relay R18 becomes energized, it remains energized for a predetermined period of time by means of a hold coil connected between the — and +48 volt supply through a normally open contact R18c and a cam-operated contact C23. The normally open contact R18c, of course, will be closed when the relay R18 is energized. The cam-operated contact C23 closes at approximately 247° of a machine cycle and remains closed until approximately 7° of the following machine cycle. With the relay R18 energized, the card document preparation unit 600 will stop operating because the normally closed contact R18a will be opened, whereby the relay R9 becomes de-energized. With the relay R9 de-energized, the clutch magnet CM2 is de-energized.

However, if the card hopper contact CHC1 and the card lever contact CLC3 are closed, the relay R19 becomes energized when the cam-operated contact C22 closes at 95°. Once the relay R19 is energized, it remains energized over a predetermined period of time by means of a hold coil connected between the — and +48 volt supply through a normally open contact R19b of the relay R19 and a cam-operated contact C24. The normally open contact R19b closes when the relay R19 is energized. The cam-operated contact C24 closes approximately 135° of a machine cycle and remains closed until 105° of the following machine cycle. In this manner, the relay R19 will be energized only during the time a card document 710 should be closing the card lever contact CLC3. If the card lever contact CLC3 is closed when a card document 710 should not be closing the same, the relay R20 will be energized.

The relay R20 is energized by means of a pick coil connected between the — and +48 volt supply through several parallel circuit paths. One of the parallel circuit paths is traceable from the pick coil of the relay R20 through a normally open contact R23a of a relay R23 connected to a cam-operated contact C25; another path is traceable from the pick coil of the relay R20 through a normally open contact R22b of the relay R22 and to a cam-operated contact C26 through a normally open contact R24a of the relay R24. The pick coil of the relay R23 is connected in parallel with the clutch magnet CM2 while the relay R24 is connected between the — and +48 volt supply through a card lever contact CLC4. The relay R23 remains energized through a hold coil connected between the — and +48 volt supply through a normally open contact R23b and a cam-operated contact C27. The cam-operated contact C27 is closed at approximately 353° of one machine cycle and remains closed until approximately 330° of the following machine cycle. The cam-operated contact C25 is closed at approximately 187° of one machine cycle and remains closed until 222° of the same machine cycle, while the cam-operated contact C26 is closed at approximately 233° of a machine cycle and remains closed until approximately 267° of the same machine cycle. The pick coil of the relay R20 is also connected to the cam-operated contact C25 through parallelly connected normally open contacts R25a, R26a and R28a of the relays R25, R26 and R28. The relay R25 is connected between the — and +48 volt supply through a normally open card lever contact CLC5. Hence, when a card document 710 closes, the normally open card lever contact CLC5 and the relay R25 will become energized. The relay R26 is connected between the — and +48 volt supply through a normally open card lever contact CLC6. In this manner, the relay R26 will become energized when the card document 710 causes the card lever contact CLC6 to close. The relay R28 is connected between the — and +48 volt supply through a normally open card lever contact CLC8 which will close by action of the card documents 710, whereby the relay R28 will become energized. The pick coil of the relay R20 is also connected to the cam-operated contact C26 through parallelly connected normally open contacts R27a and R29a of the relays R27 and R29, respectively. The relay R27 is connected between the — and +48 volt supply through a normally open card lever contact CLC7 which will be closed by the card document 710, whereby the relay R27 will become energized. Similarly, the relay R29 is connected between the — and +48 volt supply through a normally open card lever contact CLC9. The relay R29 will become energized when the normally open contact CLC9 is closed by action of the card documents 710. The pick coil of the relay R20 is also connected to the cam-operated contact C22 through a normally open contact R30a of the relay R30, which is connected between the — and +48 volt supply through a normally open card lever contact CLC10. Hence, the relay R30 becomes energized when the normally open card lever contact CLC10 is closed by action of the card documents 710. Once the relay R20 becomes energized, it remains energized throughout the facilities of a hold coil connected between the — and +48 volt supply through a normally open contact R20b of the relay R20 and a normally closed contact SK3 of the start key SK. It is thus seen that, once a card jam occurs, the relay R20 will become energized and remain energized until the card jam is removed and the start key SK is again depressed.

The card document preparation unit 600 will also cease to operate when either of the card document stackers 1830 or 1840 becomes filled. When either of the card document stackers 1830 or 1840 becomes filled with the card documents 710, normally open card stacker contacts CSC1 or CSC2 will be operated to the closed position. The relay R21 is connected between the — and +48 volt supply through parallelly connected card stacker contacts CSC1 and CSC2. When the relay R21 becomes energized, the normally open contact R21a will be closed, whereby the relay R18 becomes energized. It will be recalled that the card document preparation unit 600 ceases to operate when the relay R18 is energized.

The relay R1 appropriately may be termed a "start relay" since it is seen that it must be energized first to close the normally open contact R1d before the clutch 712 may become engaged. The cam-operated contact C20 is closed at 315° of a machine cycle and remains closed until 360° of the same machine cycle. In this manner, the clutch 712, if permited to operate; i.e., all other control conditions being satisfied, will make one complete revolution starting at 0° and ending at 360°; however, since the clutch magnet CM2 will be energized at 315° and, if in fact the clutch magnet CM2 is energized, the clutch 712 will continue to operate past the 360° and continue to 360° of the following machine cycle. Hence, if the clutch magnet CM is energized continuously, the card document preparation unit 600 operates continuously without latching up within any one machine cycle for any period of time. Of course, if the clutch magnet CM2 is not energized at 315° of a machine cycle, the clutch 712 still continues to operate or remains engaged until 360° of that machine cycle. However, the clutch 712 will disengage at 360° of that machine cycle and will be disengaged for the entire following machine cycle. Then, if the clutch magnet CM2 is subsequently energized at 315° during said following machine cycle, the clutch 712 will become engaged at 360° of said following machine cycle or 0° of the next machine cycle.

From the foregoing, it is seen that the card document preparation unit 600 is so controlled that it will not start to operate unless the card reader 100 is ready and unless there are card documents 710 in the card hopper 711. Further, once the card document preparation unit 600 is started to operate, it will continue to operate unless the card reader 100 stops operating, the stop key STK is depressed, a card document jam occurs, or either of the card document stackers 1830 or 1840 fill to capacity. When the last card document 710 is fed from the card hopper 711, both the start key SK and run-out key ROK must be depressed to feed the last card document 710 through the card document preparation unit 600 and into either one of the stackers 1830 or 1840.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for preparing record card documents under control of a plurality of sets of related control record cards bearing address and amount data, magazines for holding said plurality of sets of control record cards; separate feeding means for successively advancing said control record cards in synchronism from said magazines; a plurality of lines of sensing brushes for analyzing the control data of said control record cards as the same are presented into cooperative relationship therewith; comparing means under control of said sensing brushes for comparing the data of separate control record cards to detect related control record cards; an accumulator; a series of magnetic core storage matrices for storing data, said matrices being coupled successively so that data stored therein may be transferred from one to the other progressively; means under control of said sensing brushes for directing data derived from said control record cards into the first magnetic core storage matrix of said series of magnetic core storage matrices; means for directing certain amount data stored in said first magnetic core storage matrix to said accumulator; means under control of said accumulator for directing computed amount data from the accumulator into certain magnetic core storage matrices; a magazine for containing a plurality of record card documents; a succession of printing and punching stations; means for feeding said record card documents successively through said printing and punching stations; printing devices having a plurality of presettable recording members at said printing stations; means under control of a plurality of magnetic core storage matrices for controlling the setting up of said recording members to represent address and amount data whereby said recording members are adapted to effect record impressions on different card documents at said print stations; a card document inverting device positioned intermediate of said successively arranged print stations to facilitate recording of data from a single direction on different faces of the card documents at different print stations, punching mechanisms at said plurality of punching stations, said punching mechanisms being adapted to perforate successive record card documents at the same time while in flight; and means under control of said plurality of magnetic core storage matrices for setting said plurality of punching mechanisms to enable the same to selectively perforate successive record card documents at the same time.

2. In a machine for preparing record card documents according to claim 1, further comprising, sensing means for analyzing the perforations entered into said record card documents by said punching mechanisms, and checking means under control of said sensing means and a particular magnetic core storage matrix of said magnetic core matrices for determining if the data derived by said sensing means is identical to the data derived from said particular magnetic core storage matrix.

3. In a machine for recording on record card documents, a magazine for holding a plurality of record card documents; a plurality of successively arranged work stations; a plurality of data operably controlled settable work devices associated with said work stations; a plurality of magnetic core storage matrices, said matrices being coupled, whereby data entered into a first matrix may be transferred from matrix to matrix in step with the passage of said documents from work station to work station; a plurality of data sources; means for entering data from said plurality of data sources into the first matrix of said plurality of magnetic core storage matrices; means for progressively transferring data from matrix to matrix as data is being entered into said first matrix from said plurality of data sources; means under control of said magnetic core storage matrices for selectively setting said plurality of work devices according to the data stored in said matrices; and means for operating said work devices to record concurrently on said plurality of card documents at said plurality of work stations.

4. In a machine of the type set forth in claim 3 wherein there is provided, an accumulator, means under control of said first matrix for entering certain data into said accumulator, and means for transferring accumulated data from said accumulator into several matrices of said plurality of matrices whereby computed amounts may be read out to control one or more of said work devices.

5. In a record controlled machine for preparing record card documents with identification and accounting data and control indicia, means for sensing a plurality of sets of control records for related identifying data and accounting data thereon, means under control of said sensing means for comparing said data sensed to insure relation of said identifiying and accounting data, data storing means under control of said sensing means for storing said data, an accumulator controlled by certain of said data for computation, printing means operated under control of said data storing means and said accumulator for recording address and accounting data on opposite sides of said card documents, forming means under control of said data storing means and said accumulator for forming control indicia in said documents, and means for successively feeding said documents in position to enable said printing and forming means to record data on said documents.

6. In a machine for preparing record card documents, a magazine for containing a plurality of record card documents, a succession of printing and punching stations, feeding means for feeding said record card document successively through said printing and punching stations, a plurality of card document arresting devices positioned at said printing stations selectively operable to be positioned into the card path to arrest the card documents at said printing stations, means for selectively operating said card document arresting devices, printing devices having a plurality of presettable recording members at said printing stations, magazines for holding a plurality of sets of control record cards, separate selectively operable feeding means for successively advancing said control record cards from said magazines, a plurailty of lines of sensing brushes for analyzing the control data of said control record cards, comparing means under control of said sensing brushes for comparing the data of separate control record cards to detect related control record cards, means under control of said comparing means for controlling operation of said separate feeding means, and means under control of said comparing means for controlling operation of said feeding means for feeding said card documents.

7. In a machine for preparing record card documents as in claim 6 further comprising means for presetting said recording members under control of data derived from said control record cards.

8. In a machine for preparing record card documents, a magazine for holding a plurality of record card documents; a plurality of successively arranged work stations; feeding means for feeding said card documents successively through said work stations; a plurality of data operably controlled settable work devices associated with said work stations; a plurality of magnetic core storage matrices, said matrices being coupled, whereby data entered into a first matrix may be transferred from matrix to matrix in step with the passage of said card documents from work station to work station; magazines for holding a plurality of sets of related control records; separate selectively operable feeding means for successively advancing said control records from said magazines; a plurality of lines of sensing devices for analyzing the control data of said control records; comparing means operably connected to said sensing devices for comparing data of separate control records; means for entering data analyzed by said sensing devices into the first matrix of said plurality of magnetic core storage matrices; means under control of said comparing means for controlling said separate feeding means; means under control of said comparing means for controlling said feeding means for feeding said card documents; means for progressively transferring data from matrix to matrix as data is entered into said first matrix from said sensing devices; means under control of said magnetic core storage matrices for selectively setting said plurality of work devices according to data stored in said matrices; and means for operating said work devices to record concurrently on said plurality of said documents at said plurality of work stations.

9. In a machine for preparing card documents as in claim 8 wherein said means under control of said comparing means for controlling said separate feeding means causes one of said separate feeding means to operate at twice its normal rate and the other separate feeding means to temporarily suspend operation when said comparing means detects like control records fed by said one of said separate feeding means.

10. In a machine for preparing card documents as in claim 8 further comprising means located at least at one of said work stations for arresting card documents relative to said work devices.

11. In a machine for preparing card documents as in claim 10 further comprising means indexing said card documents postioned at least at one of said work stations to align different areas of the card documents relative to said work devices.

12. In a machine for preparing card documents as in claim 11 further comprising cyclically operable means positioned at least at one of said work stations for arresting a like area of every card document relative to said work devices.

13. In a machine for preparing record card documents as in claim 12 further comprising means for operating at least a pair of work devices when said like area of every card document is arrested relative to said work devices.

References Cited in the file of this patent

UNITED STATES PATENTS

| 1,862,032 | Peirce | June 7, 1932 |
| 1,864,051 | Paris | June 21, 1932 |
| 2,970,537 | Wardwell et al. | Feb. 7, 1961 |